United States Patent

Mizuuchi et al.

[11] Patent Number: 5,991,490
[45] Date of Patent: Nov. 23, 1999

[54] OPTICAL WAVEGUIDE AND OPTICAL WAVELENGTH CONVERSION DEVICE

[75] Inventors: Kiminori Mizuuchi, Neyagawa; Tatuo Itou, Hirakata; Sigeki Ohnishi, Kadoma; Kazuhisa Yamamoto, Takatsuki, all of Japan

[73] Assignee: Matsushita Electric Industrial Co., Ltd., Osaka, Japan

[21] Appl. No.: 09/187,792

[22] Filed: Nov. 6, 1998

Related U.S. Application Data

[62] Division of application No. 08/773,145, Dec. 26, 1996, Pat. No. 5,872,884.

[30] Foreign Application Priority Data

Dec. 28, 1995 [JP] Japan .................................... 7-343602
Feb. 16, 1996 [JP] Japan .................................... 8-028994

[51] Int. Cl.[6] .................................................. G02B 6/10
[52] U.S. Cl. ........................ 385/130; 385/129; 385/131; 385/132; 359/326; 372/21
[58] Field of Search .................................. 385/130, 147, 385/129, 131, 123, 122, 124, 132; 359/326–332; 372/21, 22

[56] References Cited

U.S. PATENT DOCUMENTS

| | | | |
|---|---|---|---|
| 4,427,260 | 1/1984 | Puech et al. ............................. | 385/122 |
| 4,910,738 | 3/1990 | Fujita et al. ........................... | 372/22 X |
| 4,946,240 | 8/1990 | Yamamoto et al. ..................... | 385/131 |
| 4,973,117 | 11/1990 | Yamada ................................... | 385/130 |
| 5,155,791 | 10/1992 | Hsiung ................................... | 385/122 |
| 5,158,823 | 10/1992 | Enomoto et al. .................... | 359/326 X |
| 5,459,807 | 10/1995 | Doumuki et al. ....................... | 385/129 |
| 5,546,220 | 8/1996 | Endo et al. ............................. | 359/332 |
| 5,652,674 | 7/1997 | Mizuuchi et al. ...................... | 359/326 |

FOREIGN PATENT DOCUMENTS

| | | |
|---|---|---|
| 0 343 591 | 11/1989 | European Pat. Off. . |
| 0 474 392 | 3/1992 | European Pat. Off. . |
| 61-94031 | 5/1986 | Japan . |
| 1-238631 | 9/1989 | Japan . |
| 0 5203454 | 10/1993 | Japan . |
| 2502818 | 3/1996 | Japan . |

OTHER PUBLICATIONS

European Search Report dated Jun. 22, 1998 for EP 96 12 0809.

H. J. Lee et al., "Lithium niobate ridge waveguides fabricated by wet etching", Electronics Letters 31, Feb. 16, 1995, No. 4, Stevenage, Herts, GB.

H. Ahlfeldt et al., Structural and optical properties of annealed proton–exchanged waveguides in z–cut $LiTaO_3$, Journal of Applied Physics 77, May 1, 1995, No. 9, Woodbury, NY, US, pp. 4467–4476.

K. Yamamoto et al., "Quasi–Phase–Matched Second Harmonic Generation in a $LiTaO_3$ Waveguide", Journal of Quantum Electronics 28, Sep. 28, 1992, No. 9, New York, US, pp. 1909–1914.

F. Xiang et al., "New Y–Branch Wavelength Multi/Demultiplexer by K+ and Ag+ Ion Exchange for $\lambda$= 1.31 and 1.55 $\mu$m", Electronics Letters 28, Nov. 19, 1992, vol. 28, No. 24,. pp. 2262–2264.

H. Zhang et al., "Fully planar proton–exchanged lithium niobate waveguides with grating taps", Applied Optics 33, Jun. 1, 1994, No. 16, Washington, US, pp. 3391–3393.

European Search Report dated Nov. 21, 1997, corresponding to European Patent Application No. 96120809.7.

Primary Examiner—Phan T. H. Palmer
Attorney, Agent, or Firm—Ratner & Presita

[57] ABSTRACT

An optical waveguide of the present invention includes: an optical material; an optical waveguide layer formed in the optical material; and a cladding layer formed on a surface of the optical waveguide layer, wherein the optical waveguide layer is capable of guiding a light beam having a wavelength of $\lambda 1$ and a light beam having a wavelength of $\lambda 2$ ($\lambda 1 > \lambda 2$) therethrough, and a refractive index and a thickness of the cladding layer are determined so as to satisfy a guiding condition for the light beam having the wavelength of $\lambda 2$ and a cutoff condition for the light beam having the wavelength of $\lambda 1$.

20 Claims, 37 Drawing Sheets

$$\text{Overlap} = \frac{\left(\int_{-\infty}^{\infty}\int_{-\infty}^{0} E_w^2 \, E_{2w} \, dx\,dy\right)^2}{\left(\int_{-\infty}^{\infty} E_w^2 \, ds\right)^2 \left(\int_{-\infty}^{\infty} E_{2w}^2 \, ds\right)}$$

$E_w$ : Electric field of a fundamental wave
$E_{2w}$ : Electric field of a second-harmonic wave
$\int ds = \int\int dx\,dy$ : Surface integral as to a cross-section of a waveguide

FIG.11A
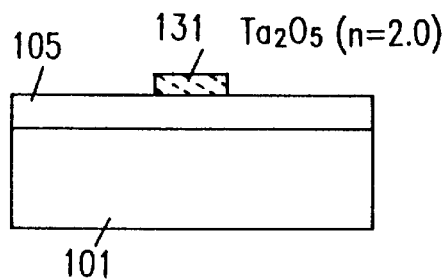
FIG.11B
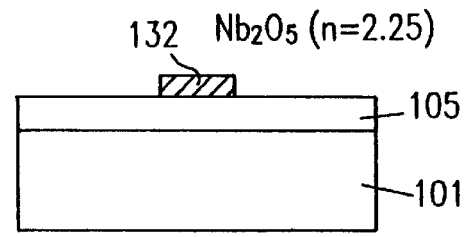
FIG.11C  FIG.11D
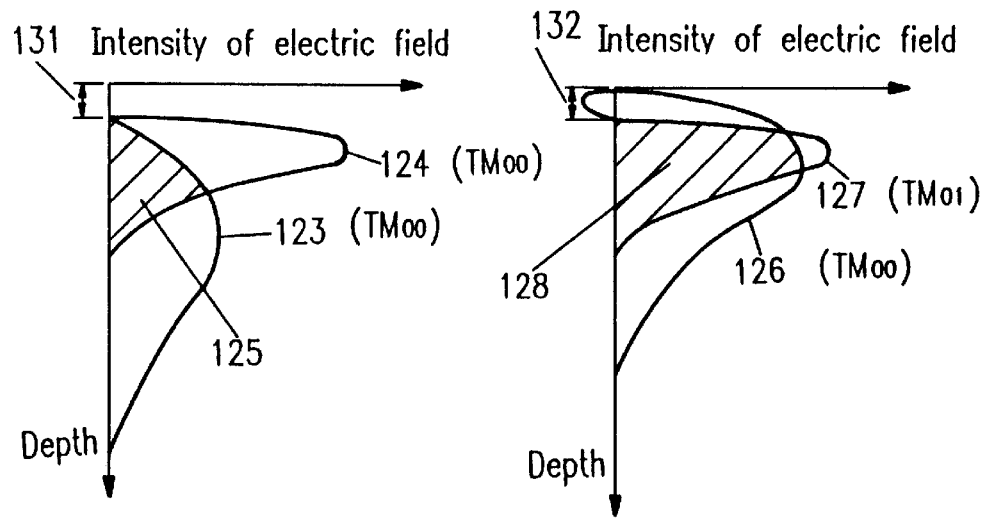
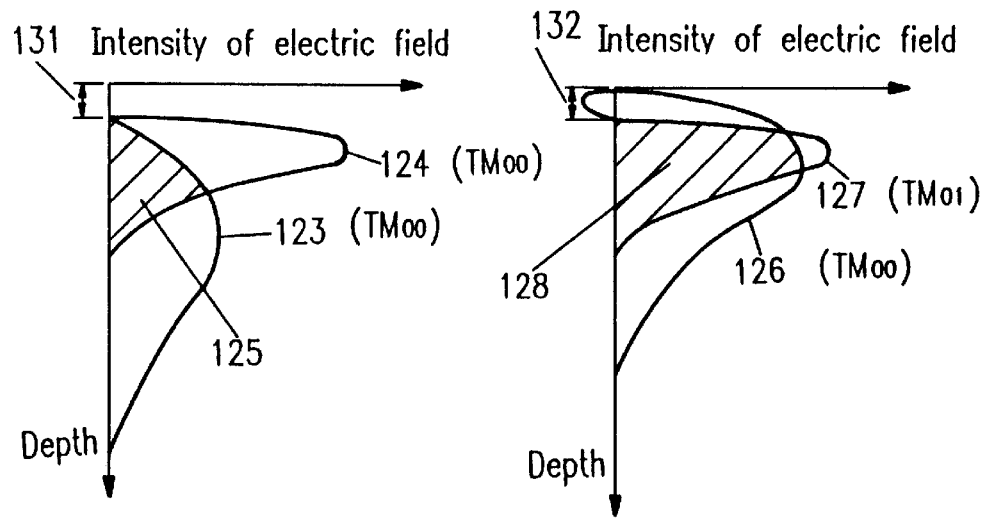

OPTICAL WAVEGUIDE AND OPTICAL WAVELENGTH CONVERSION DEVICE

This application is a division of U.S. patent application Ser. No. 08/773,145, filed Dec. 26, 1996 now U.S. Pat. No. 5,872,884.

BACKGROUND OF THE INVENTION

1. Field of the Invention

The present invention relates to an optical waveguide used for optical information processing and applied optic measurement, which utilize a coherent light source, a wavelength conversion device employing such an optical waveguide, and methods for fabricating the optical waveguide and the wavelength conversion device.

2. Description of the Related Art

An optical waveguide enjoys general uses in a wide range of fields such as communications, optical information processing and optic measurement as an optical wavelength control technique. If the optical waveguide is applied to an optical wavelength conversion device, a small-sized short-wavelength light source capable of converting a wavelength of a laser beam (a fundamental wave) emitted from a semiconductor laser by using the optical wavelength conversion device so as to obtain light having a short wavelength (a second-harmonic wave) is realized. Therefore, active studies have been made on such an optical waveguide.

A buried type optical waveguide has been generally utilized as a conventional optical waveguide. FIGS. 1A to 1D are cross-sectional views illustrating a conventional method for fabricating the buried type optical waveguide through a proton exchange treatment for exchanging proton ions (+H) and a thermal treatment.

More specifically, as shown in FIG. 1A, a Ta (tantalum) layer 12 having a strip-like opening is formed on a surface (+C face) of a LiTaO$_3$ substrate 11. The Ta layer 12 serves to mask the surface of the LiTaO$_2$ substrate 11 except for a predetermined region.

Next, the LiTaO$_3$ substrate 11 masked with the Ta layer 12 is thermally treated with pyrophosphoric acid at a temperature between about 220° C. and about 300° C. As a result, a region 13 which is subjected to a proton exchange treatment (hereinafter, also referred to as "proton-exchanged region") is formed in the vicinity of the surface of the exposed part of the LiTaO$_3$ substrate 11 as shown in FIG. 1B.

Subsequently, the Ta layer 12 is immersed into a mixed solution of hydrofluoric acid and nitric acid at a ratio of 1:2, thereby removing the Ta layer 12 as shown in FIG. 1C.

Thereafter, the LiTaO$_3$ substrate 11 is annealed so as to form an annealed proton-exchanged layer 14 as shown in FIG. 1D. The resulting formed annealed proton-exchanged layer 14 functions as a buried type optical waveguide.

On the other hand, an optical wavelength conversion device employing a ridge type optical waveguide structure in order to enhance a light confinement efficiency is disclosed, for example, in Japanese Laid-Open Patent Publication No. 1-238631.

FIG. 2A shows an example of the structure of a conventional optical wavelength conversion device including such a ridge type optical waveguide 22. As can be appreciated from FIG. 2A, the surface of the optical waveguide 22 formed on a LiNbO$_3$ substrate 21 is processed into a ridge shape. More specifically, as shown in FIG. 2B which is a cross-sectional view taken along a line 2B—2B of FIG. 2A, a portion 22a through which light is guided (that is, a ridge portion) has a thickness d greater than a thickness h of a side portion 22b. As a result of providing a ridge portion serving as the waveguide portion 22a of light for the optical waveguide 22, lateral light confinement is enhanced so as to increase the power density of a fundamental wave within the optical waveguide 22, thereby realizing the improvement of a conversion efficiency from a fundamental wave into a second-harmonic wave.

Furthermore, regarding the structure of the optical wavelength conversion device shown in FIG. 2A, a light input portion 23 for the LiNbO$_3$ substrate 21 is configured so that a thickness of the optical waveguide portion 22 is thicker than that of the other part in the vicinity of an end face 24 from which a fundamental wave P1 enters. As shown in FIG. 2C which is a cross-sectional view taken along a line 2C—2C shown in FIG. 2A, after the fundamental wave P1 entering the LiNbO$_3$ substrate 21 from the end face 24 through the light input portion 23 is subjected to a wavelength conversion into a second-harmonic wave P2, the second-harmonic wave P2 goes out from a light output portion 25 toward the outside of the LiNbO$_3$ substrate 21.

Furthermore, for example, Japanese Laid-Open Patent Publication No. 61-94031 discloses an optical wavelength conversion device utilizing a strip-loaded optical waveguide. FIG. 3 shows an example of the structure of such an optical wavelength conversion device.

More specifically, an optical waveguide 32 is formed on a LiNbO$_3$ substrate 31 by proton exchange. On the optical waveguide 32, a stripe-shaped cladding layer (strip-loaded layer) 33 made of SiO$_2$, having a lower refractive index than that of the optical waveguide 32, is formed. Since the resulting structured strip-loaded optical waveguide has a low loss, an optical wavelength conversion device for converting the fundamental wave P1 into the second-harmonic wave P2 with high efficiency is realized.

In addition, the following method for forming a ridge type waveguide on a LiNbO$_3$ substrate has been reported.

Since LiNbO$_3$ is a mechanically and chemically stable material and is thus hardly etched, the etching selectivity to a resist is small. Therefore, it is generally difficult to deeply etch the surface of a LiNbO$_3$ substrate. However, an etching rate for an LiNbO$_3$ substrate, which is subjected to a proton exchange treatment, is increased to be several times that of an untreated substrate. By utilizing this phenomenon, a method for fabricating a ridge type optical waveguide as follows has been proposed. A LiNbO$_3$ substrate serving as a C plate is thermally treated in an appropriate acid so as to form a proton-exchanged layer thereon. Then, a stripe-shaped Ti protection mask layer is formed on the resulting formed proton-exchanged layer by photolithography. Thereafter, an unmasked region is etched by ECR etching. Then, the Ti protection mask layer is removed. Both end faces of the optical waveguide are optically polished, thereby forming a light input portion and a light output portion.

FIG. 4 shows another structure of an optical wavelength conversion device utilizing a buried type optical waveguide. A proton-exchanged optical waveguide 42 is formed on an LiNbO$_3$ substrate 41. On the proton-exchanged optical waveguide 42, a cladding layer (strip-loaded layer) 43 made of TiO$_2$ having a refractive index higher than that of the optical waveguide 42 is formed. A plurality of domain-inverted layers 44 are formed so as to perpendicularly cross the optical waveguide 42 in a periodic manner. A fundamental wave P1 entering the structure from the light input portion 45 overlaps the domain-inverted layers 44 while propagating through the optical waveguide 42. The fundamental wave P1 is converted into a second-harmonic wave P2, and the second-harmonic wave P2 then goes out from the light output portion 46.

FIGS. 5A and 5B schematically show the overlapping relationship between a guide mode of the optical waveguide 42 and the domain inverted layers 44. FIG. 5A shows the case where the cladding layer (strip-loaded layer) 43 is not provided, while FIG. 5B shows the case where the cladding layer 43 is provided. In each of FIGS. 5A and 5B, a cross-sectional structure of the optical wavelength conversion device is shown on the left, and an electric field distribution of the propagating light in a depth direction of the cross-section of the optical waveguide is shown on the right.

In the configuration shown in FIG. 5A which does not have a cladding layer, merely about half (a hatched area of the electric field distribution shown in FIG. 5A on the right) of propagating light (fundamental wave P1) overlaps the domain-inverted layers 44 to be converted into a harmonic wave. Therefore, the resultant harmonic wave output is not as high as expected. On the other hand, in the configuration shown in FIG. 5B having the cladding layer 43 with a high refractive index on the optical waveguide 42, a major part (a hatched area of the electric field distribution shown in FIG. 5B on the right) of propagating light (fundamental wave P1) overlaps the domain-inverted layers 44. Thus, the optical wavelength conversion device for converting the fundamental wave P1 into the second-harmonic wave P2 at a high efficiency is realized.

When the optical waveguide is used in combination with the optical wavelength conversion device, the degree of overlap between waveguide modes (the fundamental wave and the second-harmonic wave) is an important factor for realizing an optical wavelength conversion device with high efficiency. More specifically, as the degree of overlap between the electric field distribution of the fundamental wave and that of the second-harmonic wave becomes greater, a conversion efficiency of the optical wavelength conversion device increases. In order to increase the degree of overlap between the electric field distribution of the fundamental wave and that of the second-harmonic wave so as to realize an optical wavelength conversion device with high efficiency, a refractive index distribution of the optical waveguide has a stepwise pattern.

With the conventional method for fabricating the buried type optical waveguide through a proton exchange treatment and a thermal treatment as described above, however, the resultant optical waveguide has a graded refractive index distribution. That is, the refractive index becomes maximum in the vicinity of the surface and gradually decreases in a depth direction depending on a thermal diffusion state of the proton. With such a refractive index distribution, it is difficult to realize an optical wavelength conversion device with high efficiency because the electric field distribution of the guided fundamental wave greatly differs from that of the second-harmonic wave. By this conventional method, a refractive index distribution of the optical waveguide cannot be arbitrarily controlled.

Moreover, in a conventional buried type optical waveguide, optical damage tends to occur due to light leakage in the peripheral region of the optical waveguide. Thus, it is difficult to guide light with high power density so as to generate a second-harmonic wave with high output.

In the structure having a cladding layer, a high efficiency is intended to be realized by enhancing the light confinement of the optical waveguide. More specifically, by moving a mode distribution (a fundamental mode) of guided light propagating through the optical waveguide toward the vicinity of the surface by cladding layer, the degree of overlap between domain-inverted regions and a fundamental wave of a fundamental mode or a second-harmonic wave of a fundamental mode is intended to be improved.

Although in the conventional structure, the degree of overlap between the domain-inverted regions and the waveguide mode is increased, the degree of overlap between the fundamental wave and the second-harmonic wave, which has the greatest effect on a conversion efficiency, is not increased. Therefore, an improvement of the conversion efficiency is limited. This results from the limitation of an increase in the degree of overlap between the waveguide modes of the fundamental wave and the harmonic wave because the distributions of the waveguide modes in the optical waveguide greatly differ from each other due to a difference in wavelength.

Furthermore, since the area in which the fundamental wave and the second-harmonic wave does not overlap is large, a second-harmonic wave output may be unstable due to the occurrence of an optical damage.

On the other hand, in a conventional optical wavelength conversion device using a ridge type optical waveguide, the power density is increased by a light confinement effect of the optical waveguide to improve a conversion efficiency. However, an increase in the confinement effect by the ridge type optical waveguide for a fundamental wave is achieved solely in a lateral direction. The confinement effect is not improved in a depth direction. Thus, the degree of overlap between the fundamental wave and the second-harmonic wave, which has the greatest effect on a conversion efficiency, is not achieved with the ridge type structure (particularly, in a depth direction). Therefore, an improvement of the conversion efficiency is limited.

SUMMARY OF THE INVENTION

The optical waveguide of the present invention includes: an optical material; an optical waveguide layer formed in the optical material; and a cladding layer formed on a surface of the optical waveguide layer, wherein the optical waveguide layer is capable of guiding a light beam having a wavelength of $\lambda 1$ and a light beam having a wavelength of $\lambda 2$ ($\lambda 1 > \lambda 2$) therethrough. The refractive index and the cladding layer thickness are determined so as to satisfy a guiding condition for the light beam having the wavelength of $\lambda 2$ and a cutoff condition for the light beam having the wavelength of $\lambda 1$.

In one embodiment of the invention, the optical waveguide layer has a stripe shape.

In another embodiment of the invention, the optical waveguide further includes a high refractive index layer having a refractive index of n1 formed in the vicinity of a surface of the optical material, wherein the optical material has a refractive index of ns, the optical waveguide layer is formed in a vicinity of the surface of the optical material so as to have a stripe shape and has a refractive index of nf, and the refractive indices satisfy the relationship: nf>n1>ns.

In still another embodiment of the invention, the cladding layer has a stripe shape.

In still another embodiment of the invention, the optical waveguide layer has a stripe shape.

In still another embodiment of the invention, a stripe-shaped ridge is formed on the surface of the optical waveguide layer, the cladding layer is formed on the ridge so as to have a stripe shape, and the light beams in the optical waveguide layer are guided through the ridge.

In still another embodiment of the invention, the optical waveguide forms a cylindrical core, and the cladding layer covers a peripheral region of the core.

In still another embodiment of the invention, the light having the wavelength of λ1 propagates in a fundamental mode, and the light having the wavelength of λ2 propagates in a high-order mode.

In still another embodiment of the invention, an effective refractive index Nc of the cladding layer and an effective refractive index Nf of the optical waveguide layer satisfy the relationship: Nc>1.02•Nf.

In still another embodiment of the invention, the cladding layer is made of a multi-layered film.

According to another aspect of the invention, an optical wavelength conversion device includes: a substrate made of a material having a nonlinear optical effect; an optical waveguide layer formed on the substrate; and a cladding layer formed on a surface of the optical waveguide layer, wherein the optical waveguide layer is capable of guiding a fundamental wave having a wavelength of λ and a second-harmonic wave having a wavelength of λ2 therethrough, and the cladding layer increases a degree of overlap between electric field distributions of a fundamental wave in a fundamental mode and a second-harmonic wave in a high-order mode propagating through the optical waveguide layer so as to convert the fundamental wave into the second-harmonic wave.

In one embodiment of the invention, a refractive index and a thickness of the cladding layer are determined so as to satisfy a guiding condition for the second-harmonic wave and a cutoff condition for the fundamental wave.

In another embodiment of the invention, the optical waveguide layer has a stripe shape.

In still another embodiment of the invention, the optical wavelength conversion device further includes a high refractive index layer having a refractive index of n1 formed in a vicinity of a surface of the substrate, wherein the substrate has a refractive index of ns, the optical waveguide layer is formed in the vicinity of the surface of the substrate so as to have a stripe shape and has a refractive index of nf, the refractive indices satisfy the relationship: nf>n1>ns, and the refractive index and the cladding layer thickness are determined so as to satisfy a guiding condition for the second-harmonic wave and a cutoff condition for the fundamental wave.

In still another embodiment of the invention, the cladding layer has a stripe shape, and the refractive index and the cladding layer thickness are determined so as to satisfy a guiding condition for the second-harmonic wave and a cutoff condition for the fundamental wave.

In still another embodiment of the invention, the optical waveguide layer has a stripe shape.

In still another embodiment of the invention, a stripe-shaped ridge is formed on the surface of the optical waveguide layer, the cladding layer is formed on the ridge so as to have a stripe shape, the light beams in the optical waveguide layer are guided through the ridge, and the refractive index and the cladding layer thickness are determined so as to satisfy a guiding condition for the second-harmonic wave and a cutoff condition for the fundamental wave.

In still another embodiment of the invention, the fundamental wave in the fundamental mode and the second-harmonic wave in the high-order mode are phase-matched with each other in the optical waveguide layer.

In still another embodiment of the invention, an effective refractive index Nc of the cladding layer and an effective refractive index Nf of the optical waveguide layer satisfy the relationship: Nc>1.02•Nf.

In still another embodiment of the invention, the cladding layer is made of a multi-layered film.

In still another embodiment of the invention, the order of a mode of the second-harmonic wave propagating through the optical waveguide layer is one order higher than that of a mode allowing propagation of light through the cladding layer.

In still another embodiment of the invention, the cladding layer contains $Nb_2O_5$.

In still another embodiment of the invention, the cladding layer is made of a linear material.

In still another embodiment of the invention, the substrate is made of $LiNb_{1-x}Ta_xO_3$ ($0 \leq x \leq 1$) and has a periodic domain-inverted structure formed therein.

According to still another aspect of the invention, a short-wavelength light generator includes a semiconductor laser and an optical wavelength conversion device, wherein the wavelength of a light beam emitted from the semiconductor laser is converted by the optical wavelength conversion device, and the optical wavelength conversion device is the previously described one.

According to still another aspect of the invention, an optical pickup includes a short-wavelength light generator and a light converging system, wherein a light beam having a short wavelength output from the short-wavelength light generator is converged by the light converging system, and the short-wavelength light generator is the previously described one.

According to still another aspect of the invention, a method for fabricating an optical waveguide, includes the steps of: forming a first ion-exchanged layer in the vicinity of the surface of a substrate made of a nonlinear optical material; forming an annealed ion-exchanged layer by annealing the first ion-exchanged layer; forming a second ion-exchanged layer at a predetermined position of the annealed ion-exchanged layer; forming a resist mask having a predetermined pattern above the second ion-exchanged layer; and removing an unmasked region of the second ion-exchanged layer by etching using the resist mask so as to form a ridge.

In one embodiment of the invention, the step of forming the second ion-exchanged layer includes the steps of: forming a strip-like metal mask on a surface of the annealed ion-exchanged layer; and forming the second ion-exchanged layer on a region of the annealed ion-exchanged layer which is not covered with the metal mask, wherein the resist mask is selectively formed only on the metal mask.

In another embodiment of the invention, the resist pattern is selectively formed only on the metal mask by employing light exposure from a bottom face.

In still another embodiment of the invention, the step of forming the second ion-exchanged layer includes the step of forming the second ion-exchanged layer in a vicinity of the surface of the annealed ion-exchanged layer, wherein the resist mask is formed on the surface of the second ion-exchanged layer so as to have a strip-like shape.

In still another embodiment of the invention, the method for fabricating an optical waveguide further includes the step of forming a dielectric film on a surface of the ridge.

In still another embodiment of the invention, the substrate is a C plate made of $LiNb_{1-x}Ta_xO_3$ ($0 \leq x \leq 1$).

In still another embodiment of the invention, each of the first ion-exchanged layer and the second ion-exchanged layer is a proton-exchanged layer.

According to another aspect of the invention, a method for fabricating an optical wavelength conversion device includes the steps of: forming a first ion-exchanged layer in a vicinity of a surface of a substrate made of a nonlinear optical material; forming an annealed ion-exchanged layer by annealing the first ion-exchanged layer; forming a domain-inverted layer in the substrate; forming a second ion-exchanged layer at a predetermined position of the annealed ion-exchanged layer; forming a resist mask having a predetermined pattern above the second ion-exchanged layer; and removing an unmasked region of the second ion-exchanged layer by etching using the resist mask so as to form a ridge.

In one embodiment of the invention, the step of forming the second ion-exchanged layer includes the steps of: forming a strip-like metal mask on a surface of the annealed ion-exchanged layer; and forming the second ion-exchanged layer on a region of the annealed ion-exchanged layer which is not covered with the metal mask, and wherein the resist mask is selectively formed only on the metal mask.

In another embodiment of the invention, the resist pattern is selectively formed only on the metal mask by employing light exposure from a bottom face.

In still another embodiment of the invention, the step of forming the second ion-exchanged layer includes the step of forming the second ion-exchanged layer in a vicinity of the surface of the annealed ion-exchanged layer, and wherein the resist mask is formed on the surface of the second ion-exchanged layer so as to have a strip-like shape.

In still another embodiment of the invention, the step of forming a dielectric film on a surface of the ridge.

In still another embodiment of the invention, the substrate is a C plate made of $LiNb_{1-x}Ta_xO_3$ ($0 \leq x \leq 1$).

In still another embodiment of the invention, each of the first ion-exchanged layer and the second ion-exchanged layer is a proton-exchanged layer.

According to still another aspect of the invention, an optical waveguide includes: a substrate made of a nonlinear optical material; a first ion-exchanged layer including an optical waveguide region, formed in the vicinity of a surface of the substrate; and a second ion-exchanged layer having an ion exchanged concentration higher than that of the first ion-exchanged layer, formed in the vicinity of the optical waveguide region.

In one embodiment of the invention, the first ion-exchanged layer has a strip-like ridge extending substantially parallel to a light guiding direction, the ridge includes the optical waveguide region, and the second ion-exchanged layer is formed on each side face of the ridge.

In another embodiment of the invention, the second ion-exchanged layer has a strip-like ridge extending substantially parallel to a light guiding direction on a surface of the first ion-exchanged layer.

In still another embodiment of the invention, the substrate is a C plate made of $LiNb_{1-x}Ta_xO_3$ ($0 \leq x \leq 1$).

In still another embodiment of the invention, each of the first ion-exchanged layer and the second ion-exchanged layer is a proton-exchanged layer.

According to still another aspect of the invention, an optical wavelength conversion device includes: a substrate made of a nonlinear optical material; a domain-inverted layer formed with a predetermined period in the substrate; a first ion-exchanged layer including an optical waveguide region, formed in the vicinity of a surface of the substrate; and a second ion-exchanged layer having an ion exchanged concentration higher than that of the first ion-exchanged layer, formed in the vicinity of the optical waveguide region.

In one embodiment of the invention, the first ion-exchanged layer has a strip-like ridge extending substantially parallel to the light guiding direction, the ridge includes the optical waveguide region, and the second ion-exchanged layer is formed on each side face of the ridge.

In another embodiment of the invention, the second ion-exchanged layer has a strip-like ridge extending substantially parallel to the light guiding direction on a surface of the first ion-exchanged layer.

In still another embodiment of the invention, the substrate is a C plate made of $LiNb_{1-x}Ta_xO_3$ ($0 \leq x \leq 1$).

In still another embodiment of the invention, each of the first ion-exchanged layer and the second ion-exchanged layer is a proton-exchanged layer.

Thus, the invention described herein makes possible the advantages of: (1) providing an optical waveguide having a waveguide structure capable of increasing the degree of overlap between a fundamental wave and a second-harmonic wave by controlling a refractive index distribution and having an excellent resistance to optical damage; (2) providing an optical wavelength conversion device employing such an optical waveguide, capable of stably supplying a high-power output of a second-harmonic wave with high efficiency; (3) providing methods for fabricating such an optical waveguide and such an optical wavelength conversion device; and (4) providing a short-wavelength light generating apparatus and a light pickup to be fabricated using such an optical waveguide and an optical wavelength conversion device.

These and other advantages of the present invention will become apparent to those skilled in the art upon reading and understanding the following detailed description with reference to the accompanying figures.

BRIEF DESCRIPTION OF THE DRAWINGS

FIGS. 11A and 11B are cross-sectional views showing structures of optical wavelength conversion devices each having a cladding layer; and FIGS. 11C and 11D are graphs showing electric field strength distributions of guided light in the structures shown in FIGS. 11A and 11B, respectively.

DESCRIPTION OF THE PREFERRED EMBODIMENTS

Hereinafter, the present invention will be described by way of illustrative examples.

The present invention has an objective to increase a conversion efficiency from a fundamental wave into a second-harmonic wave by increasing the degree of overlap between a fundamental wave of a fundamental mode and a second-harmonic wave of a high-order mode utilizing the phase matching therebetween in an optical wavelength conversion device which utilizes occurrence of the second-harmonic wave due to non-linear optical effect.

First, the principle thereof is first described.

Figure 1A:
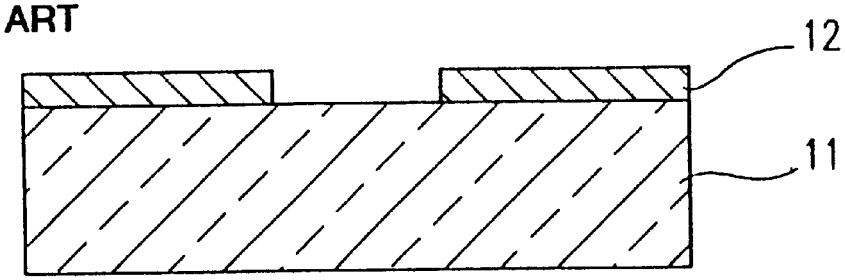
FIGS. 1A to 1D are cross-sectional views showing a method for fabrication of a conventional buried type optical waveguide.
Figure 1B:
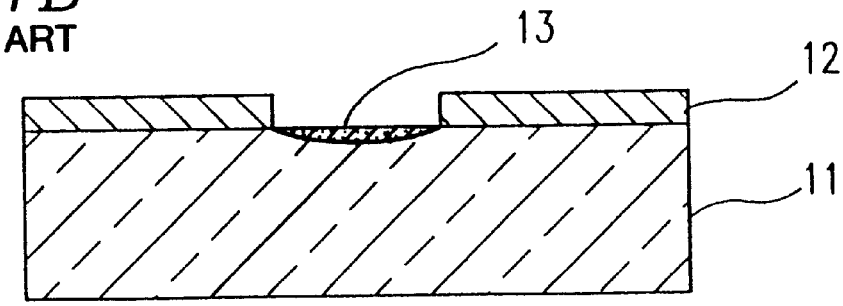
Figure 1C:
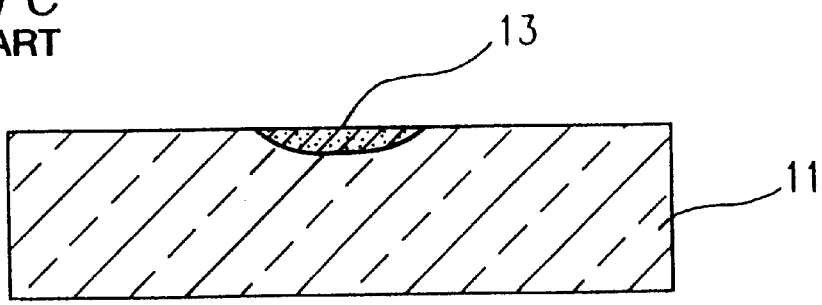
Figure 1D:
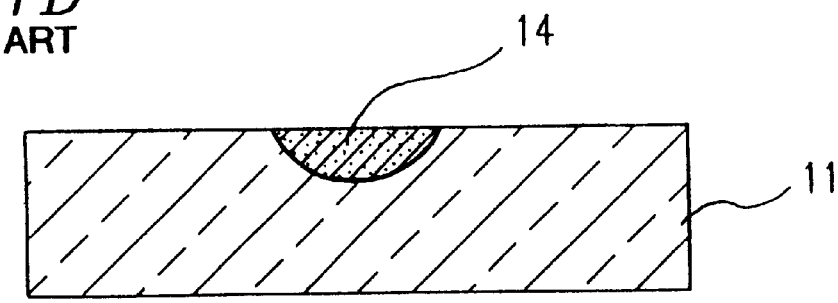
Figure 2A:
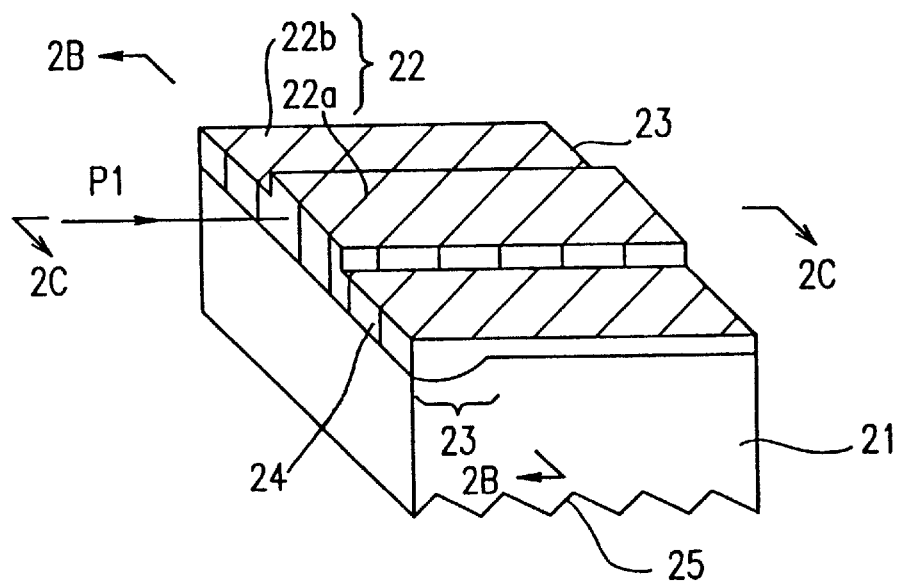
FIG. 2A is a perspective view showing an example of the structure of a conventional optical wavelength conversion device.
Figure 2B:
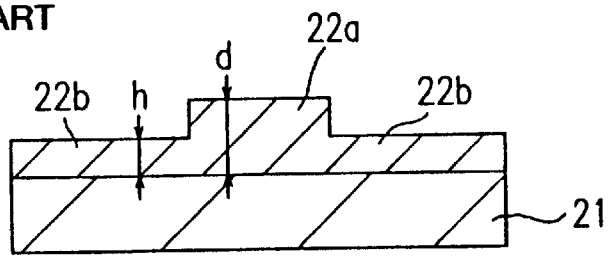
FIG. 2B is a cross-sectional view taken along line 2B—2B in FIG. 2A.
Figure 2C:
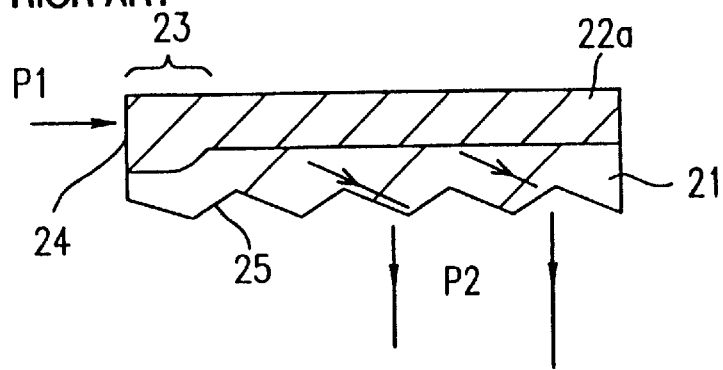
FIG. 2C is a cross-sectional view taken along line 2C—2C in FIG. 2A.
Figure 3:
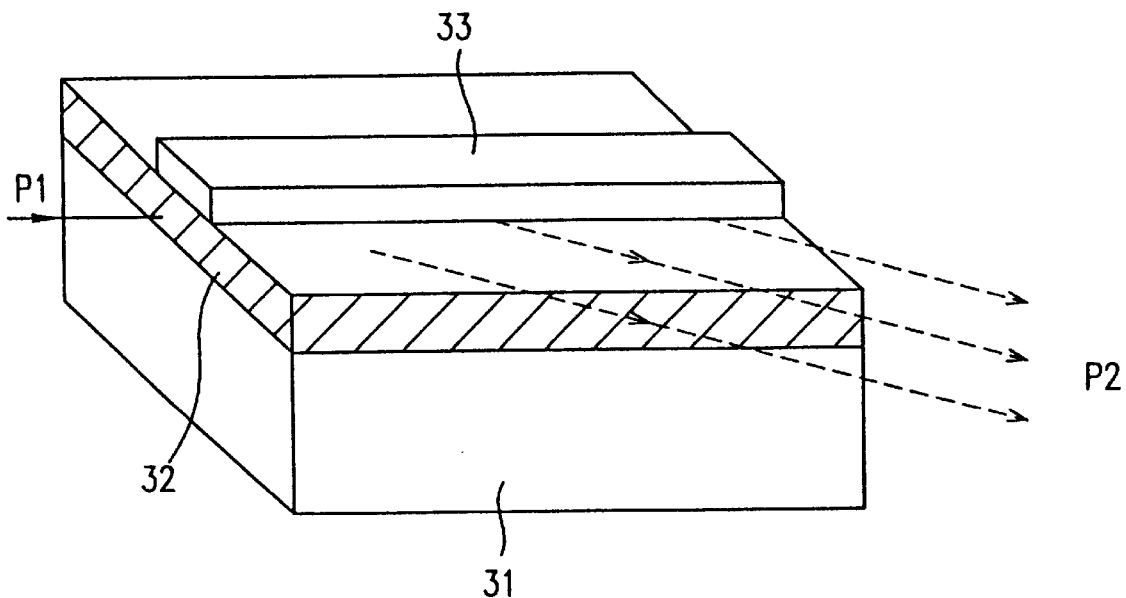
FIG. 3 is a perspective view showing another example of the structure of a conventional optical wavelength conversion device.
Figure 4:
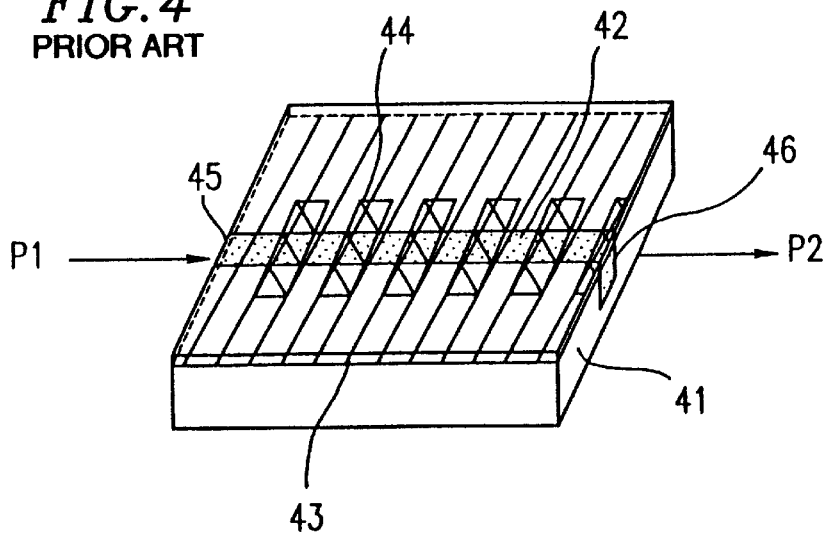
FIG. 4 is a perspective view showing still another example of the structure of a conventional optical wavelength conversion device.
Figure 5A:
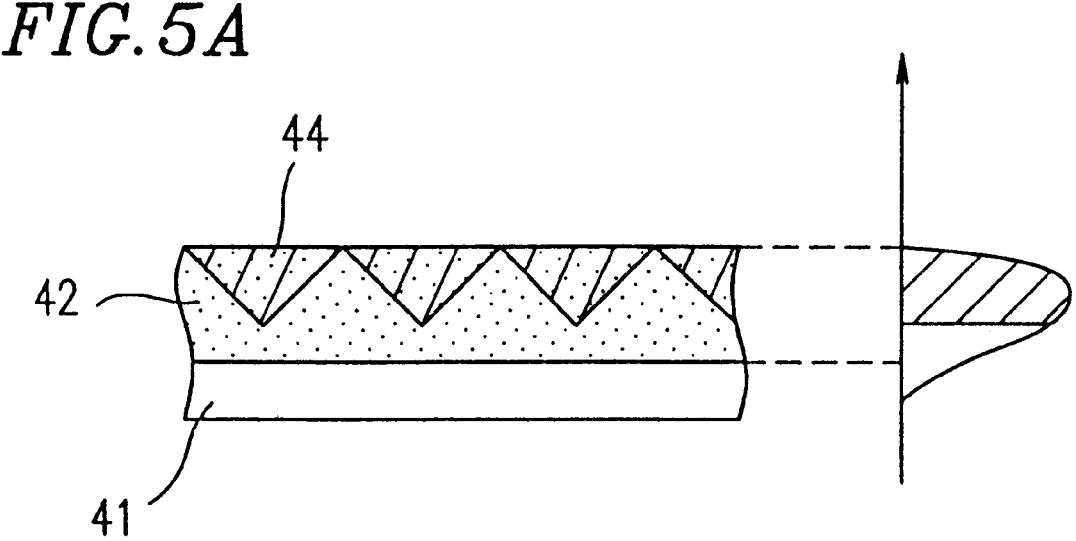
FIGS. 5A and 5B are schematic views showing the overlap between a guide mode of an optical waveguide layer and domain-inverted layers.
Figure 5B:
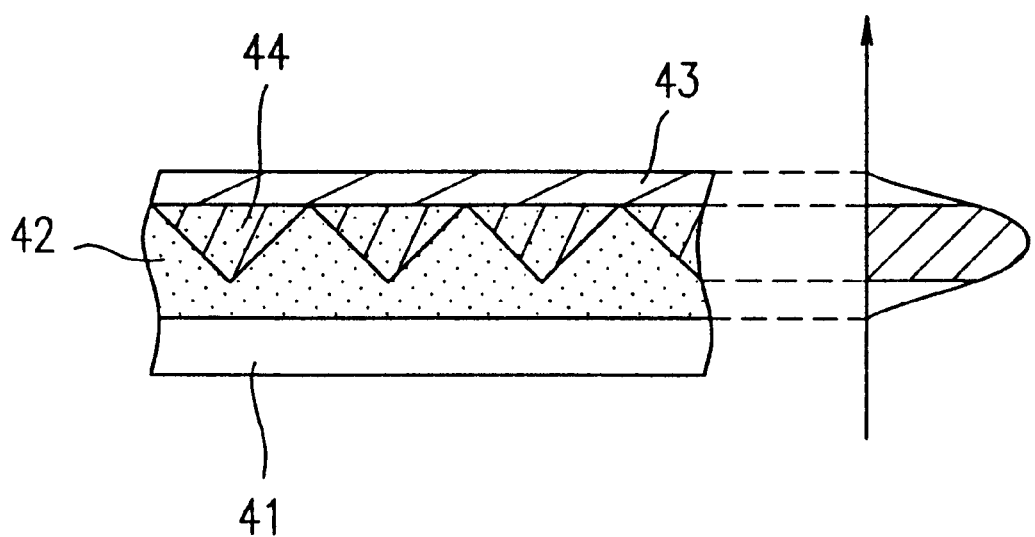
Figure 6A:
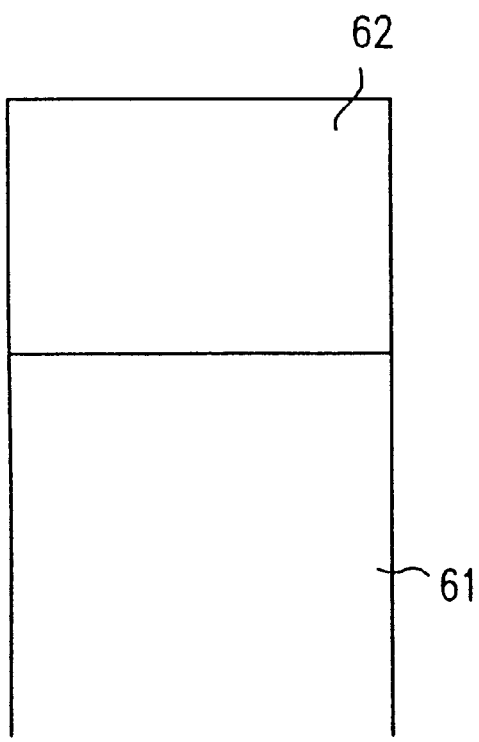
FIG. 6A is a cross-sectional view schematically showing an optical waveguide.
Figure 6B:
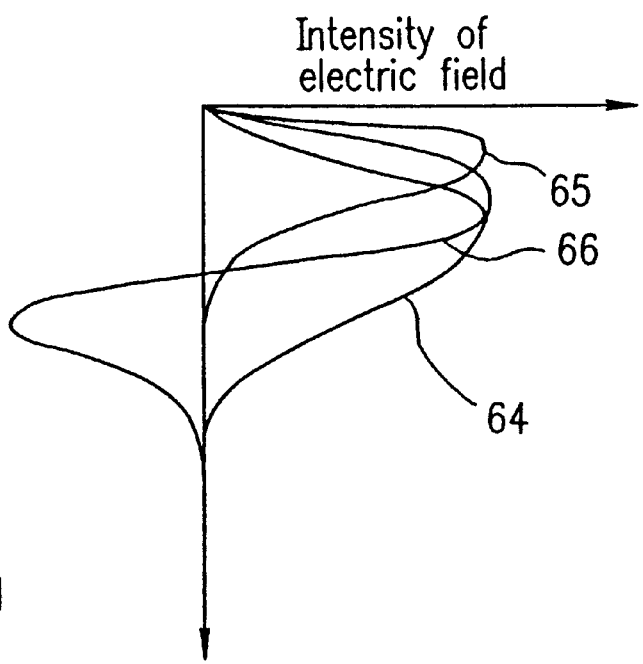
FIG. 6B is a graph showing an electric field distribution of a guide mode in the structure shown in FIG. 6A.

An optical waveguide normally includes a substrate 61 (a refractive index: ns) and an optical waveguide 62 (a refractive index: nf) formed on the substrate 61 as shown in a cross-sectional view of FIG. 6A. The refractive indices satisfy the relation: nf>ns. Electric field distributions of the waveguide modes (a fundamental wave of a fundamental mode 64, a second-harmonic wave of a fundamental mode 65, and a second-harmonic wave of a first-order mode 66) are as shown in FIG. 6B. As can be seen from FIG. 6B, the degree of overlap between the electric field distribution of the fundamental wave and that of the second-harmonic wave is maximum between the fundamental wave of the fundamental mode 64 and the second-harmonic wave of the fundamental mode 65, and decreases as the order of the waveguide mode of the second-harmonic wave becomes higher. Since a conversion efficiency of the optical wavelength conversion device is proportional to the amount of overlap of the waveguide mode, conversion with the highest conversion efficiency can be achieved with phase matching between the fundamental modes having the largest overlap amount.

Next, the case where a cladding layer having a refractive index nc higher than the refractive index nf of the optical waveguide is formed on the optical waveguide will be described.

If the cladding layer having a higher refractive index is provided on the optical waveguide, a mode distribution of the fundamental wave is attracted toward the cladding layer side. Therefore, the fundamental wave is strictly confined in the vicinity of a surface of the device. As a result, intense confinement of the fundamental wave is realized. The conventional optical wavelength conversion device having the cladding layer intends to increase a conversion efficiency by utilizing the intense confinement of the fundamental wave. However, since the fundamental wave and the second-harmonic wave have respectively different wavelengths and their refractive index distributions are present, the waveguide modes have respectively different dispersion characteristics (the second-harmonic wave is more intensely attracted to the cladding layer as compared with the fundamental wave). Therefore, an increase of overlap between the modes is still limited.

In order to solve the problem as described above, the inventors of the present invention have found a novel method for controlling the waveguide mode of the second-harmonic wave utilizing a cladding layer with a high refractive index. The method will be described below in detail.

As previously described, the light confinement effect for the fundamental wave can be enhanced by using a cladding layer having a high refractive index. As the thickness of the cladding layer is increased, the light confinement effect for the fundamental wave is enhanced. At the same time, however, a second-harmonic wave having a shorter wavelength is confined within the cladding layer, thereby significantly lowering the conversion efficiency of the optical wavelength conversion device.

As a result of the analysis of the inventors of the present invention, it has been found that a high-order waveguide mode of the second-harmonic wave has an electric field distribution in the optical waveguide portion and therefore a sufficient overlap with the fundamental wave can be accomplished. This will be described with reference to FIGS. 7A to 7D. In FIGS. 7A to 7D, a cross-sectional structure of the optical wavelength conversion device is shown on the left and an electric field distribution in a depth direction of the cross section of the optical waveguide is shown on the right. FIGS. 7A to 7D show electric field distributions of the waveguide mode in the case where the thickness of the cladding layer is varied in the optical waveguide having the cladding layer with a high refractive index.

Figure 7A:
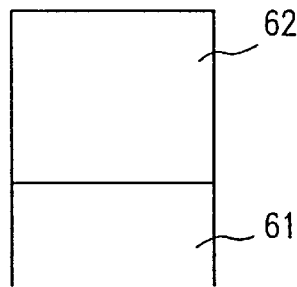
FIGS. 7A to 7D show schematic cross-sections of various structures of optical waveguides and electric field distributions of guide modes in the respective structures.
Figure 7A:
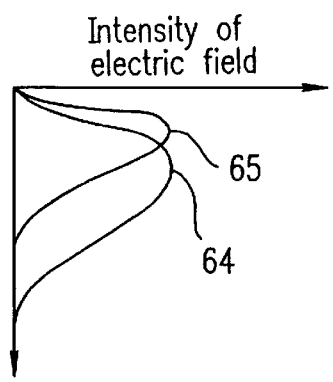

FIG. 7A shows the case where the optical waveguide does not include a cladding layer, as described previously with reference to FIGS. 6A and 6B. The description thereof is herein omitted.

Figure 7B:
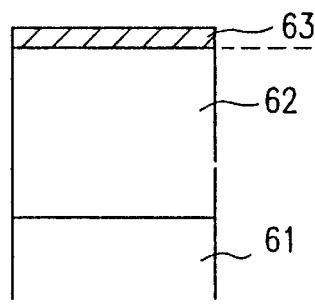
Figure 7B:
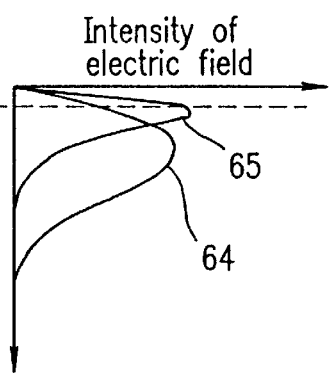

FIG. 7B shows the case where a thin cladding layer 63 is provided on an optical waveguide 62 formed on a substrate 61. The cladding layer 63 satisfies cutoff conditions (that is, conditions such that the light of the waveguide mode confined within the cladding layer 63 is not present) with respect to the zero-th order (fundamental mode) fundamental wave 64 and the zero-th order (fundamental mode) second-harmonic wave 65. Therefore, the zero-th order (fundamental mode) fundamental wave 64 and the zero-th order (fundamental mode) second-harmonic wave 65 cannot only be guided through the cladding layer 63, but also propagates through the optical waveguide 62. The electric field distributions of the zero-th order (fundamental mode) fundamental wave 64 and the zero-th order (fundamental mode) second-harmonic wave 65 are attracted to the vicinity of the surface of the optical wavelength conversion device.

Figure 7C:
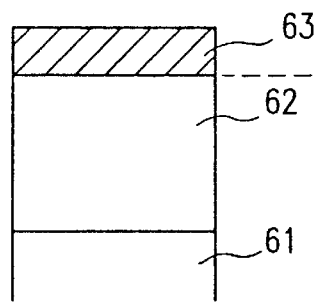
Figure 7C:
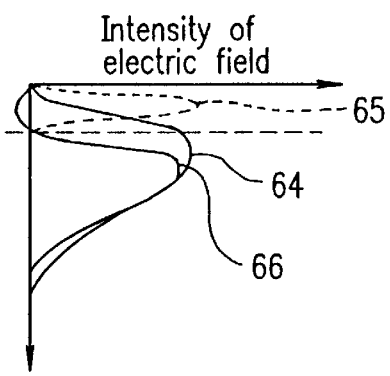

FIG. 7C shows the case where the cladding layer 63 thicker than that of FIG. 7B is provided. In this case, while the cladding layer 63 satisfies the cutoff conditions with respect to the fundamental wave, only the lower order mode (the fundamental mode in this case) second-harmonic wave can propagate therethrough. The light confinement effect is enhanced as compared with the structure shown in FIG. 7B. However, since the fundamental mode second-harmonic wave 65 is confined within the cladding layer 63, a conversion efficiency from the fundamental wave into the fundamental mode second-harmonic wave is significantly lowered. On the other hand, the largest part of the second-harmonic wave of the mode one order higher (in this case, a first-order mode 66) than that of the second-harmonic wave propagating in the cladding layer 63 (in this case, the zero-th mode 65) propagates through the optical waveguide 62.

In this case, the electric field distribution of the first-order mode second-harmonic wave 66 within the optical waveguide 62 is almost the same as that of the fundamental mode second-harmonic wave 65 obtained in the structure without the cladding layer as shown in FIG. 7A. On the other hand, the zero-th order fundamental wave 64 is intensely attracted to the cladding layer 63. More specifically, while the fundamental mode (zero-th order) fundamental wave 64 is significantly confined, the higher-order mode second-harmonic wave (for example, the first order second-harmonic wave 66) scarcely changes from that of the structure which does not have the cladding layer 63. Thus, the degree of overlap between the fundamental mode fundamental wave and the higher-order mode second-harmonic wave can be remarkably increased, therefore the conversion efficiency can be remarkably improved accordingly.

Figure 7D:
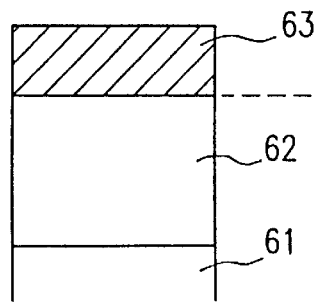
Figure 7D:
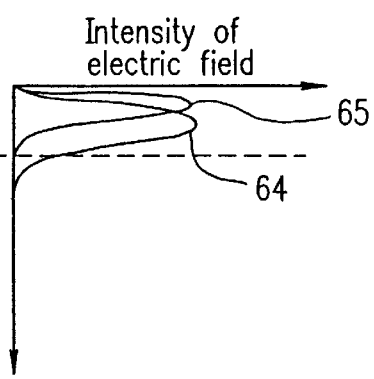

FIG. 7D shows the case where the cladding layer 63 is thicker than the cladding layer 63 of FIG. 7C which is provided so that the zero-th order fundamental wave 64 is allowed to propagate through the cladding layer 63. However, since the fundamental wave is allowed to propagate through the cladding layer 63, the degree of overlap between the fundamental wave and the second-harmonic wave within the optical waveguide 62 is significantly reduced. As a result, the conversion efficiency is remarkably lowered.

As described above, as a result of the examination by the inventors of the present invention, it is found that the degree of overlap between the fundamental mode (zero-th order) fundamental wave 64 and the higher order mode (first order) second-harmonic wave 66 is increased in the case where the optical waveguide 62 with the cladding layer 63 of a high refractive index has the structure shown in FIG. 7C. As a result, wavelength conversion can be performed with a high efficiency.

However, in order to realize the structure shown in FIG. 7C, several conditions are required to be satisfied.

First, the cladding layer 63 should have a thickness and a refractive index satisfying the cutoff conditions with respect to the fundamental wave so that the fundamental wave cannot be guided through the cladding layer 63. The state where the cladding layer 63 satisfies the guiding conditions with respect to the fundamental wave corresponds to the structure of FIG. 7D, in which the fundamental wave can be guided through the cladding layer 63. In such a case, a wavelength conversion with a high efficiency cannot be achieved.

Second, as shown in FIG. 7C, a higher-order mode second-harmonic wave having an electric field distribution peak at the waveguide portion should be guided as the waveguide mode for the second-harmonic wave (because it is the overlap between the electric field of the fundamental wave and that of the second-harmonic wave within the optical waveguide that contributes to the wavelength conversion from the fundamental wave into the second-harmonic wave). In order to satisfy the condition, it is necessary to satisfy the guiding conditions for the second-harmonic wave in the cladding layer and to selectively guide the second-harmonic wave of the guide mode one order higher than that of the guide mode which is allowed to be guided through the cladding layer 63. In the case of FIG. 7C, the guiding mode of the second-harmonic wave allowed to be guided through the cladding layer 63 is the fundamental mode (zero-th mode) 65, and the guiding mode having the peak in the optical waveguide 62 is the first-order mode 66.

Accordingly, in order to realize a high-efficient optical wavelength conversion device in which a cladding layer 63 with a high refractive index is provided on an optical waveguide 62, a thickness and a refractive index of the cladding layer 63 are required to be set so that the cladding layer satisfies the cut-off condition with respect to the fundamental wave and the guiding condition with respect to the second-harmonic wave.

Third, in order to enhance the efficiency of the wavelength conversion, it is necessary to set an electric field distribution of the higher-order mode second-harmonic wave 66 within the optical waveguide 62 so as to be sufficiently greater than that in the cladding layer 63 in the state shown in FIG. 7C. More specifically, the electric field distribution of the cladding layer 63 is required to be reduced as small as possible.

Figure 8:
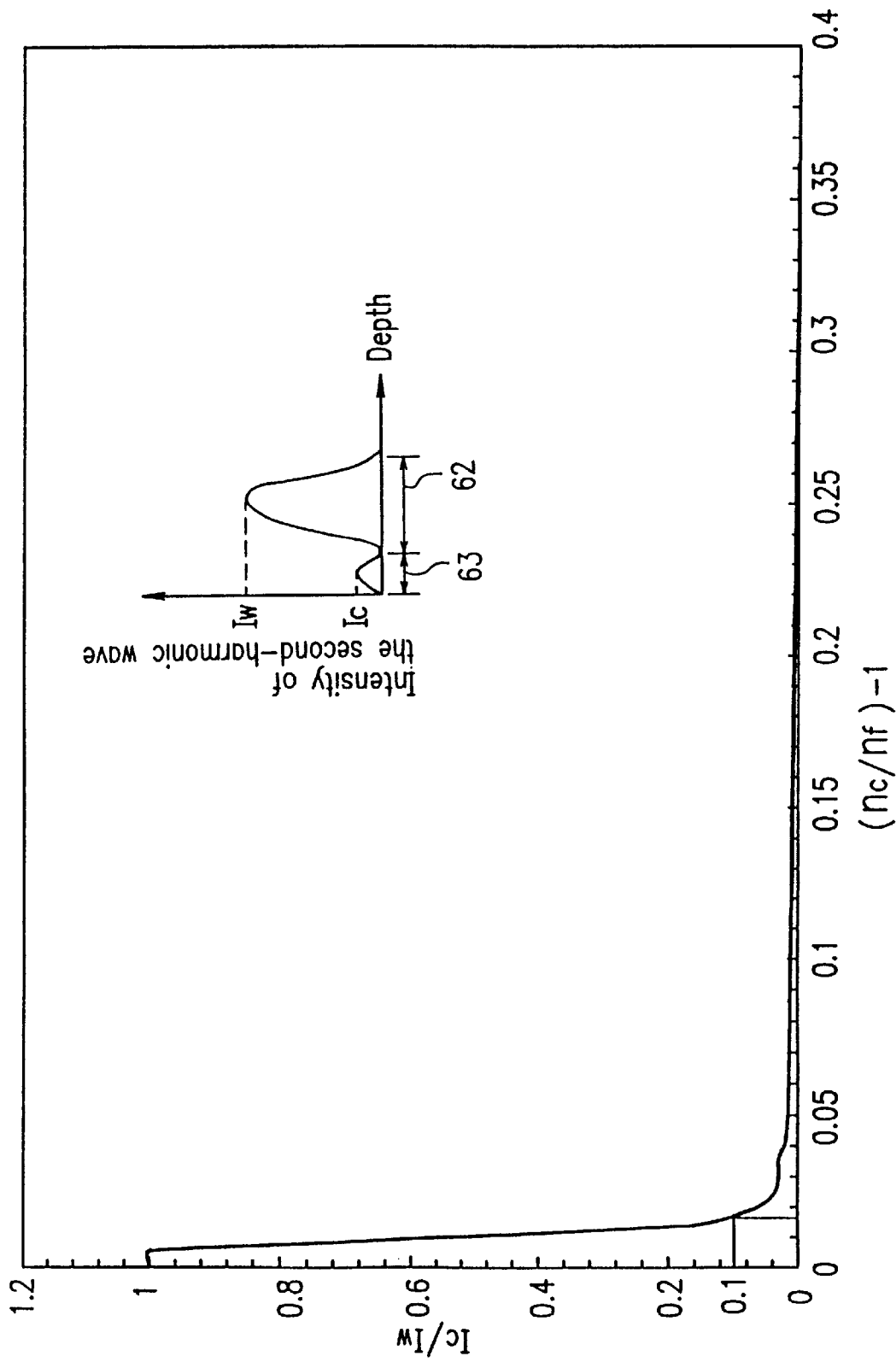
FIG. 8 is a graph showing the relationship of a ratio of a refractive index in a cladding layer and that in an optical waveguide layer and a ratio of intensity of a second-harmonic wave in a cladding layer and in an optical waveguide layer.

The relationship between a ratio (nc/nf) of a refractive index nc of the cladding layer 63 to a refractive index nf of the optical waveguide 62 and a ratio (Ic/Iw) of a peak value Ic of a second-harmonic wave intensity in the cladding layer 63 to a peak value Iw of a second-harmonic wave intensity in the optical waveguide 62 is shown in FIG. 8. The ratio of the second-harmonic wave intensity in the cladding layer to that in the optical waveguide is inversely proportional to the ratio of the refractive indices thereof (that is, the electric field distribution of the second-harmonic wave in the cladding layer 63 is reduced as the refractive index of the cladding layer 63 is increased with respect to that of the optical waveguide 62).

In order to increase the output efficiency of the second-harmonic wave while setting the electric field intensity in the cladding layer 63 so as to be one-tenth or less of that of the optical waveguide 62, it is sufficient to set the refractive index nc of the cladding layer 63 and the refractive index nf of the optical waveguide 62 so as to satisfy the relationship: nc>1.02 nf. Although the second-harmonic wave in the sub-peak area results in a loss, when the output second-harmonic wave is converged, the deterioration of output characteristics due to the presence of a sub-peak is not observed. Thus, light converging characteristics up to a diffraction limit can be realized.

Although the case where a single cladding layer is provided is described herein, the same effect can be obtained even in the case where the cladding layer includes a plurality of layers. If such a multi-layered cladding layer is employed, it is possible to control a refractive index distribution of the cladding layer. Thus, the degree of freedom for the device design is increased, thereby allowing fabrication of the device with a high fabrication tolerance.

Moreover, it is desirable that the cladding layer is made of a linear material which does not have a nonlinear effect. If the cladding layer is made of a nonlinear material, wavelength conversion occurs in the cladding layer, which may result in a loss of the conversion into the second-harmonic wave in the optical waveguide.

If the structure of the present invention is applied to a three-dimensional waveguide, an electric field distribution in a lateral direction of the optical waveguide is greatly affected. More specifically, by depositing a cladding layer with a high refractive index on the optical waveguide, an effective refractive index with respect to the second-harmonic wave and the fundamental wave is increased. Therefore, the confinement effect for an electric field distribution in a lateral direction is remarkably increased both for the fundamental wave and the second-harmonic wave. As a result, the power density of light and the degree of overlap in a lateral direction are increased, thereby improving the conversion efficiency.

According to the present invention, the guide mode of the second-harmonic wave propagating through the optical waveguide can be uniquely selected by selecting a wavelength of the fundamental wave. Thus, the phase matching between the fundamental wave and the second-harmonic wave of the higher-order mode can be selectively conducted with a large degree of overlap, thereby allowing the wavelength conversion with a high efficiency.

Furthermore, the present inventors found that the above waveguide structure is remarkably effective for improving a resistance against optical damage.

Optical damage results from an internal electric field which is caused by an impurity in the crystal being excited by short-wavelength light (the second-harmonic wave). If the fundamental wave intervenes, the level for trapping the impurity is excited. As a result, the internal electric field due to the optical damage tends to be fixed. The occurrence of this phenomenon is remarkable in the vicinity of the electric field distribution of the second-harmonic wave where the fundamental wave alone is present. By employing the structure of the present invention, however, as a result of an increased degree of overlap between the fundamental wave and the second-harmonic wave in the optical waveguide, an area of the electric field in which the second-harmonic wave and the fundamental wave do not overlap each other is reduced. Thus, the occurrence of optical damage is remarkably reduced.

The optical waveguide structure as described above is effective not only for the optical wavelength conversion device but also for the optical waveguide for simultaneously guiding two or more light beams having different wavelengths. Such an optical waveguide structure is effective to increase the degree of overlap between light beams having different wavelengths propagating through the optical waveguide and the interaction therebetween.

Furthermore, since a light distribution is attracted to the vicinity of the surface, it is possible to enhance the effect of the device integrated on the optical waveguide such as an electrode on guided light. Thus, it is possible to configure an optical integrated circuit device with a high efficiency.

Next, examples of the present invention will be described using a specific device structure by way of the optical wavelength conversion device of the present invention.

The device structure of the present invention includes, for example, at least the following three structures.

1) A device structure using a strip-loaded optical waveguide including: a high refractive index layer on the surface of a crystal layer having periodic domain-inverted layers; and a stripe-shaped cladding layer on the high refractive index layer.

2) A device structure using a strip-loaded ridge type optical waveguide including: a high refractive index layer processed so as to have a stripe-shaped ridge on the surface of a crystal layer having periodic domain-inverted layers; and a cladding layer formed on the surface of the ridge.

3) A device structure using a buried type optical waveguide including: a stripe-shaped high refractive index layer on the surface of the crystal layer having periodic domain-inverted layers; and a cladding layer on the surface of the crystal layer.

Example 1

In Example 1, the characteristics of an optical wavelength conversion device using a strip-loaded optical waveguide will be described.

Figure 9A:
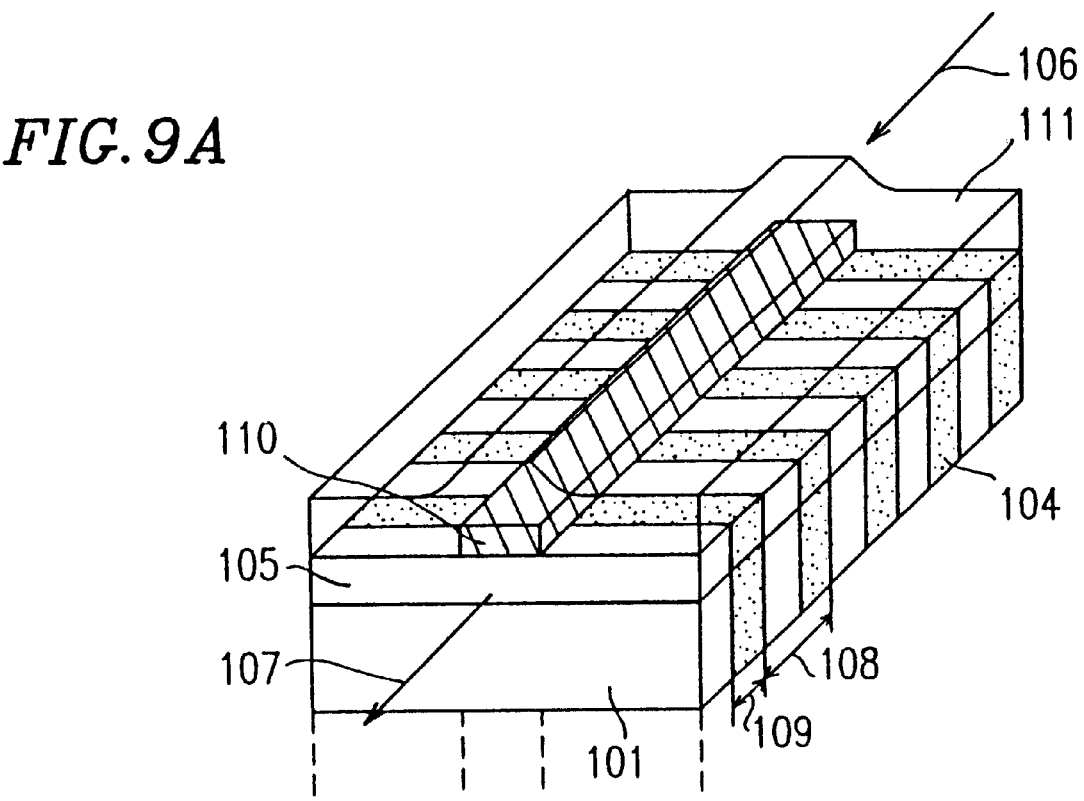
FIGS. 9A and 9B are schematic views showing the structure of an optical wavelength conversion device in Example 1 according to the present invention.
Figure 9B:
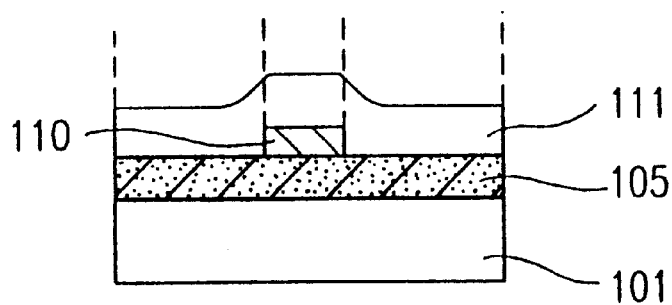

FIG. 9 shows the structure of the optical wavelength conversion device of this example; specifically, FIG. 9A is a perspective view, and FIG. 9B is a cross-sectional view.

As shown in FIG. 9A, a C plate of LiTaO$_3$ crystal substrate 101 (containing a top face and bottom face both perpendicular to a C axis of the crystal) includes domain-inverted layers 104 having a period of Λ equal to about 3.5 µm formed therein. The period Λ is indicated with reference numeral 108 in FIG. 9A. A width W of the domain-inverted layer 104 is about 1.7 µm. The width W is indicated with reference numeral 109 in FIG. 9A.

Furthermore, a proton-exchanged layer 105 having a depth of about 2 µm and a stripe-shaped Nb$_2$O$_5$ cladding layer 110 are formed on the surface of the LiTaO$_3$ crystal substrate 101. The surface of the LiTaO$_3$ crystal substrate 101 including the Nb$_2$O$_5$ cladding layer 110 is covered with a cover layer 111 made of SiO$_2$.

A fundamental wave 106 having a wavelength of about 850 nm entering from an end face of the device propagates through the proton-exchanged layer 105, and is converted into a second-harmonic wave 107 having a wavelength of about 425 nm.

Unlike the conventional structure, the cladding layer 110 is made of Nb$_2$O$_5$ and has a higher refractive index than that of the substrate 101 in the structure of FIG. 9 (with respect to a wavelength of about 800 nm, Nb$_2$O$_5$ has a refractive index of about 2.25 and LiTaO$_3$ has a refractive index of about 2.15). A thickness of the cladding layer 110 is set at about 300 nm so that the fundamental wave propagating through the optical wave is not confined within the cladding layer.

The fundamental wave 106 having a wavelength of about 850 nm propagates through the device in a fundamental mode (TM00 mode), while the second-harmonic wave 107 propagates through the device in a high-order mode (TM01 mode), that is, in a first-order mode in a depth direction and a zero-th order mode in a width direction. By selecting a wavelength of the fundamental wave 106 with respect to a domain-inverted period, the specific guide mode (TM01) of the second-harmonic wave 107 is selectively oscillated. Unlike the conventional structure, the fundamental wave propagates in a fundamental mode and the second-harmonic wave propagates in a higher-order mode, so that the degree of overlap between the fundamental wave and the second-harmonic wave is increased to improve a conversion efficiency.

Next, the principle of improvement of a conversion efficiency by increasing the degree of overlap between the fundamental wave and the second-harmonic wave in the optical wavelength conversion device structure of Example 1 will be described.

Figure 10:
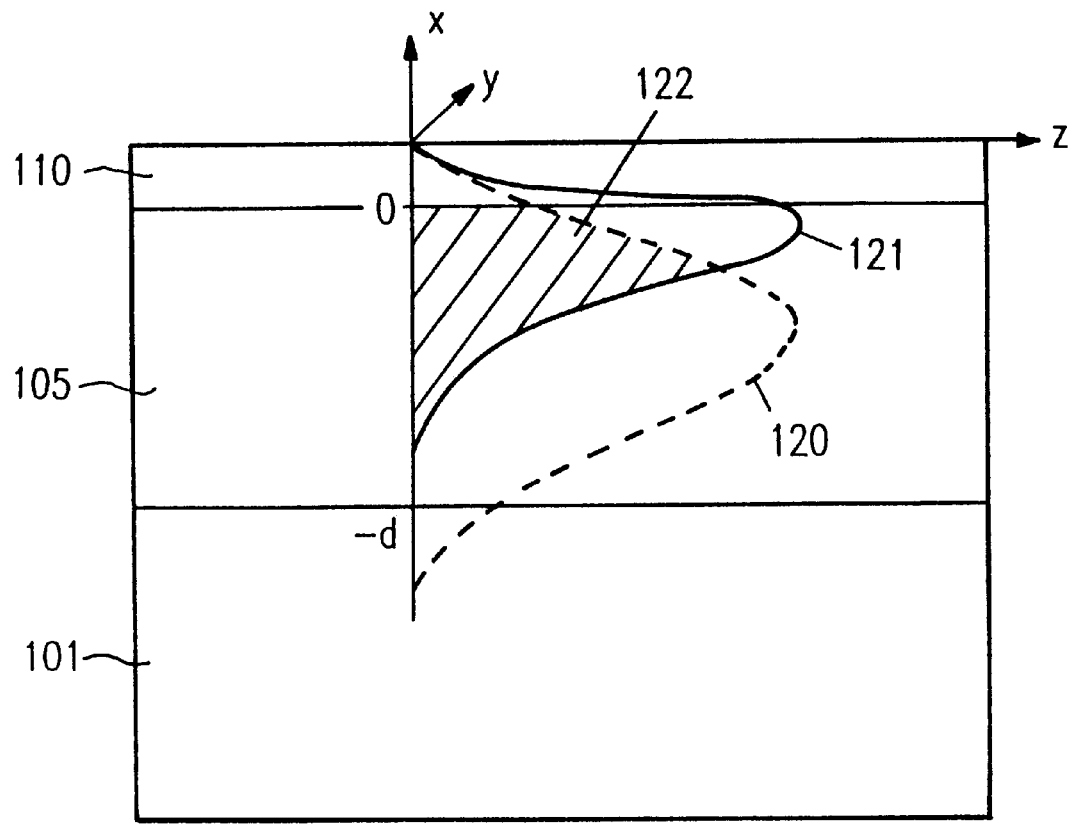
FIG. 10 is a graph showing the overlap between a fundamental wave and a second-harmonic wave.

In the optical wavelength conversion device in which a cladding layer 110 is formed on the optical waveguide layer (the proton-exchanged layer) 105 provided on the substrate 101 as described above, an efficiency for converting the fundamental wave into the second-harmonic wave greatly depends on the degree of overlap between the fundamental wave and the second-harmonic wave. The overlap is represented by a hatched overlapping region 122 between the electric field (Ew) distribution 120 of the fundamental wave and the electric field (E2w) distribution 121 of the second-harmonic wave (in a nonlinear material) as shown in FIG. 10.

In the conventional optical waveguide (see FIG. 11A) having a cladding layer 131 of a refractive index lower than that of the substrate 101 (a Ta$_2$O$_5$ film is described as an example in this case; refractive index n=2.0) or the conventional buried type optical waveguide, as shown in FIG. 11C, the maximum degree of overlap 125 is obtained between a fundamental wave 123 of the fundamental mode (TM00 mode) and a second-harmonic wave 124 of the fundamental mode (TM00 mode). However, the degree of overlap 125 in a depth direction is limited due to wavelength dispersion characteristics of the fundamental wave 123 and the second-harmonic wave 124.

FIG. 11D shows electric field distributions of guided light in the optical wavelength conversion device of the present invention, which has a cladding layer 132 of a refractive index higher than that of the substrate 101 (a Nb$_2$O$_5$ film is described as an example in this case; refractive index n=2.25) as illustrated in FIG. 11B. A fundamental wave 126 (TM00 mode) is more intensely confined by the cladding layer 132 having a high refractive index. As a result, an electric field distribution of the fundamental wave 126 is attracted to the vicinity of a surface of the device. On the other hand, by selecting a TM01 mode for a second-harmonic wave 127, the second-harmonic wave 127 has almost the same electric field distribution as that of the second-harmonic wave 124 in a TM00 mode shown in FIG. 11C, and the overlap 128 significantly increases as compared with the overlap 125 in FIG. 11C. As a result, a wavelength conversion efficiency of the optical wavelength conversion device of the present invention can be increased to be doubled or more as compared with the conventional strip-loaded optical wavelength conversion device.

Moreover, as shown in FIG. 11D, an area of the electric field distribution of the second-harmonic wave (TM01 mode) 127 present in the cladding layer 132 can be remarkably reduced. As a result, the electric field distribution, which is almost the same as that in a TM00 mode second-harmonic wave 124 shown in FIG. 11C, can be obtained.

The beam pattern of the second-harmonic wave output, obtainable by the wavelength conversion device of the present invention, is scarcely different from that of the second-harmonic wave output of the fundamental mode propagating through the conventional buried type optical waveguide, and it exhibits wave front characteristics capable of being converted up to the vicinity of a diffraction limit.

The present inventors also studied in the structure of FIG. 11B with respect to the generation of the second-harmonic wave of the TM00 mode. However, since the second-harmonic wave of the TM00 mode is confined within the cladding layer 132, the degree of overlap with the fundamental wave is significantly lowered. Thus, with the structure of the present invention, the degree of overlap of the electric field distributions between the fundamental wave in the TM00 mode and the second-harmonic wave in the higher-order mode is remarkably increased.

Next, a method for fabricating the optical wavelength conversion device of Example 1 will be described with reference to FIGS. 12A to 12D.

Figure 12A:
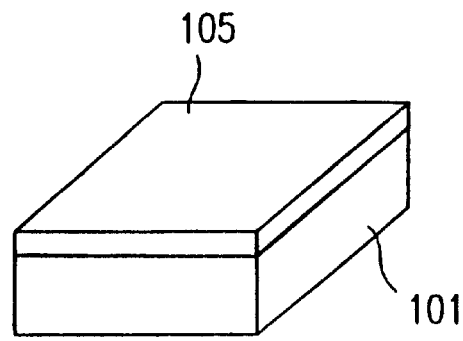
FIGS. 12A to 12D are cross-sectional views showing the fabrication steps of the optical wavelength conversion device of Example 1 according to the present invention.

As shown in FIG. 12A, the proton-exchanged layer 105 functioning as an optical waveguide is formed on the surface of the +C plate $LiTaO_3$ substrate 101. Specifically, after being thermally treated in pyrophosphoric acid for about 14 minutes at about 260° C., the $LiTaO_3$ substrate 101 is annealed for about 8 minutes at about 420° C. to form the optical waveguide (proton-exchanged layer) 105.

Figure 12B:
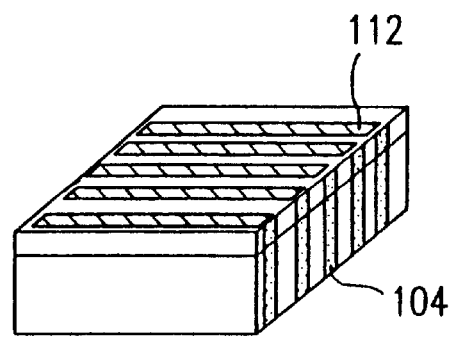

Next, a comb-shaped electrode 112 is formed on a +C face of the substrate 101 (on a surface of the proton-exchanged layer 105), and a planar electrode (not shown) is formed on a −C face of the substrate 101. A high pulse voltage (about 21 kV/mm) is applied between the comb-shaped electrode 112 and the planar electrode so as to form periodic domain-inverted layers 104 as shown in FIG. 12B.

Figure 12C:
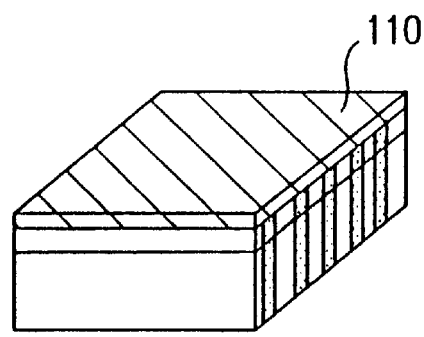
Figure 12D:
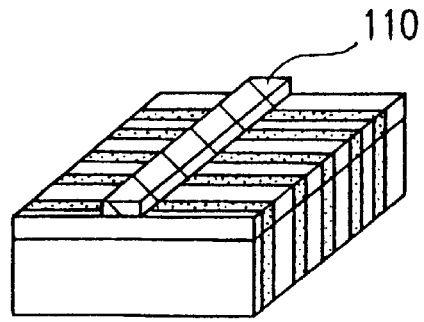

After removing the electrodes, a $Nb_2O_5$ film 110 having a thickness of about 300 nm is deposited on the +C face of the substrate 101 by sputtering as shown in FIG. 12C. A stripe-shaped mask pattern (not shown) is formed on the $Nb_2O_5$ film 110 by photolithography. Then, the $Nb_2O_5$ film 110 is subjected to dry etching in a $CHF_3$ gas atmosphere for processing the $Nb_2O_5$ film 110 into a striped-shape as shown in FIG. 12D.

A waveform of the applied voltage is importance in a domain-inversion formation process by applying an electric field as described above. In order to form domain inverted layers 104 with a short-period in the $LiTaO_3$ substrate 101, it is necessary to apply a voltage waveform which is obtained by superimposing a pulse voltage on a bias voltage equal to or lower than an inversion voltage (at which a domain inversion occurs, for example, about 21 kV/mm in $LiTaO_3$). In this case, the sum of the bias voltage and the pulse voltage should be the inversion voltage or higher.

Moreover, a bias voltage is continually applied after the application of the combined voltage stops in the above process, and the present inventors have found that a time period (Tb) for applying the bias voltage in such a manner affects the uniformity of shape of the resultant domain inverted layers. In the case where Tb is about 2 seconds or less, the periodic structure of the resultant domain inverted layers 104 becomes nonuniform. In order to obtain a uniform periodic structure of the domain inverted layers 104, Tb should be about 3 seconds or more. If Tb is about 5 seconds or more, domain-inverted layer with high uniformity is formed. As a result, an optical wavelength conversion device with high efficiency can be fabricated.

A guide mode of light propagating through the optical waveguide and optical wavelength conversion device characteristics will be described in detail.

Figure 13:
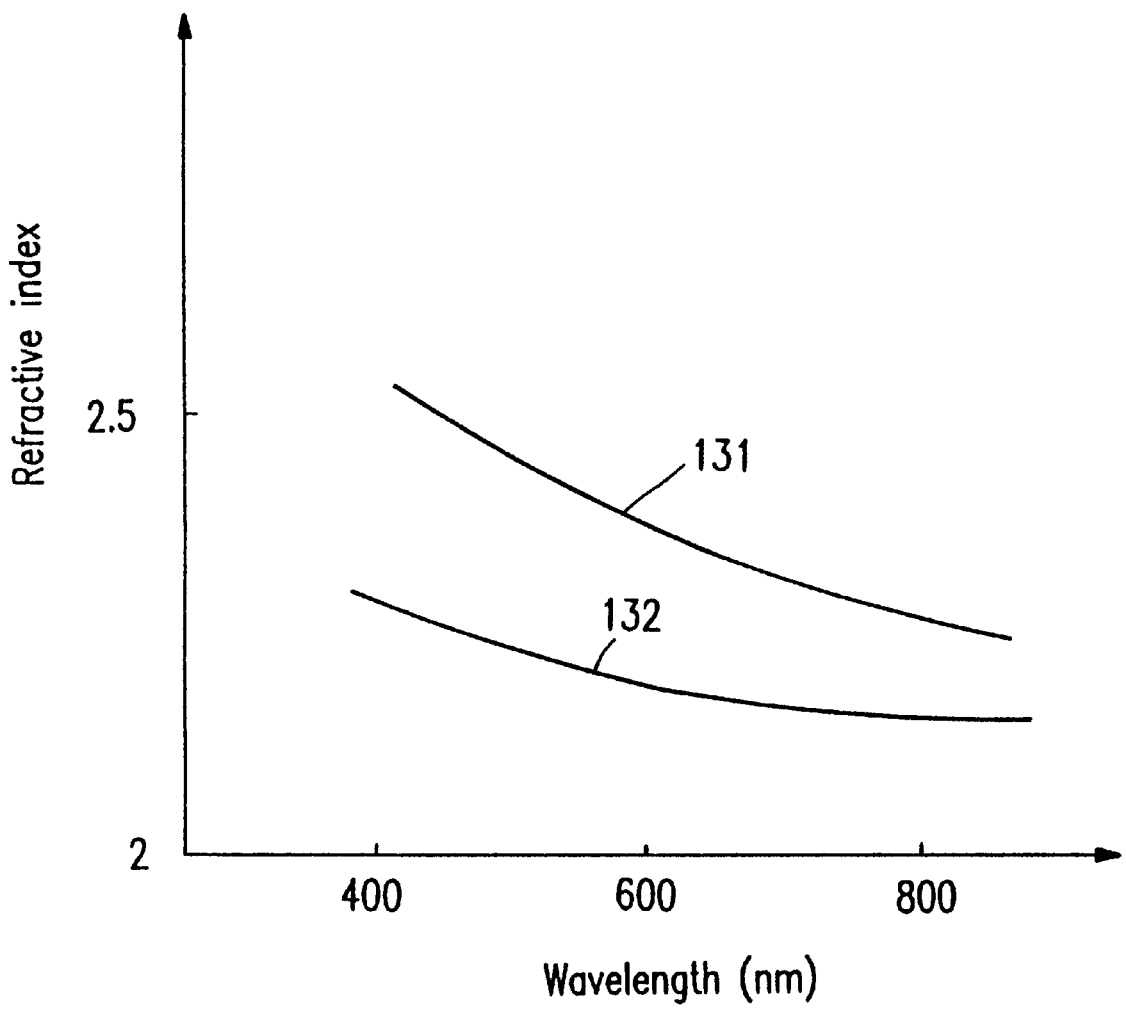
FIG. 13 is a graph showing refractive index distribution characteristics of $LiTaO_3$ and $Nb_2O_5$.

In order to analyze the guide characteristics of the optical waveguide having a $Nb_2O_5$ cladding layer, refractive index dispersion characteristics are measured. The result is shown in the graph of FIG. 13. FIG. 13 shows a refractive index dispersion 132 of the $LiTaO_3$ substrate and a refractive index dispersion 131 of the $Nb_2O_5$ cladding layer.

As can be seen in FIG. 13, a refractive index difference between the $LiTaO_3$ substrate and the $Nb_2O_5$ cladding layer varies depending on a wavelength. A difference at a 400 nm wavelength band corresponding to the second-harmonic wave is greater than that at a 800 nm wavelength band corresponding to the fundamental wave.

Figure 14:
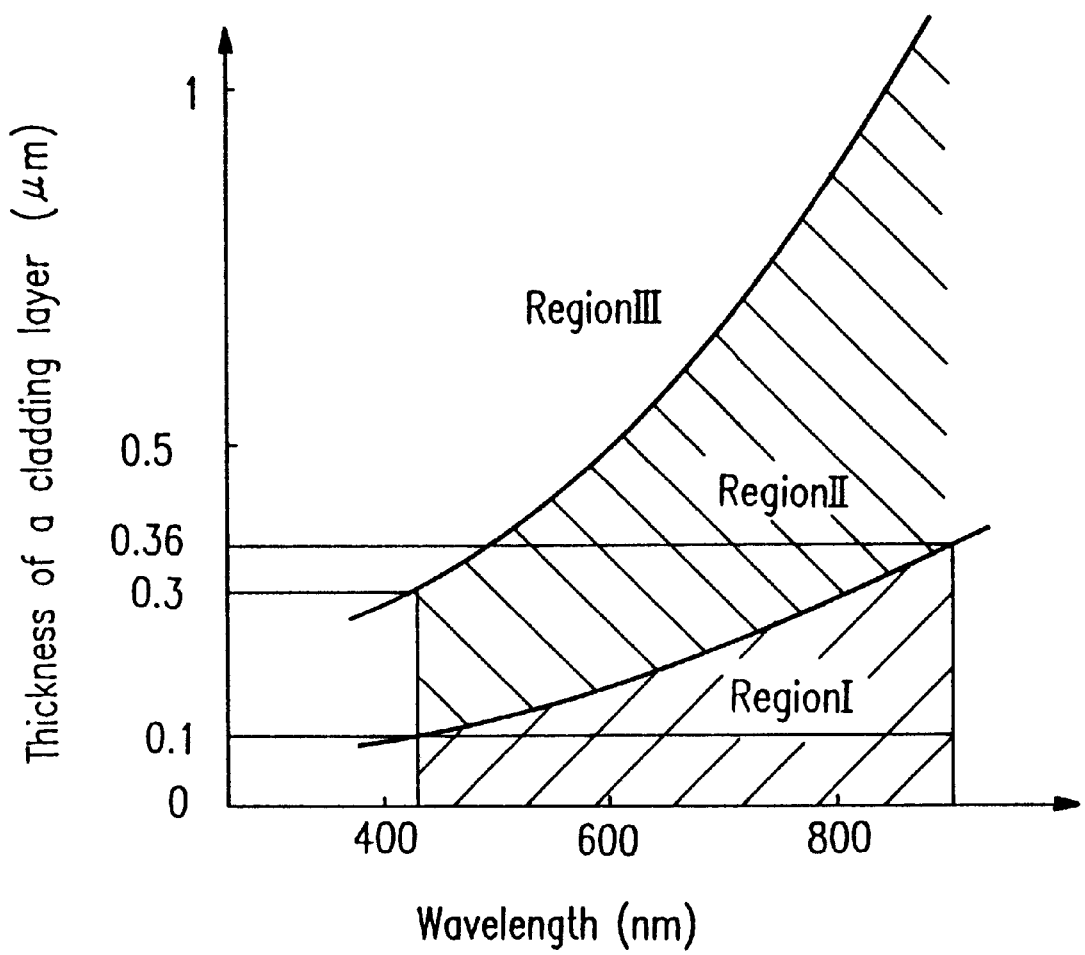
FIG. 14 is a graph showing characteristics of a guide mode with respect to a wavelength of guided light and a thickness of a cladding layer.

Based on this result, guide characteristics of the strip-loaded optical waveguide are analyzed. FIG. 14 is a graph showing the result of analysis. Specifically, FIG. 14 is a characteristic diagram showing the guide modes of light capable of propagating through the cladding layer with respect to a thickness of the cladding layer and a wavelength of guided light.

In region I, the light cannot propagate through the cladding layer, so that the light can propagate only through the guide layer. In region II, only light in a fundamental mode can propagate through the cladding layer. In region III, light both in a fundamental mode and a TM01 mode can propagate through the cladding layer.

Figure 15A:
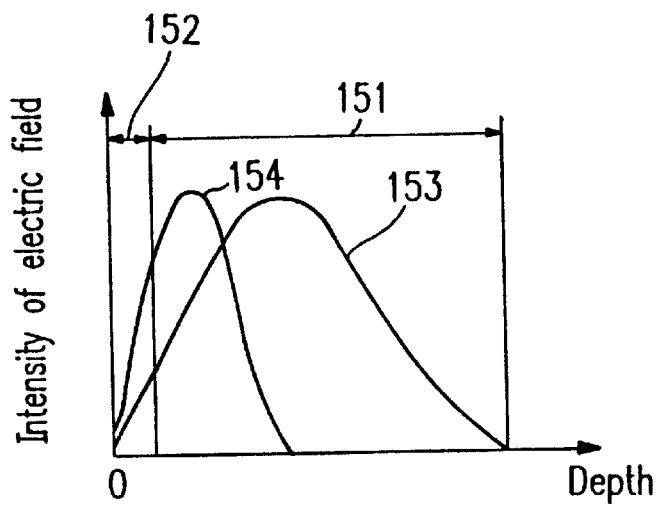
FIGS. 15A to 15C are graphs showing electric field distributions of guide modes with respect to the cladding layers, each having different thicknesses.
Figure 15B:
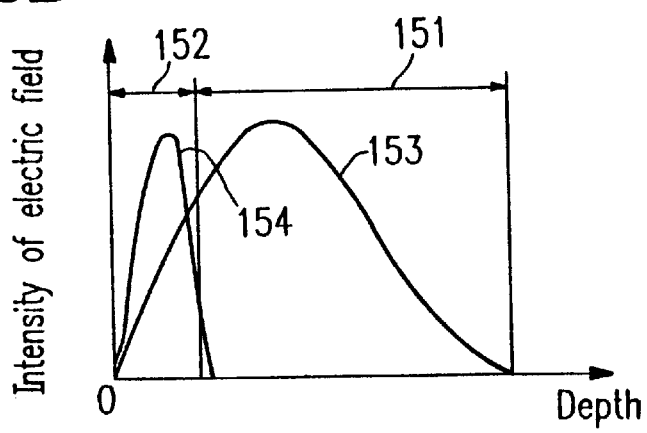
Figure 15C:
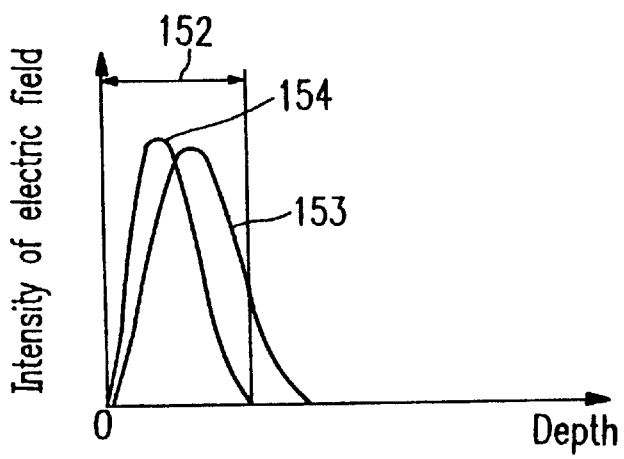

The guide mode in each of the regions will be described with reference to FIGS. 15A to 15C.

When a thickness of the cladding layer 152 is less than about 0.1 μm, the second-harmonic wave having a wavelength of about 430 nm and the fundamental wave having a wavelength of about 860 nm both fall within region I. Therefore, there is no guide mode in which light can propagate through a cladding layer 152. The electric field distributions in this case are shown in FIG. 15A, and the fundamental wave 153 and the second-harmonic wave 154 both in the fundamental mode propagate through a guide layer 151. Therefore, an electric field distribution in the cladding layer 152 is small.

When the thickness of the cladding layer 152 is between about 0.1 μm and about 0.36 μm, the second-harmonic wave having a wavelength of about 430 nm falls within region II and can propagate through the cladding layer 152 in the fundamental mode. The fundamental wave having a wavelength of about 860 nm falls within region I and cannot propagate through the cladding layer 152 in the fundamental mode. Therefore, the second-harmonic wave in the fundamental mode 154 is confined within the cladding layer 152 as shown in FIG. 15B, while the fundamental wave 153 propagates through the guide layer 151.

When the thickness of the cladding layer 152 is greater than about 0.36 μm, the fundamental wave falls within region II and the second-harmonic wave falls within region III, respectively. Thus, the fundamental wave and the second-harmonic wave can both propagate through the cladding layer 152 in the fundamental mode. Therefore, the fundamental wave 153 and the second-harmonic wave 154, which are both in the fundamental mode, are confined within the cladding layer 152.

In view of the degree of overlap in the above three cases, a certain degree of overlap is present in the first case. Specifically, the electric field distributions in the guide layer having nonlinearity are large, and the overlap exists in the guide layer. However, in the second case, the second-harmonic wave is confined within the cladding layer so that the overlap in the guide layer becomes small. In the third case, both the fundamental wave and the second-harmonic wave are confined within the cladding layer; therefore, the degree of overlap in the guide layer is presumed to be close to zero.

In experiments by the present inventors, however, the fundamental wave is confined within the cladding layer 152 with the thickness in the third case, resulting in a significant reduction of a conversion efficiency due to decrease in the degree of overlap, a conversion efficiency of the second-harmonic wave is remarkably improved in the second case to become greater than that obtainable in the first case. A further examination of the guide characteristics reveals that the guide mode of the second-harmonic wave in the second case is not in the fundamental mode but in a higher-order, and a remarkable improvement of the conversion efficiency of the second-harmonic wave can be achieved not in the fundamental mode but in a higher-order guide mode. More specifically, a conversion efficiency is improved between the fundamental wave in the fundamental mode and the second-harmonic wave in the higher-order mode by an increase in the degree of overlap therebetween.

Table 1 shows the relationship between thicknesses of the cladding layer and the guide mode of the second-harmonic wave in which the maximum conversion efficiency is obtained.

TABLE 1

| Thickness of cladding layer | Guide mode for second-harmonic wave | Output of second-harmonic wave |
| --- | --- | --- |
| < about 0.1 µm | zero-th order (TM00) | Δ |
| about 0.1 µm to about 0.3 µm | First order (TM01) | ⊚ |
| about 0.3 µm to about 0.36 µm | Second order (TM02) | ⊚ |
| about 0.36 µm < | Higher order | X |

Symbols in the column of "Output of second-harmonic-wave" relatively indicate the intensity of the obtained second-harmonic wave output (the wavelength conversion efficiency). Symbol ⊚ indicates a good conversion efficiency, while symbol X indicates a poor conversion efficiency. Symbol Δ indicates the intermediate level between the former two symbols.

FIGS. 16A to 16D show the guide modes with the thickness of the cladding layer being in the range of about 0.1 µm to about 0.3 µm.

Figure 16A:
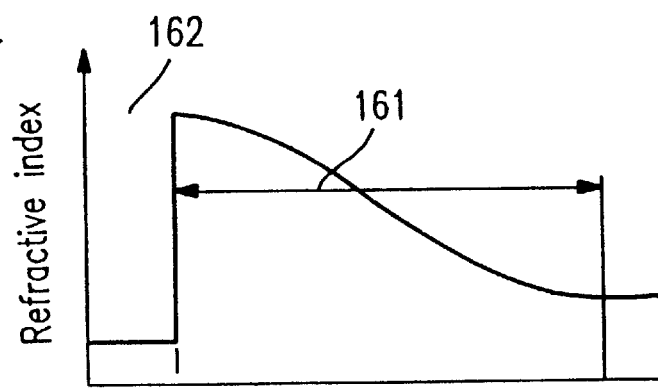
FIGS. 16A to 16D illustrate a light propagation state (guide modes of a fundamental wave and a second-harmonic wave).
Figure 16B:
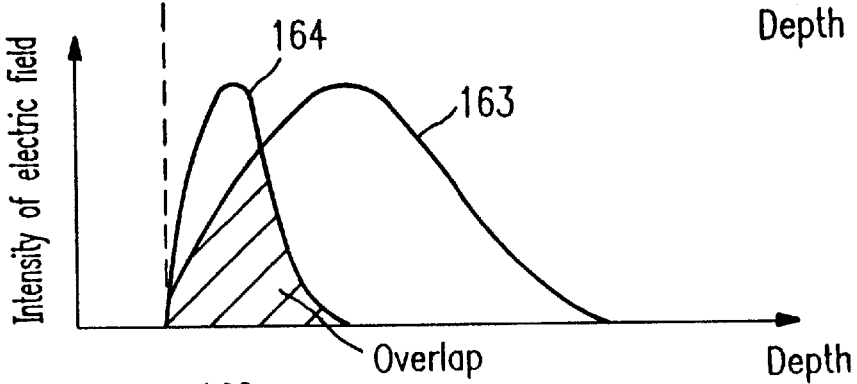

In the case where a cladding layer 162 is not provided or the cladding layer has a refractive index lower than that of a guide layer 161 (see FIG. 16A), a fundamental wave 163 and a second-harmonic wave 164 both in the fundamental mode are present within the guide layer 161 as shown in FIG. 16B.

Figure 16C:
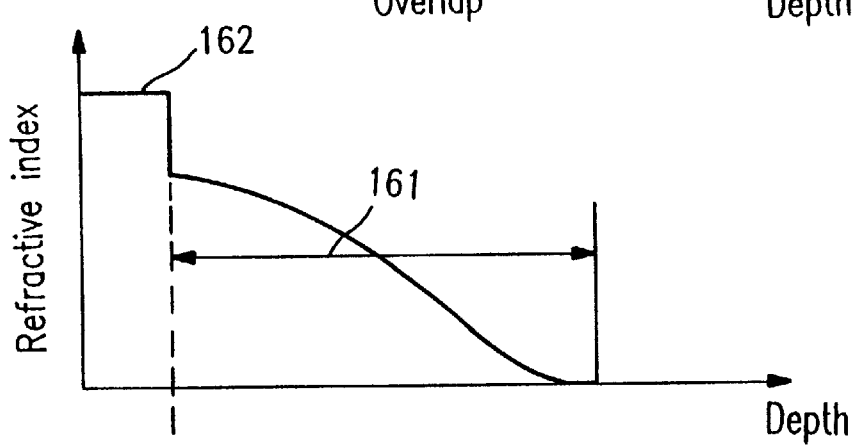
Figure 16D:
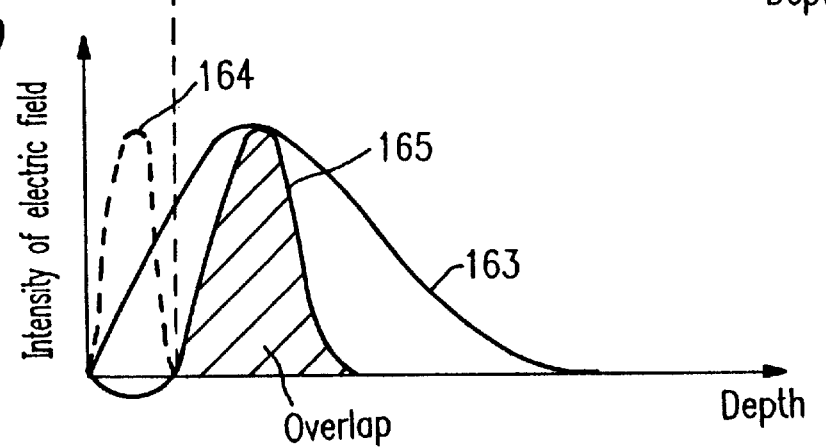

FIG. 16D shows the results obtained when the cladding layer 162 has a refractive index larger than that of the guide layer 161 (see FIG. 16C). Although the second-harmonic wave 164 in the fundamental mode is confined within the cladding layer 162, it has been found that a second-harmonic wave 165 in TM01 mode propagates through the guide layer 161 so as to have a large degree of overlap with the fundamental wave 163. Moreover, a major part of the electric field distribution of the second-harmonic wave 165 in a TM01 mode is present in the guide layer 161, and the electric field thereof is scarcely present in the cladding layer 162 which has small nonlinearity. In addition, a light confinement effect for the fundamental wave is enhanced. As a result, the conversion efficiency can be remarkably increased by the improved degree of overlap.

Since the guide mode of the second-harmonic wave can be efficiently excited due to its wavelength selectivity, the guide mode for the second-harmonic wave with a high conversion efficiency as described above can be selectively excited.

A ratio of an electric field distribution of the second-harmonic wave in a higher order mode in the cladding layer to that in the guide layer depends on a difference in refractive index between the cladding layer and the guide layer. More specifically, in the case where a difference in refractive index is large, part of the electric field distribution present in the guide layer becomes large (i.e., part of the electric field distribution present in the cladding layer becomes small). In the case where a difference in refractive index is small, part of the electric field distribution present in the cladding layer becomes large.

On the other hand, it is advantageous with respect to the fundamental wave that a difference in refractive index is small because the range of the thickness of the cladding layer falling within region I (FIG. 14) is enlarged so that it is less necessary to strictly perform a thickness control. Furthermore, a conversion efficiency into the second-harmonic wave, obtained in a combination of the second-harmonic wave in the TM02 mode and the fundamental wave in the TM00 mode, is greater than that obtained in a combination of the second-harmonic wave in the TM01 mode and the fundamental wave in the TM00 mode. In order to satisfy this condition, it is desirable that the relationship between the thickness of the cladding layer and a refractive index of the substrate satisfies: $\Delta N_{2w}$ (a difference in refractive index between the substrate and the cladding layer with respect to light having a wavelength in the 400 nm band) $>\Delta N_w$ (a difference in refractive index between the substrate and the cladding layer with respect to light having a wavelength in the 800 nm band). As previously explained with reference to FIG. 13, the $Nb_2O_5$ cladding layer 131 is remarkably effective since the $Nb_2O_5$ cladding layer satisfies the relationship: $\Delta N_{2w}>\Delta N_w$ with the $LiTaO_3$ substrate 132.

In the case where the second-harmonic wave propagates in a high order mode, converging characteristics of the output second-harmonic wave may be deteriorated in some cases. For example, in the buried type optical waveguide having a stepwise refractive index distribution, the first-order second-harmonic wave propagates in the TM01 mode. When this second-harmonic wave is converged, a converged light beam having two peaks is obtained and in order to converge such a second-harmonic wave to a single beam spot, it is necessary to perform the beam shaping process of the second-harmonic wave. On the other hand, the second-harmonic wave in a high order mode propagating through the $Nb_2O_5$ strip-loaded optical waveguide has almost the same light converging characteristics as those of the second-harmonic wave in the fundamental mode. Therefore, it is possible to converge the second-harmonic wave up to a diffraction limit because the electric field distribution of the fundamental wave in the cladding layer is remarkably smaller than that in the guide layer as shown in FIG. 16D. This is due to the fact that a difference in refractive index between the guide layer and the substrate with respect to the second-harmonic wave (Δn1: about 0.02) is remarkably smaller than that between the cladding layer and the substrate (Δn2: about 0.3).

In order to realize the second-harmonic wave in a higher order without deteriorating the converging characteristics of the second-harmonic wave, the relationship Δn1×3<Δn2 should be satisfied. If Δn2 is small, the electric field distribution in the cladding layer becomes large, thereby lowering a conversion efficiency and deteriorating the converging characteristics.

Next, the design of the cladding layer for obtaining an optimal structure so as to improve an efficiency of the optical wavelength conversion device will be described.

An optimal thickness is examined for the $Nb_2O_5$ cladding layer. Table 2 below shows the result of the examination of guide modes for the fundamental wave and the second-harmonic wave as well as a conversion efficiency into the second-harmonic wave while varying the thickness of the cladding layer.

TABLE 2

| Thickness (nm) | 50 | 80 | 120 | 200 | 300 | 330 | 350 | 400 | 450 |
|---|---|---|---|---|---|---|---|---|---|
| Guide mode of fundamental wave (order) | 0th | 0th | 0th | 0th | 0th | 0th | 0th | 1st | 1st |
| Guide mode of Second-harmonic wave (order) | 0th | 0th | 1st | 1st | 1st | 2nd | 2nd | 2nd | 2nd |
| Conversion efficiency | Δ | Δ | ○ | ⊙ | ⊙ | ⊙ | ○ | X | X |

Symbols in the column of "Conversion efficiency" relatively indicate the wavelength conversion efficiency into the second-harmonic wave). Symbol ⊙ indicates a good conversion efficiency, while symbol X indicates a poor conversion efficiency. Symbols ○ and Δ indicate the intermediate levels between the former two.

In the case where the cladding layer has a thickness of about 100 nm or less, the maximum conversion efficiency is obtained with the fundamental wave and the second-harmonic wave both in the fundamental mode. In such a case, an obtainable conversion efficiency remains almost the same as that of the buried optical waveguide. In the case where the cladding layer has a thickness of about 100 nm or more, the degree of overlap between the fundamental wave in the fundamental mode and the second-harmonic wave in the first order (TM01) mode increases to enhance the conversion efficiency. When the thickness is equal to about 200 nm or more, the conversion into the second-harmonic wave in the first mode becomes significant, and a conversion efficiency of twice or more than that of the optical wavelength conversion device using a conventional buried type optical waveguide or a strip-loaded optical waveguide is obtained. Furthermore, in the vicinity of a thickness of about 300 nm, the fundamental wave is converted into the second-harmonic wave in a second-order (TM02) mode, and a conversion efficiency is further improved. However, the thickness is equal to about 400 nm or more, the fundamental wave is confined within the cladding layer. As a result, a conversion efficiency is remarkably lowered.

From the above results, in order to improve a conversion efficiency, the $Nb_2O_5$ cladding layer should have a thickness in the range of about 100 nm to about 380 nm. More preferably, the $Nb_2O_5$ cladding layer preferably has a thickness in the range of about 200 nm to about 340 nm so as to particularly improve a conversion efficiency.

Figure 17:
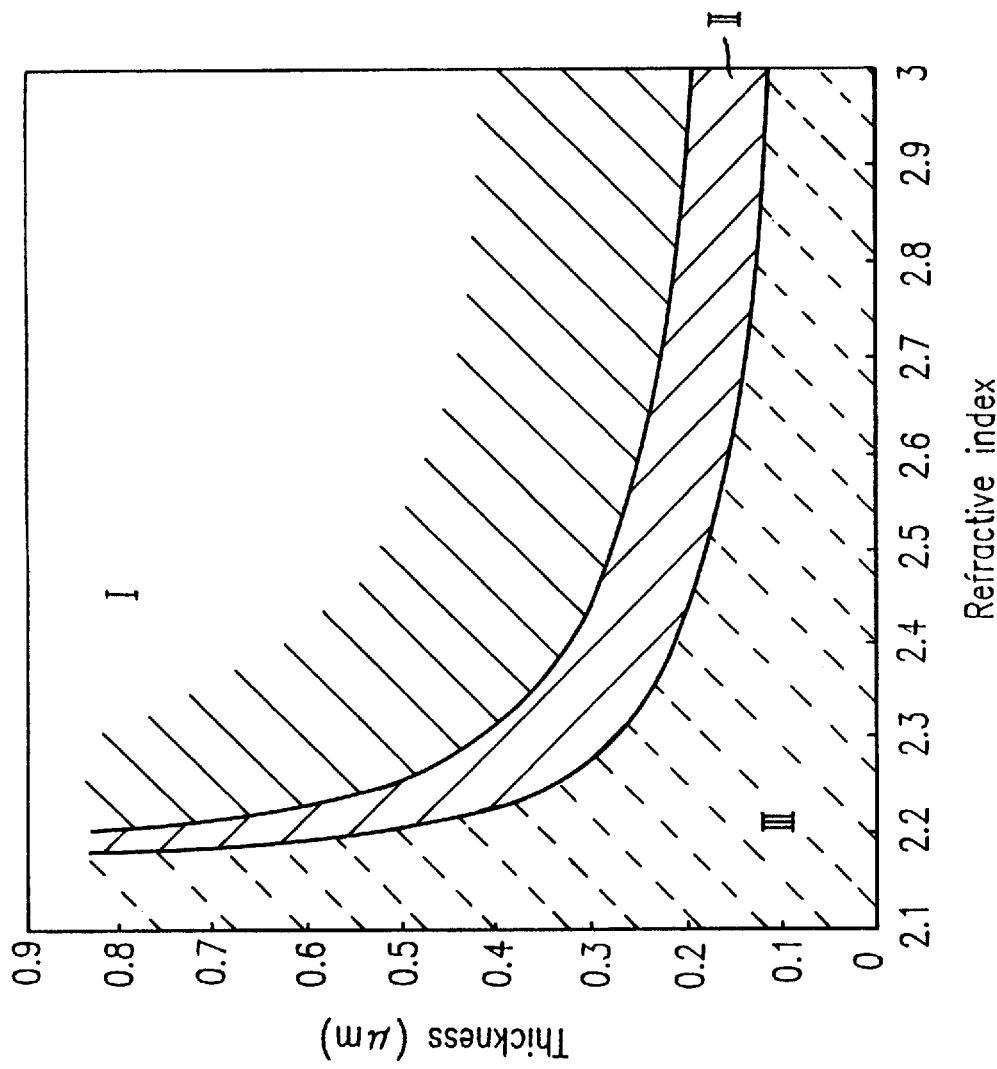
FIG. 17 is a graph showing the relationship between the refractive index of a cladding layer and a thickness thereof.

FIG. 17 shows the relationship between a refractive index (with respect to a wavelength of the fundamental wave) and a thickness of the cladding layer, provided on the proton-exchanged layer formed on the $LiTaO_3$ substrate.

In region I of FIG. 17, since the cladding layer is so thick that the fundamental wave is confined within the cladding layer, a conversion efficiency is remarkably lowered. In region II, the degree of overlap between the fundamental wave and the second-harmonic wave is improved so that a conversion efficiency becomes maximum. In region III, a conversion efficiency is still improved to some degree. Thus, in regions II and III, an improved conversion efficiency can be obtained.

As can be seen from FIG. 17, as the refractive index increases, the maximum acceptable thickness required for attaining the region II or III is reduced. As a result, the thickness should be determined with accuracy. In order to form the cladding layer using a usual film deposition apparatus with good reproducibility, the cladding layer has a suitable thickness of several hundred nm or more, and a refractive index of about 2.8 or less.

It is also revealed that a small difference in refractive index between the cladding layer and the guide layer does not have the intended effect to improve the degree of overlap by the cladding layer. It is found that when the cladding layer has a refractive index of about 2.2 or more, the degree of overlap between the fundamental wave and the second-harmonic wave increases to remarkably improve the conversion efficiency. Accordingly, in the case where the $LiTaO_3$ substrate is used, the cladding layer preferably has a refractive index of about 2.18 or more with respect to the wavelength of the fundamental wave. In particular, in order to obtain a high conversion efficiency, the cladding layer should have a refractive index of about 2.2 to about 2.8 (with respect to the fundamental wave).

Although the $Nb_2O_5$ layer is used as the cladding layer in Example 1, the cladding layer may be made of $LiNbO_3$, $TiO_2$, ZnS, $CeO_2$ or a mixture thereof, for example, with $Ta_2O_5$, $SiO_2$, $Al_2O_3$ and SiN. If such a material is used for the cladding layer, a higher degree of overlap can be obtained by varying the refractive index of the cladding layer so as to remarkably improve the conversion efficiency.

Although the $LiTaO_3$ substrate is used as the substrate in Example 1, a similar device can also be fabricated by using MgO-doped, Nb-doped or Nd-doped $LiTaO_3$, $LiNbO_3$, a mixture thereof, i.e., $LiTa_{(1-x)}Nb_xO_3$ ($0 \leq x \leq 1$), and KTP ($KTiOPO_4$). Since $LiTaO_3$, $LiNbO_3$ and KTP each have a high nonlinearity, an optical wavelength conversion device with a high efficiency can be fabricated. Moreover, since KTP has a low refractive index, i.e., about 1.8, $Ta_2O_5$, $Al_2O_3$ and SiN can be advantageously used as the cladding layer to be fabricated thereon. Since a method for forming a domain-inverted layer has been established with these materials, an optical wavelength conversion device can advantageously be formed.

Next, the cover layer formed on the surface of the optical wavelength conversion device will be described.

In FIG. 9, a surface of the optical waveguide (specifically, the proton-exchanged layer 105 and the cladding layer 110) is covered with a $SiO_2$ cover layer 111 having a thickness of about 400 nm.

The cladding layer of the strip-loaded optical waveguide is formed by etching because the side faces thereof have slight unevenness, thereby generating a guide loss. By covering the cladding layer with the cover layer 111, a difference in refractive index between the cladding layer and the other part is reduced so as to lower a guide loss due to unevenness of the side faces of the cladding layer. The cover layer is proved to be effective because by providing the cover layer, the guide loss is halved or less.

Although the $SiO_2$ layer is used as the cover layer in Example 1, a material having a refractive index lower than that of the substrate, for example, $Ta_2O_5$, is also effective as the material of the cover layer. Since the $Ta_2O_5$ layer has a high refractive index, that is, about 2, an optical waveguide with a low loss can be fabricated.

In addition, a material having a refractive index lower than that of the substrate, an absorption loss and a diffusion loss with respect to the fundamental wave and the harmonic wave, such as SiN or $Al_2O_3$, can produce the same result.

Example 2

In Example 2, another structure of the optical wavelength conversion device using a strip-loaded ridge type optical waveguide for improving the characteristics thereof will be described.

In Example 1, it is confirmed that the characteristics of the optical wavelength conversion device are improved by the strip-loaded optical waveguide using the cladding layer having a high refractive index. In Example 2, the structure of the optical wavelength conversion device is further modified so as to further improve the characteristics thereof.

As described previously, a mode profile of the fundamental wave can be controlled by employing the strip-loaded optical waveguide. However, in the case where the degree of overlap is intended to be improved by restraining the effect on the mode profile of the second-harmonic wave and controlling the mode profile of the fundamental wave in the strip-loaded optical waveguide, a light confinement effect for the second-harmonic wave in a width direction is reduced. As a result, an aspect ratio of a beam profile of the second-harmonic wave output from the optical waveguide (a height-to-width ratio in the case where an output light beam is collimated) is 1:3 or more, so that a spread angle in a thickness direction becomes greater than that in a width direction. Therefore, an efficiency to obtain light converging characteristics up to the diffraction limit is disadvantageously reduced to a large degree. In order to solve this problem, another structure of the optical wavelength conversion device shown in FIG. 18 is provided in this example.

Figure 18A:
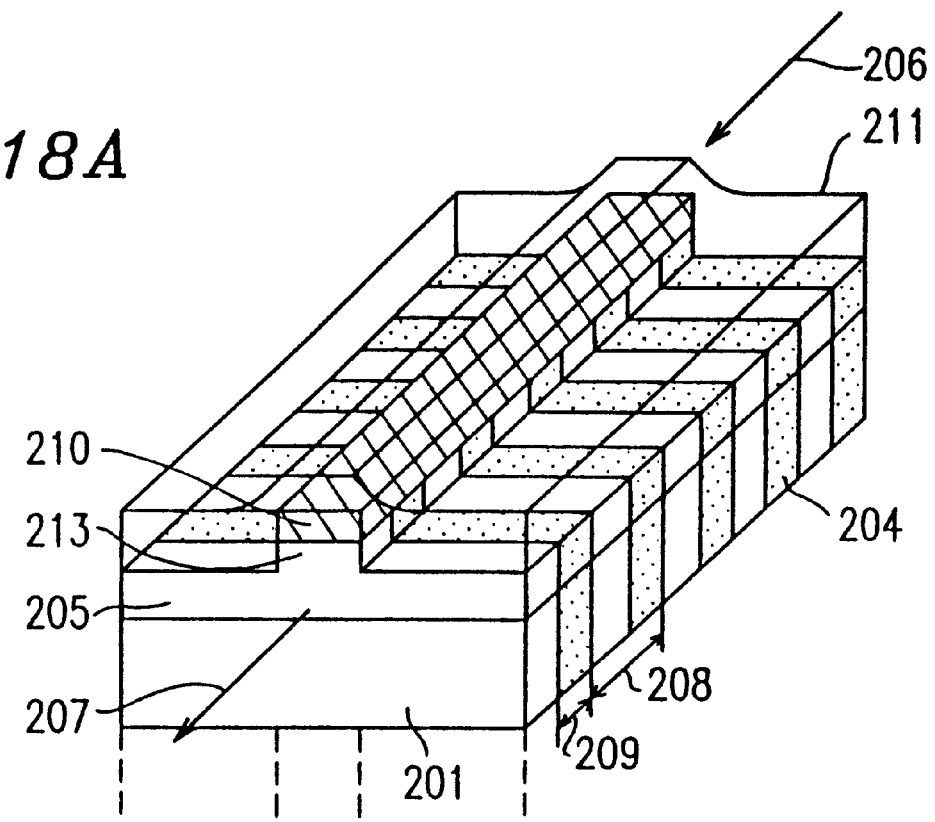
FIGS. 18A and 18B are schematic views showing the structure of an optical wavelength conversion device of Example 2 according to the present invention.
Figure 18B:
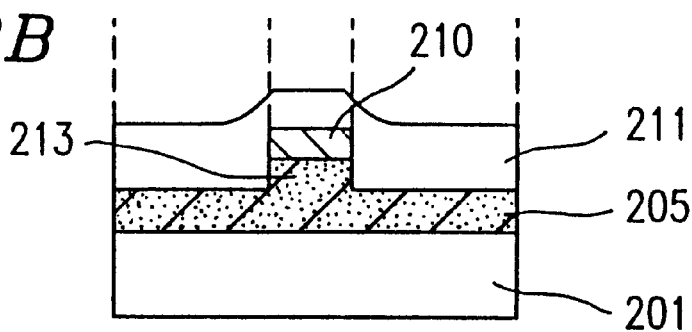

Specifically, FIG. 18A is a perspective view of the optical wavelength conversion device of this example, and FIG. 18B is a cross-sectional view thereof.

As shown in FIGS. 18A and 18B, the optical wavelength conversion device of Example 2 has a C plate (i.e., having a top face and a bottom face perpendicular to the C axis of the crystal) of a $LiTaO_3$ crystal substrate 201 including periodic domain-inverted layers 204 formed therein with a period of Λ equal to about 3.5 μm. The period Λ is indicated with reference numeral 208 in FIGS. 18A and 18B. A width W of the domain-inverted layer 204 is about 1.7 μm. The width W is indicated with reference numeral 209 in FIGS. 18A and 18B.

Furthermore, a proton-exchanged layer 205 having a striped-ridge 213 is formed on the surface of the $LiTaO_3$ crystal substrate 201. On a top face of the ridge 213, a $Nb_2O_5$ cladding layer 210 is formed. The surface of the $LiTaO_3$ crystal substrate 201 including the $Nb_2O_5$ cladding layer 210 is covered with a cover layer 211 made of $SiO_2$. The thickness of the ridge 213 is typically about 200 nm, and the thickness of the cladding layer 210 is about 300 nm.

The fundamental wave 206 having a wavelength of about 850 nm propagates through the device in a fundamental mode (TM00 mode), while the second-harmonic wave 207 propagates through the device in a higher-order mode (TM01 mode), that is, in a first-order mode in a depth direction and of a zero-th order mode in a width direction. Since the second-harmonic wave 107 propagates in the TM01 mode in the stripe-loaded optical waveguide in Example 1, a light confinement effect in the lateral direction is weak, resulting in an increase in the aspect ratio of the guide mode. In order to solve this problem, the ridge portion 213 is provided in the structure of the optical wavelength conversion device of Example 2. As a result, the light confinement effect in the width direction is increased to improve the aspect ratio of the guide mode of the second-harmonic wave.

Next, the characteristics of the strip-loaded ridge type optical waveguide will be described.

In the strip-loaded ridge type optical waveguide, the light confinement effect for the second-harmonic wave in the width direction is enhanced by processing the proton-exchanged layer 205 into a ridge shape. The spread of the second-harmonic wave in the width direction is restrained to ⅔ to ½ of that in the $Nb_2O_5$ strip-loaded type optical waveguide to enhance the lateral light confinement effect. As a result, since the degree of overlap between the fundamental wave and the second-harmonic wave in the lateral direction is increased, a conversion efficiency 1.5 times or more than that of the strip-loaded optical waveguide is obtained. From this fact, it becomes apparent that the strip-loaded ridge structure is effective to enhance a conversion efficiency of the optical wavelength conversion device.

In order to enhance the light confinement effect in the width direction, the ridge portion 213 should have a thickness of about 100 nm or more. Furthermore, in order to obtain an improved conversion efficiency of the optical wavelength conversion device due to an increase in the degree of overlap in the width direction, the ridge portion 213 should have a thickness in the range of about 200 nm to about 600 nm. When the ridge portion 213 has a thickness of about 1000 nm or more, a propagation loss of the optical waveguide is increased to deteriorate the characteristics of the optical wavelength conversion device.

In short, the ridge portion 213 should have a thickness in the range of about 100 nm to about 1000 nm to obtain an improved degree of overlap, and should have a thickness in the range of about 200 nm to about 600 nm to obtain a remarkably improved conversion efficiency.

Next, an aspect ratio of the second-harmonic wave with respect to the width of the optical waveguide including the ridge portion 213 having a thickness of about 300 nm is explained.

First, in order for the fundamental wave to propagate in a single mode (i.e., does not propagate in a multi-mode), the waveguide should have a width of about 10 μm or less. The aspect ratio can be improved with a width of the optical waveguide of about 8 μm or less. The aspect ratio approaches 1:1 when the optical waveguide has a width in the range of about 2 to about 4 μm. However, when the optical waveguide has a width of about 1 μm or less, a conversion efficiency is lowered.

By providing a strip-loaded ridge structure for the optical waveguide, in addition to the characteristics of the optical wavelength conversion device using the strip-loaded optical waveguide, the mode profile of an output beam can be shaped. As a result, the optical wavelength conversion device with excellent characteristics can be fabricated. In order to obtain a single-mode optical waveguide, it is desirable that the optical waveguide has a width in the range of about 1 to about 10 μm. Furthermore, in order to improve the aspect ratio, it is desirable that the optical waveguide has a width in the range of about 1 to about 8 μm. In order to bring the aspect ratio close to 1:1, the width of the optical waveguide should be controlled to be in the range of about 2 to about 4 μm.

Although the $Nb_2O_5$ layer is used as the cladding layer in Example 2, the cladding layer may be made of $LiNbO_3$, $TiO_2$, ZnS, $CeO_2$ or a mixture thereof, for example, with $Ta_2O_5$, $SiO_2$, $Al_2O_3$ and SiN. If such a material is used for the cladding layer, a higher degree of overlap can be obtained by varying a refractive index of the cladding layer so as to remarkably improve the conversion efficiency.

Although the $LiTaO_3$ substrate is used as the substrate in Example 2, a similar device can also be fabricated by using MgO-doped, Nb-doped or Nd-doped $LiTaO_3$, $LiNbO_3$, a mixture thereof, i.e., $LiTa_{(1-x)}Nb_xO_3$ ($0 \leq x \leq 1$), and KTP ($KTiOPO_4$). Since $LiTaO_3$, $LiNbO_3$ and KTP has a high nonlinearity, an optical wavelength conversion device with a high efficiency can be fabricated. Moreover, since KTP has a low refractive index, i.e., about 1.8, $Ta_2O_5$, $Al_2O_3$ and SiN can be advantageously used as the cladding layer. Since a method for forming a domain-inverted layer has been confirmed with these materials, an optical wavelength conversion device can advantageously be formed.

Example 3

Figure 19:
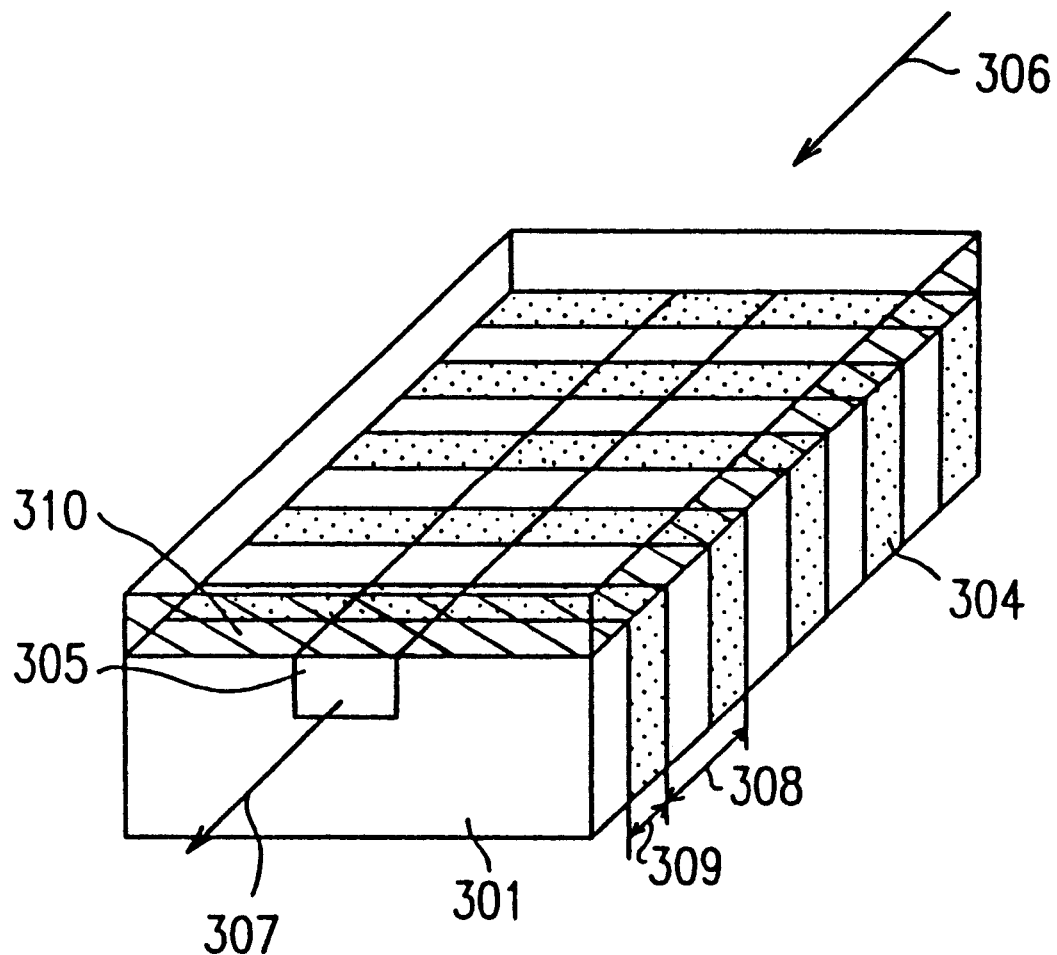
FIG. 19 is a schematic view showing the structure of an optical wavelength conversion device of Example 3 according to the present invention.

In Example 3, the effect of the $Nb_2O_5$ cladding layer for improving the degree of overlap is utilized in a buried type optical waveguide so as to improve the conversion efficiency with a simple structure. FIG. 19 shows the structure of the optical wavelength conversion device using a buried type optical waveguide of the present invention. A C plate (i.e., having a surface perpendicular to the C axis of the crystal) of a $LiTaO_3$ crystal substrate 301 includes periodic domain-inverted layers 304 formed therein. A width W of the domain-inverted layers 304 is about 1.7 μm (the width W is denoted by the reference numeral 309 in FIG. 19). Furthermore, a stripe-shaped proton-exchanged layer 305 is formed in the surface of the $LiTaO_3$ crystal substrate 301 in an embedded manner. Unlike the conventional structure, a $Nb_2ON_5$ cladding layer 310 having a refractive index higher than that of the $LiTaO_3$ substrate 301 is formed on the surface of the $LiTaO_3$ substrate 301. A thickness of the cladding layer 310 is set to about 300 nm.

A fundamental wave 306 having a wavelength of about 850 nm propagates through the device in a fundamental mode (TM00 mode), while a second-harmonic wave 307 propagates through the device in a higher-order mode (TM01 mode), that is, in a first-order mode in a depth direction and in a zero-th order mode in a width direction. By selecting a wavelength of the fundamental wave with respect to the domain-inversion period, the guide mode of the second-harmonic wave 307 is selectively oscillated. Unlike the conventional structure, the fundamental wave 306 propagates in the fundamental mode while the second-harmonic wave 307 propagates in the high-order mode, thereby increasing the degree of overlap therebetween to improve a conversion efficiency.

When the $Nb_2O_5$ cladding layer 310 is deposited to about 300 nm in the buried type optical waveguide, the light confinement effect for the fundamental wave 306 in the fundamental guide mode is enhanced, resulting in an increase in the degree of overlap between the second-harmonic wave 307 and the fundamental wave 306. As a result, a conversion efficiency of the optical wavelength conversion device is improved to be approximately tripled, that is, a high conversion efficiency is obtained. The degree of overlap between the fundamental wave 306 and the second-harmonic wave 307 starts to increase at the thickness of the cladding layer 310 of about 100 nm, and becomes maximum at about 300 nm. At the thickness of about 400 nm, however, the conversion efficiency is suddenly lowered. This relationship is almost the same as that between the cladding layer and the conversion efficiency of the second-harmonic wave which is obtained in the strip-loaded optical waveguide.

The buried type optical waveguide has a higher light confinement effect in a lateral direction as compared with the strip-loaded optical waveguide, and as an aspect ratio of an output second-harmonic wave is about 1:2.5. Therefore, a relatively good beam waveform can be obtained.

The buried type optical waveguide is advantageous in that a propagation loss is small. The ridge type optical waveguide tends to have a large propagation loss due to unevenness on the side faces of the waveguide. According to the present invention, the ridge type optical waveguide is observed to have a propagation loss of about 1.5 dB/cm. On the other hand, the buried type optical waveguide is observed to have a propagation loss of about 1 dB/cm or less. Thus, the optical waveguide having a remarkably low propagation loss can be obtained with the buried type structure.

Furthermore, in order to improve the light confinement effect in a lateral direction, the cladding layer is selectively deposited on the optical waveguide. By setting the width of the cladding layer at about 5 μm or less with respect to the optical waveguide having a width of about 5 μm, the light confinement effect in a width direction is enhanced to improve a conversion efficiency to 1.2 times a conventional conversion efficiency. A conversion efficiency is improved by an increase in the degree of overlap between the fundamental wave and the second-harmonic wave in the case where a refractive index of the cladding layer is 2.18 or more. In particular, the degree of overlap is remarkably increased to obtain a drastically improved conversion efficiency when the cladding layer has a refractive index in the range of about 2.2 to about 2.5.

Although the $Nb_2O_5$ layer is used as the cladding layer in Example 3, the cladding layer may be made of $LiNbO_3$, $TiO_2$, ZnS, $CeO_2$ or a mixture thereof, for example, with $Ta_2O_5$, $SiO_2$, $Al_2O_3$ and SiN. If such a material is used for the cladding layer, a higher degree of overlap can be obtained by varying a refractive index of the cladding layer so as to remarkably improve the conversion efficiency.

Although the $LiTaO_3$ substrate is used as the substrate in Example 3, a similar device can also be fabricated by using MgO-doped, Nb-doped or Nd-doped $LiTaO_3$, $LiNbO_3$, a mixture thereof, i.e., $LiTa_{(1-x)}Nb_xO_3$ ($0 \leq x \leq 1$), and KTP ($KTiOPO_4$). Since $LiTaO_3$, $LiNbO_3$ and KTP has a high nonlinearity, an optical wavelength conversion device with a high efficiency can be fabricated. Moreover, since KTP has a low refractive index, i.e., about 1.8, $Ta_2O_5$, $Al_2O_3$ and SiN can be advantageously used as the cladding layer. Since a method for forming a domain-inverted layer has been confirmed with these materials, an optical wavelength conversion device can advantageously be formed.

Since the strip-loaded optical waveguide, the strip-loaded ridge type optical waveguide, and the buried type optical waveguide respectively described in Examples 1 to 3 have a low propagation loss and a high light confinement effect, these optical waveguides are as promising as individually used optical waveguides. These optical waveguides can be used in optical waveguide devices such as an optical communication device and an optical measurement device.

Next, the structure of the buried type optical waveguide for improving a resistance against optical damage thereof will be described.

By providing a cladding layer with a high refractive index for the buried type optical waveguide, the degree of overlap between the fundamental wave and the second-harmonic wave is increased while a light confinement effect for the guided light is enhanced both in the depth direction and in the width direction. As a result, a wavelength conversion with a high efficiency can be achieved. Moreover, by increasing the degree of overlap between the second-harmonic wave and the second-harmonic wave in the guide layer, a region in which an electric field distribution of the fundamental wave alone exists is reduced. As a result, a resistance against optical damage can be improved. However, an optical damage cannot be perfectly prevented from being generated. The occurrence of an optical damage may be observed with respect to an output of the second-harmonic wave of about 10 mW or higher. In this regard, the buried type optical waveguide is slightly inferior to the strip-loaded optical waveguide and the strip-loaded ridge type optical waveguide.

As a result of a careful examination by the present inventors on the occurrence of the optical damage, it is found that a change in the refractive index due to the optical damage is the greatest in the vicinity of the side parts of the optical waveguide. More specifically, since the strip-loaded or the strip-loaded ridge type optical waveguide has a proton-exchanged layer in the vicinity of the side faces, a light confinement effect in a lateral direction is alleviated so that a resistance against optical damage on the side faces of the optical waveguide is improved.

Therefore, in order to improve a resistance against optical damage in the buried type optical waveguide, a layer having a refractive index lower than that of the waveguide (however, higher than that of the substrate 301) are provided in the vicinity of each of the side faces of the waveguide is provided. More specifically, another proton-exchanged layer (not shown) with a low density is formed on each of the side faces of the optical waveguide shown in FIG. 19. As a result, a light confinement effect of the optical waveguide in a lateral direction is slightly alleviated (by several %), so that a conversion efficiency is lowered by about ten %. On the other hand, a resistance against optical damage is remarkably increased. It is confirmed that optical damage does not occur even for the second-harmonic wave at about 20 mW or more. An increase in the anti-optical waveguide resistance obtained by providing the additional proton-exchanged layers is not only due to alleviation of the lateral light confinement of the optical waveguide but also due to the increase in the resistance against optical damage obtained by the additional proton-exchanged layers (side faces of the optical waveguide). More specifically, since the proton-exchanged layer has a high electric conductivity as compared with the substrate 301, a lifetime of optically excited charges at an impurity level which may cause an optical damage is short. Therefore, an optical damage hardly occurs. By taking advantage of this property, the proton-exchanged layers with a high electrical conductivity are provided on the side faces of the optical waveguide where an optical damage tends to occur, so as to increase the resistance against optical damage of the side faces.

Example 4

In Example 4, a short-wavelength light source using an optical wavelength conversion device will be described.

Figure 20:
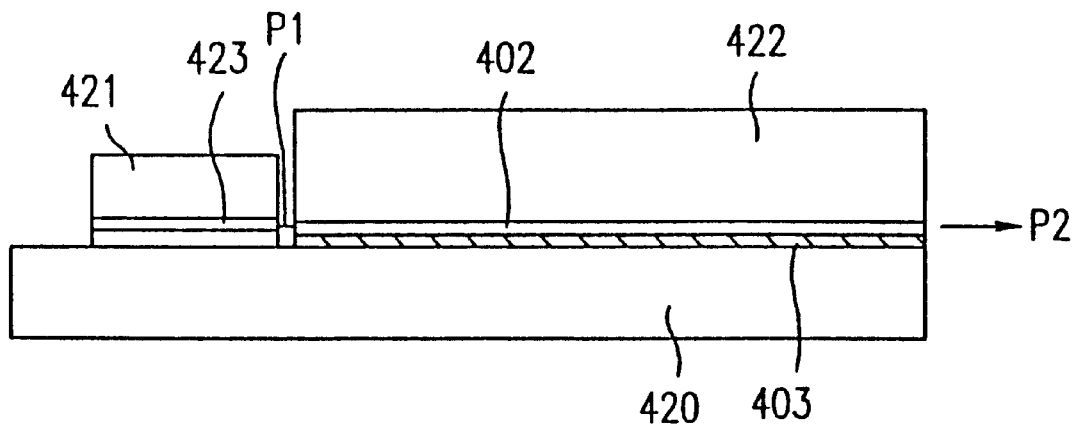
FIG. 20 is a cross-sectional view showing the configuration of a short-wavelength light source.

With the structures of the optical wavelength conversion devices described in Examples 1 to 3, it is possible to fabricate a stable optical wavelength conversion device with a high efficiency. Therefore, a short-wavelength light source using such an optical wavelength conversion device is fabricated, as shown in FIG. 20.

The short-wavelength light source includes a semiconductor laser 421 emitting light having a wavelength of 800 nm mounted onto a sub-mount 420 made of Si or the like and an optical wavelength conversion device 422. The fundamental wave P1 emitted from a light-emitting region 423 of the semiconductor laser 421 is directly coupled to an end face of an optical waveguide 402 of the optical wavelength conversion device 422 so as to converge light, thereby exciting a guide mode. From the other end face of the optical waveguide 402 of the optical wavelength conversion device 422, a second-harmonic wave P2 obtained by wavelength conversion is output. A cladding layer 403 is formed between the substrate 420 and the optical wavelength conversion device 422.

Since the optical wavelength conversion device 422 with a high conversion efficiency is utilized therein, a blue-color second-harmonic wave light P2 at about 10 mW is obtained by using the semiconductor laser with an output of about 100 mW. Since the employed wavelength conversion device 422 has an excellent resistance against optical damage, an output variation is restricted to about 2% or less. Therefore, a stable output is obtained.

A light beam having a wavelength in the 400 nm-band is widely applied in, for example, a special-propose measurement of printing, bioengineering or fluorescent spectral characteristics, and an optical disk. The short-wavelength light source using the optical wavelength conversion device according to the present invention is applicable in these fields in view of output characteristics and stability.

Alternatively, a light beam emitted from the semiconductor laser 421 may be coupled to the optical waveguide 402 of the optical wavelength conversion device 422 by using a light converting system. However, a light source at a lower cost and with a smaller size can be obtained by the structure in which the semiconductor laser 421 and the optical waveguide 402 of the optical wavelength conversion device 422 are directly coupled to each other.

Example 5

In Example 5, an optical pickup using a short-wavelength light source as a light source to be used for a pickup of an optical disk will be described.

Figure 21:
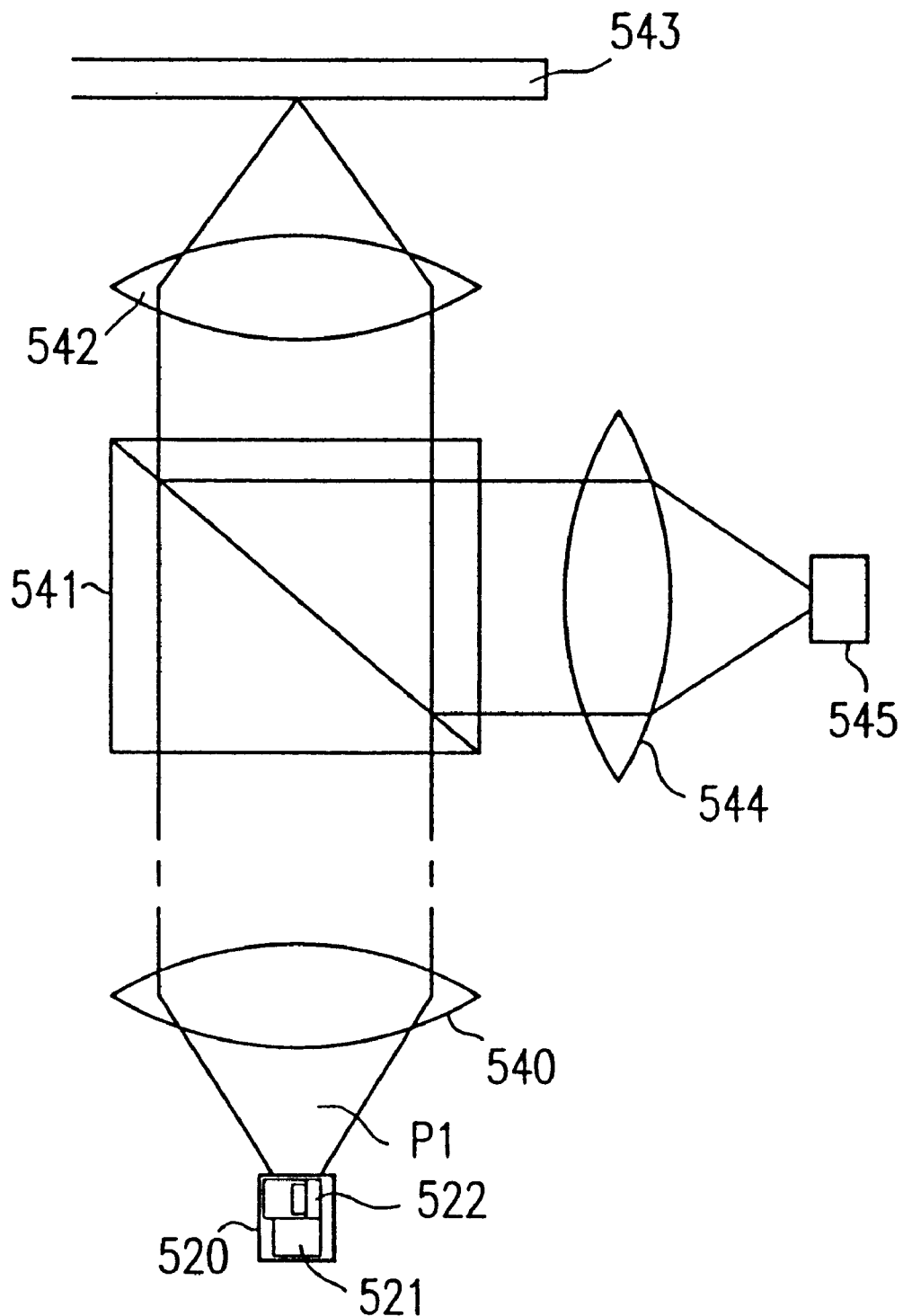
FIG. 21 is a schematic view showing the structure of an optical pickup.

Since data is required to be recorded at a high density in an optical disk, it is essential to realize a compact short-wavelength light source. A pickup for reading data recorded in the optical disk includes a light source, a light converging system and a light- receiving section. More specifically, as shown in FIG. 21, a light beam P1 emitted from a light source including a semiconductor laser 521 and an optical wavelength conversion device 522 mounted onto a Si sub-mount 521 is collimated through a lens 540. Then, after the collimated light beam passes through a beam splitter 541, the light beam is converged by a lens 542 so as to be irradiated onto an optical disk 543. After a reflected light beam from the optical disk 543 is collimated through a lens 542, the collimated light beam is converted onto an optical detector 545 through the beam splitter 541 and the lens 544.

If the optical wavelength conversion device according to the present invention is used for the light source, a blue-color light beam having a wavelength in the 400 nm-band can be used for reading the optical disk. As a result, the recording density can be doubled. Furthermore, since a high output of blue light can be obtained, it is possible not only to read data from the optical disk but also to write data to the optical disk. Since the semiconductor laser is used as a light source of the fundamental wave, the optical pickup device is remarkably compact. Thus, such an optical pickup device can be used in a compact optical disk reading/recording apparatus.

Furthermore, by optimizing the width of the optical waveguide, an aspect ratio of an output light beam is optimized in the optical wavelength conversion device. For example, by setting a width of the optical wavelength conversion device having a strip-loaded ridge waveguide structure at about 3 μm, it is possible to bring an aspect ratio close to 1:1. The optical pickup with a high transmission efficiency and excellent light converging properties at low cost can be realized without a beam shaping prism or the like to improve the light converging properties of the optical pickup. Moreover, the noise to be generated by diffused light occurring during the beam shaping is reduced, thereby simplifying the optical pickup.

Example 6

In Example 6, the structure of an optical waveguide with strong light confinement effect will be described.

The structure of the optical wavelength conversion device described in Example 1 is also effective as a structure of the optical waveguide. Therefore, the characteristics of the optical waveguide in the optical wavelength conversion device shown in FIG. 9 will be first described.

Figure 22A:
FIGS. 22A to 22H are views showing an electric field distribution of a guide mode in the case where a cladding layer made of a different material is provided.
Figure 22B:
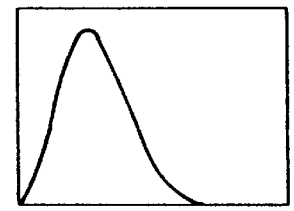
Figure 22C:
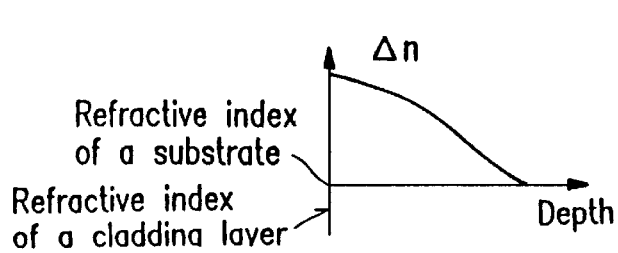
Figure 22D:
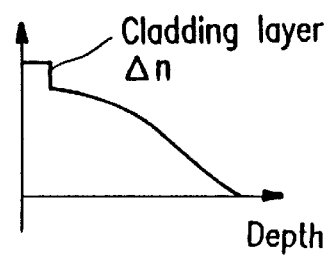
Figure 22E:
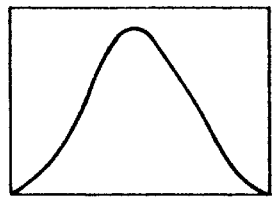

An electric field distribution of the guided light when light having a wavelength of about 860 nm is propagated through the optical wavelength conversion device, in which an optical waveguide is formed on a LiTaO$_3$ substrate and a Nb$_2$O$_5$ cladding layer is further formed on the optical waveguide (FIG. 22H), is observed. For comparison, an electric field distribution of guided light in the strip-loaded optical waveguide having the same structure except that a Ta$_2$O$_5$ cladding layer is provided instead of the Nb$_2$O$_5$ cladding layer (FIG. 22E). With respect to a light beam having a wavelength of about 860 nm, the proton-exchanged layer has a refractive index of about 2.15, the Ta$_2$O$_5$ cladding layer has a refractive index of about 2.0, and the Nb$_2$O$_5$ cladding layer has a refractive index of about 2.25.

The electric field distributions of the respective strip-loaded optical waveguides having the proton-exchanged layer having a thickness of about 2 μm and a stripe-shaped cladding layer having a thickness of about 300 nm and a width of about 5 μm are shown in FIGS. 22A to 22H.

First, the electric field distributions in a depth direction are described. FIGS. 22A and 22B show the electric field distributions of the propagating light in a depth direction of the strip-loaded optical waveguide with the Ta$_2$O$_5$ cladding layer (shown in FIG. 22G) and the strip-loaded optical waveguide with the Nb$_2$O$_5$ cladding layer (shown in FIG. 22H), respectively. FIGS. 22C and 22D show refractive index distributions in a depth direction of the Ta$_2$O$_5$ strip-loaded optical waveguide and the Nb$_2$O$_5$ strip-loaded optical waveguide, respectively. The electric field distribution of the Ta$_2$O$_5$ strip-loaded optical waveguide has a full width at half maximum of about 3 μm shown in FIG. 22C, while the electric field distribution of the Nb$_2$O$_5$ strip-loaded optical waveguide has a smaller full width at half maximum, i.e., about 2.5 μm shown in FIG. 22D. Therefore, it is revealed that a light confinement effect is remarkably improved in the strip-loaded optical waveguide including the Nb$_2$O$_5$ cladding layer.

Although the Ta$_2$O$_5$ cladding layer is described as an example herein, electric field distributions of other cladding layers (SiO$_2$, Al$_2$O$_3$ and the like) are examined. As a result, it is found that a cladding layer should have a refractive index higher than that of the guide layer to improve a light confinement effect in a depth direction since the cladding layers having a refractive index equal to or lower than a refractive index (about 2.16) of the guide layer result in almost the same electric field distribution in a depth direction.

Figure 22F:
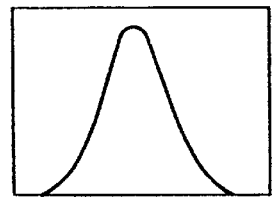
Figure 22G:
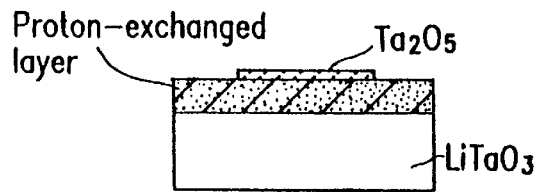
Figure 22H:
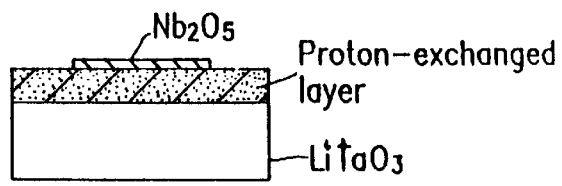

Next, FIGS. 22E and 22F show electric field distributions in a width direction of the strip-loaded optical waveguides shown in FIGS. 22G and 22H, respectively. Also in this case, the electric field distribution of the Ta$_2$O$_5$ strip-loaded optical waveguide has a full width at half maximum of about 6 μm in a width direction (FIG. 22E), while the electric field distribution of the Nb$_2$O$_5$ strip-loaded optical waveguide has a smaller full width at half maximum, i.e., about 5 μm (FIG. 22F). This result shows that the optical waveguide with a high light confinement effect in a width direction is obtained.

From the above results, it becomes apparent that the optical waveguide with a high light confinement effect can be formed by providing the cladding layer having a higher refractive index than that of the guide layer. The optical waveguide with a high light confinement effect serves to increase a power density of propagated light so as to improve the control efficiency of light. Thus, such an optical waveguide is effectively applied to an electric optical device and a nonlinear optical device using an optical waveguide.

Example 7

In Example 7, a method for further improving the characteristics of the optical wavelength conversion device will be examined.

Figure 23A:
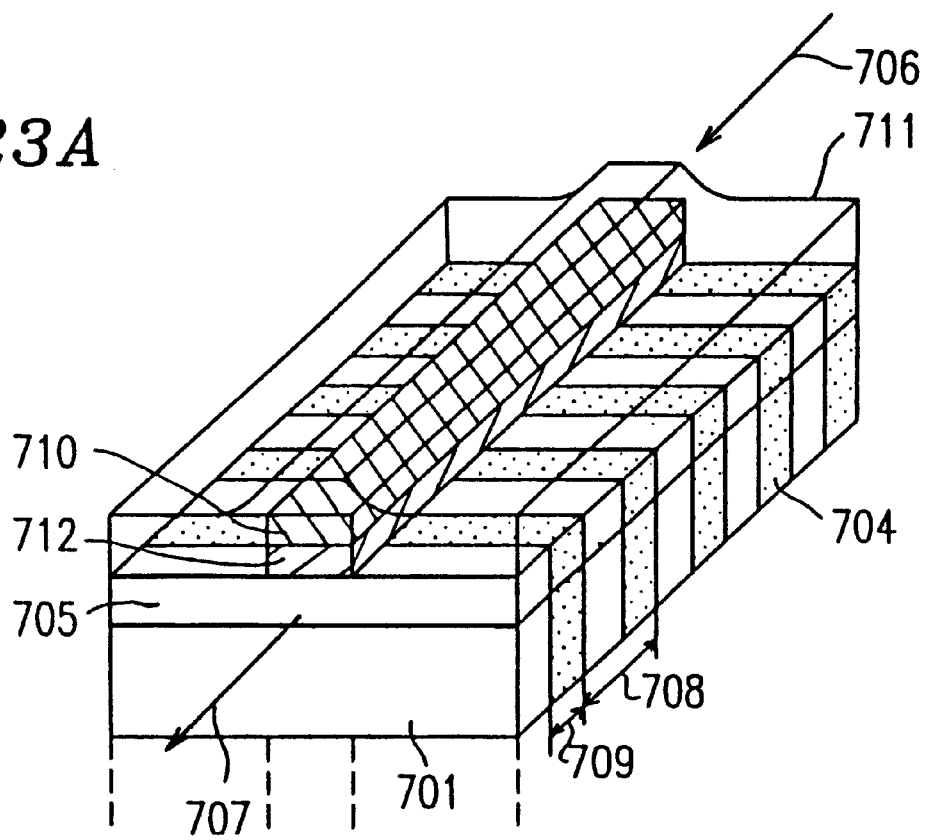
FIGS. 23A and 23B are schematic views showing the structure of an optical wavelength conversion device of Example 7 according to the present invention.
Figure 23B:
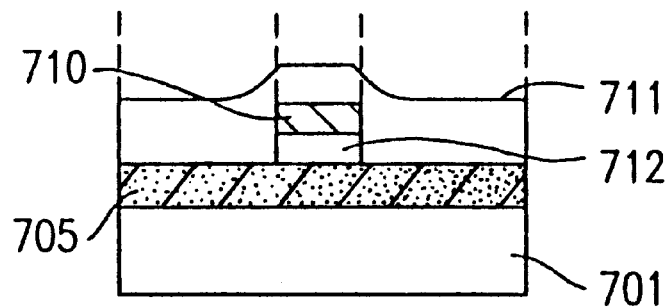

As described previously, by providing the cladding layer having a refractive index higher than that of the guide layer, a profile of the fundamental wave propagating through the optical waveguide can be controlled. In order to more easily control the profile of the fundamental wave propagating through the optical waveguide, the structure shown in FIG. 23 is formed. In this optical waveguide, a cladding layer has a multi-layered structure (710 and 712) so as to more easily control the profile of a fundamental wave 706.

FIG. 23(*a*) is a perspective view showing an optical wavelength conversion device, and FIG. 23(*b*) is a cross-sectional view thereof. The structure shown in FIGS. 23(*a*) and 23(*b*) is the same structure as that described with reference to FIG. 9 except that the cladding layer has a multi-layered structure including a SiO$_2$ layer 712 and a Nb$_2$O$_5$ layer 710. The corresponding components are denoted by corresponding reference numerals, and therefore the description thereof is herein omitted.

In order to attract the profile of the fundamental wave 706 to the surface of a LiTaO$_3$ substrate 701 so as to increase the degree of overlap between a second-harmonic wave 707 and the fundamental wave 706, the multi-layered cladding layer should include a layer having a refractive index higher than that of the LiTaO$_3$ substrate 701. In Example 7, the multi-layered cladding layer includes a Ta$_2$O$_5$ cladding layer 710 and a Sio$_2$ cladding layer 712. It is confirmed that the degree of overlap between the second-harmonic wave 707 and the fundamental wave 706 is improved to improve a conversion efficiency.

Next, a refractive index distribution of the optical waveguide is rendered symmetrical so as to improve a conversion efficiency.

If a refractive index distribution has a symmetrical structure with respect to the depth direction, the degree of overlap between the fundamental wave 706 and the second-harmonic wave 707 can be remarkably improved. In order to achieve this, the cladding layer should have a refractive index equal to that of the LiTaO$_3$ substrate 701. The LiTaO$_3$ substrate 701 has a refractive index of about 2.15 with respect to light having a wavelength of 860 nm. Therefore, in order to form the cladding layer having a refractive index close to 2.15, the cladding layer is made of a mixture of Nb$_{22}$O$_5$ and Ta$_2$O$_5$. Nb$_2$O$_5$ and Ta$_2$O$_5$ have refractive indices of about 2.25 and about 2.0, respectively. By controlling a mixture ratio thereof, a refractive index of the cladding layer can be brought close to 2.15.

The cladding layer is grown to about 500 nm by sputtering using a mixed target of Nb$_2$O$_5$ and Ta$_2$O$_5$. The optical wavelength conversion device having the same structure as that of FIG. 9 including the resulting formed cladding layer exhibits a remarkable improvement of a conversion efficiency owing to the increased degree of overlap.

By using the cladding layer having a refractive index equal to that of the substrate 701, a conversion efficiency of the optical wavelength conversion device is improved. The improvement of the conversion efficiency is observed in the case where the cladding layer has a refractive index equal to or higher than that of the LiTaO$_3$ substrate 701 and lower than that of the guide layer.

Example 8

In Example 8, the structure of an optical wavelength conversion device with an excellent resistance against optical damage will be described.

An optical damage is a phenomenon in which a refractive index of the optical waveguide is varied by light propagating through the optical waveguide to render an output thereof unstable. The optical damage frequently occurs particularly for light having a short wavelength. The optical wavelength conversion device converts a wavelength of the fundamental wave to obtain a second-harmonic wave with a short wavelength (wavelength: green—blue—ultraviolet). When an optical damage is generated in the optical wavelength conversion device, a refractive index of the optical waveguide is changed to alter an output of the second-harmonic wave, thereby rendering the wavelength conversion characteristics thereof unstable.

In Example 8, the structure for reducing the occurrence of an optical damage is examined.

A resistance against optical damage of the optical wavelength conversion device using a conventional buried type optical waveguide is measured. When a fundamental wave having a wavelength of about 860 nm is subjected to wavelength conversion to obtain a second-harmonic wave having a wavelength of about 430 nm in the optical wavelength conversion device including a LiTaO$_3$ substrate, the optical damage occurs at a second-harmonic wave output of several mW, resulting in an unstable output. As a result of the examination of the cause of the optical damage, the following is found.

First, by proton exchange, an electrical conductivity in the proton-exchanged layers is improved so as to increase a resistance against optical damage.

Second, the occurrence of optical damage is affected by the resistance against optical damage not only inside the optical waveguide but also in the periphery thereof. Since the buried type optical waveguide has a low electrical conductivity in the periphery of the optical waveguide to easily generate optical damage, an optical damage occurs in the periphery of the optical waveguide.

Third, nonuniformity of a duty ratio (width W of a domain-inverted layer/domain-inversion period λ) of the domain inversion period has an influence on the optical damage characteristics. Optical damage is a phenomenon in which a refractive index changes by an electric field excited by light through an electric optical effect. Thus, the degree of change in a refractive index is reduced by offsetting the optically excited electric field with a periodic domain-inverted structure. However, a duty ratio of the periodic domain-inversion structure tends to not be uniform in the buried type optical waveguide. As a result, optical damage occurs with respect to a low output of the second-harmonic wave.

As a result of examination on the resistance against optical damage, it becomes apparent that the resistance against optical damage in the vicinity of the optical waveguide particularly affects the characteristics of the optical wave. Since the strip-loaded optical waveguide includes proton-exchanged layers formed on the side faces thereof, the strip-loaded optical waveguide has a resistance against optical damage 10 times that of the buried type optical waveguide. However, the bottom face of the strip-loaded optical waveguide has the same structure as that of a normal buried optical waveguide. Therefore, the resistance against optical damage can be further increased by changing the structure of the bottom face of the strip-loaded optical waveguide.

Figure 24A:
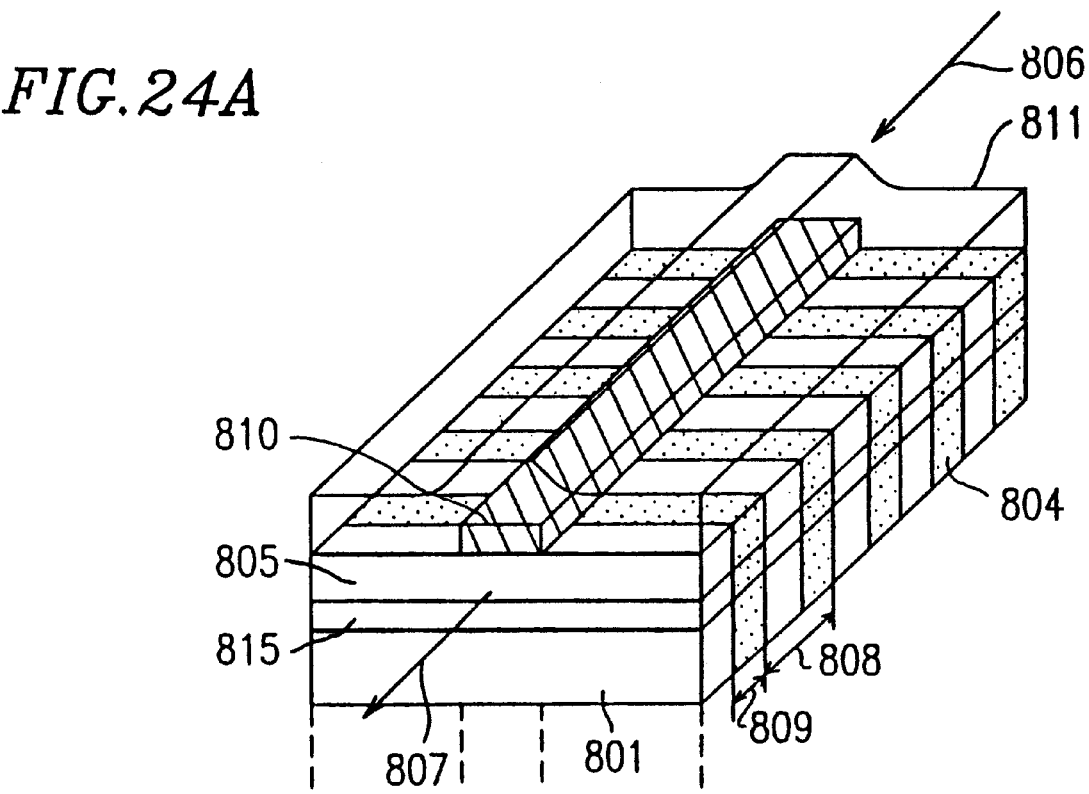
FIGS. 24A and 24B are schematic views showing the structure of an optical wavelength conversion device of Example 8 according to the present invention.
Figure 24B:
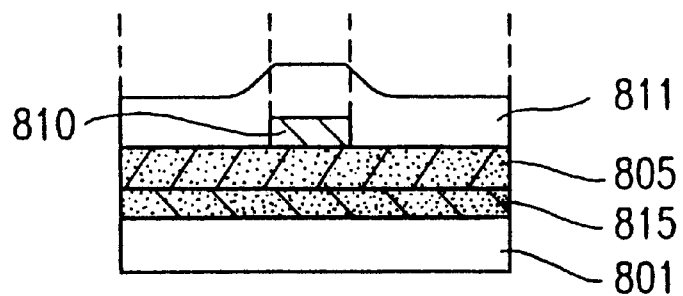

Accordingly, the inventors of the present invention found the structure of an optical wavelength conversion device shown in FIG. 24. FIG. 24(a) is a perspective view of an optical wavelength conversion device, and FIG. 24(b) is a cross-sectional view thereof. More specifically, a proton-exchanged layer has a multi-layered structure. Moreover, a second proton-exchanged layer 815 having a lower proton concentration is formed on the bottom face of a first proton-exchanged layer 805 serving as a guide layer. The structure shown in FIG. 24 differs from that shown in FIG. 9 only in that the proton-exchanged layer has a multi-layered structure as described above. The corresponding components are denoted by the corresponding reference numerals, and therefore the description thereof is herein omitted.

By providing the second proton-exchanged layer 815 on the bottom face of the first proton-exchanged layer 805 so as to increase an electrical conductivity, a resistance against optical damage can be further enhanced. It is confirmed that the resistance against optical damage is double or more than that of the strip-loaded optical waveguide.

In addition, it becomes apparent by the study of the present inventors that the resistance against optical damage depends on a domain inversion period. As described above, the electric field which occurs due to light excitation can be offset by the periodic domain-inverted structure. However, when the domain inversion period becomes large, this effect is lessened to easily cause optical damage. When the domain inversion period is about 4 μm or less, the resistance against optical damage is remarkably increased. Even when the domain inversion period is about 8 μm or less, the resistance against optical damage is doubled or more with respect to the substrate. However, when the domain inversion period is equal to about 10 μm or more, an improvement of the resistance against optical damage owing to domain inversion is not observed.

Example 9

In the previously described Examples 1 to 8, in order to form a guide layer with a high refractive index, a proton exchange treatment is performed. In the proton exchange treatment, a LiTaO$_3$ substrate is thermally treated in pyrophosphoric acid so as to exchange Li$^+$ ions in the LiTaO$_3$ substrate and H$^+$ ions in acid with each other, thereby forming a proton-exchanged layer with a high refractive index on the surface of the substrate. In Example 9, the proton exchange treatment is further improved to provide a method for forming an optical waveguide with a low loss and a high resistance against optical damage.

Since the concentration of the pyrophosphoric acid is hardly nonuniform in a solution owing to its large dissociation constant at a high temperature, a proton-exchanged layer having a uniform refractive index and a uniform thickness with a low loss can be advantageously obtained. On the other hand, since a large amount of Li ions in the substrate and a large amount of proton in accordance therewith are exchanged with each other, the surface of the substrate is chemically damaged to significantly deteriorate a nonlinearity constant of the substrate. Therefore, the controllability of the amount of exchanged protons in a proton exchange using pyrophosphoric acid is examined.

In order to control the amount of exchanged proton in pyrophosphoric acid, a method for neutralizing aid to lower a dissociation constant has been conventionally utilized. The change in proton exchange characteristics by adding phosphoric acid Li salt to pyrophosphoric acid is observed. However, even if the amount of phosphoric acid Li which is ten times or more the amount of pyrophosphoric acid is added, no change in proton exchange characteristics (an exchange rate, a refractive index and the like) is observed. Furthermore, when phosphoric acid Li is added, the viscosity of the solution is increased to remarkably deteriorate the operatibility.

In view of the above, a method for performing a proton-exchanged treatment with a proton transmissive film provided on the surface of the substrate is proposed.

Figure 25A:
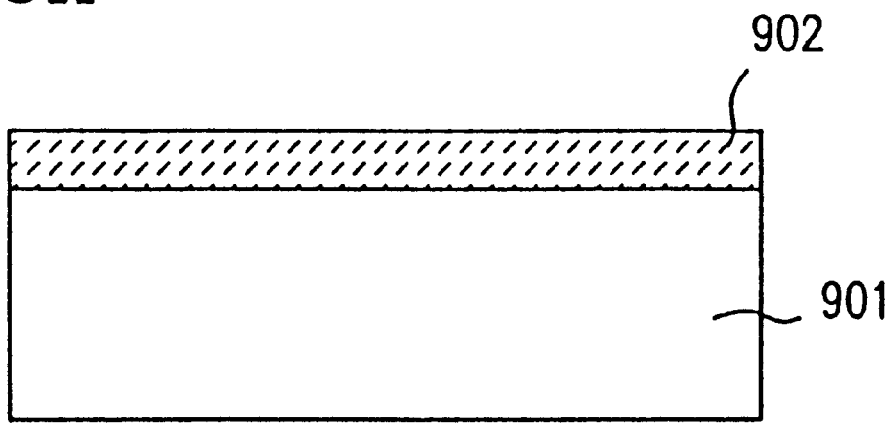
FIGS. 25A and 25B are cross-sectional views showing the fabrication steps of an optical wavelength conversion device in Example 9 according to the present invention.
Figure 25B:
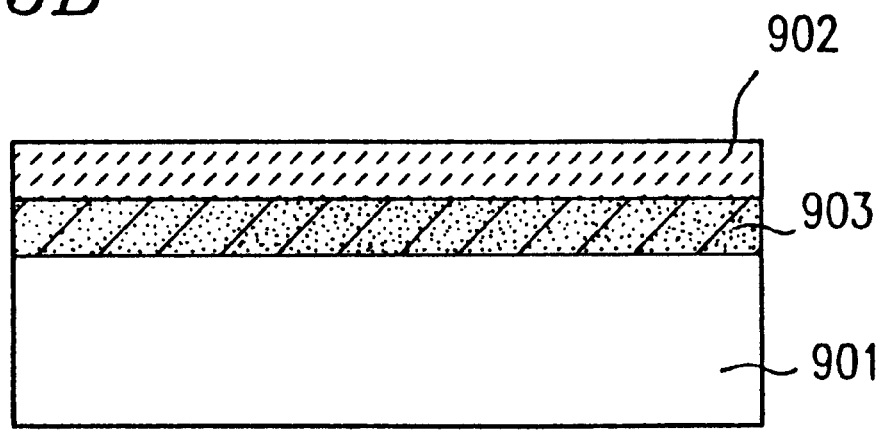

FIGS. 25A and 25B show the steps of fabricating an optical waveguide of Example 9.

First, as shown in FIG. 25A, a Ta$_2$O$_5$ film (a proton transmissive film) 902 is deposited onto a +C face of a LiTaO$_3$ substrate 901 by sputtering. Then, the LiTaO$_3$ substrate 901 is thermally treated in pyrophosphoric acid. Since a proton exchange treatment is performed through the Ta$_2$O$_5$ film 902, a proton-exchanged layer 903 can be formed between the LiTaO$_3$ substrate 901 and the Ta$_2$O$_5$ film 902, while controlling a proton exchange rate and a concentration of proton, as shown in FIG. 25B.

Figure 26:
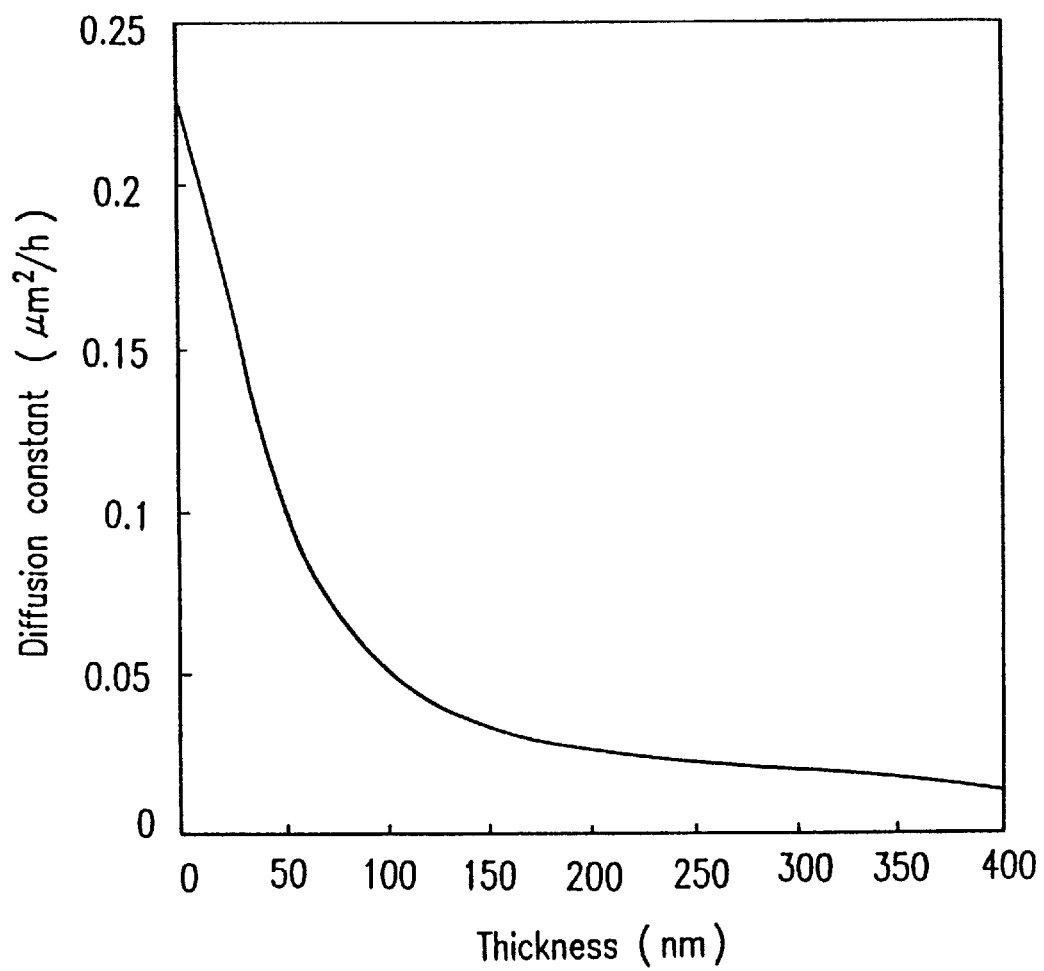
FIG. 26 is a graph showing the relationship between a thickness of a $Ta_2O_5$ transmissive film and a diffusion constant.

FIG. 26 is a characteristic diagram showing the relationship between a thickness of the Ta$_2$O$_5$ film 902 and a diffusion constant of proton exchange. As can be seen from FIG. 26, when a proton exchange treatment is performed at about 260° C., diffusion constants of 0.227 $\mu$m$^2$/h, 0.05 $\mu$m$^2$/h and 0.0132 $\mu$m$^2$/h are obtained with respect to 0 nm, 100 nm and 400 nm of the Ta$_2$O$_5$ film thickness, respectively. This result shows that a proton exchange rate is controlled by the thickness of Ta$_2$O$_5$ film.

As a result of evaluation of the thus formed proton-exchanged layer, it is found that the proton-exchanged layer has remarkably small chemical damage and therefore a propagation loss of the optical waveguide can be halved or less. In addition, since a resistance against optical damage is doubled or more, it is found that an optical waveguide with excellent characteristics is obtained.

Moreover, by reducing the amount of exchanged protons, nonlinearity of the proton-exchanged layer can be improved. When a proton exchange treatment is performed, a proton-exchanged layer is formed in a substrate made of LiTaO$_3$, LiNbO$_3$ or the like. As a result, a high refractive index layer having a stepwise refractive index distribution is formed. When the amount of exchanged protons in the proton-exchanged layer becomes large, nonlinearity of the proton-exchanged layer is halved or less than that of the substrate. In order to restore the nonlinearity, the proton-exchanged layer should be annealed to reduce the amount of exchanged proton. However, when annealing is performed, a proton-exchanged layer is spread by thermal diffusion. As a result, a stepwise refractive index distribution changes into a graded pattern. Therefore, when a proton exchange treatment is applied to the fabrication of an optical wavelength conversion device or the like, it is difficult to control the profile of an electric field distribution of the propagating light, resulting in a lowered conversion efficiency. However, since a proton concentration distribution can be controlled by using the Ta$_2$O$_5$ film as a proton transmissive film, an optical waveguide having a stepwise refractive index distribution while keeping a high nonlinearity can be formed.

In order to prevent the deterioration of nonlinearity, the Ta$_2$O$_5$ film should have a thickness of at least about 500 nm or more. Through the use of this method for forming an optical wavelength conversion device, a conversion efficiency can be remarkably improved.

As shown in FIG. 26, when the Ta$_{2O5}$ film has a thickness of about 100 nm or less, the degree of change in the diffusion constant with respect to the thickness of the Ta$_2$O$_5$ film becomes greater. Thus, in order to control the depth of the proton-exchanged layer, it becomes necessary to control the thickness of the Ta$_2$O$_5$ film with high accuracy. Therefore, it is substantially difficult to control the depth of the proton-exchanged layer with the Ta$_2$O$_5$ film. Moreover, with the Ta$_2$O$_5$ film having a thickness of about 50 nm or less, the effect of reducing the chemical damage becomes small. As a thickness of the Ta$_2$O$_5$ film increases, a diffusion constant is lowered. As a result, a proton exchange time period is prolonged to lower the producibility.

From these results, the Ta$_2$O$_5$ film suitably has a thickness of about 1 $\mu$m or less. More specifically, the Ta$_2$O$_5$ film suitably has a thickness in the range of about 500 nm to about 1000 nm so as to form a highly nonlinear optical waveguide, and suitably has a thickness in the range of about 50 nm to about 100 nm so as to control a proton exchange rate.

Figure 27A:
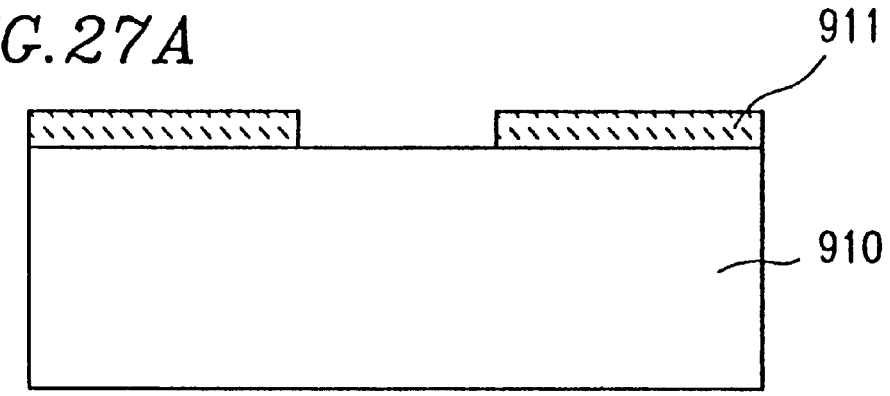
FIGS. 27A to 27C are cross-sectional views showing other fabrication steps of the optical wavelength conversion device in Example 9 according to the present invention.
Figure 27B:
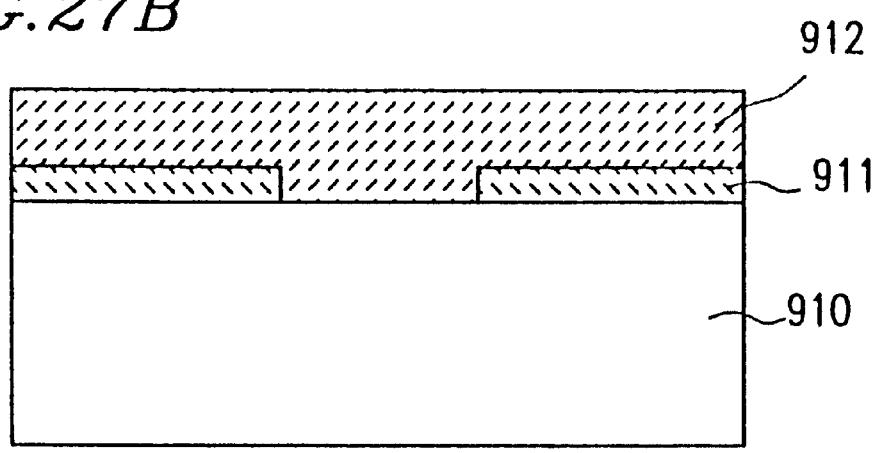
Figure 27C:
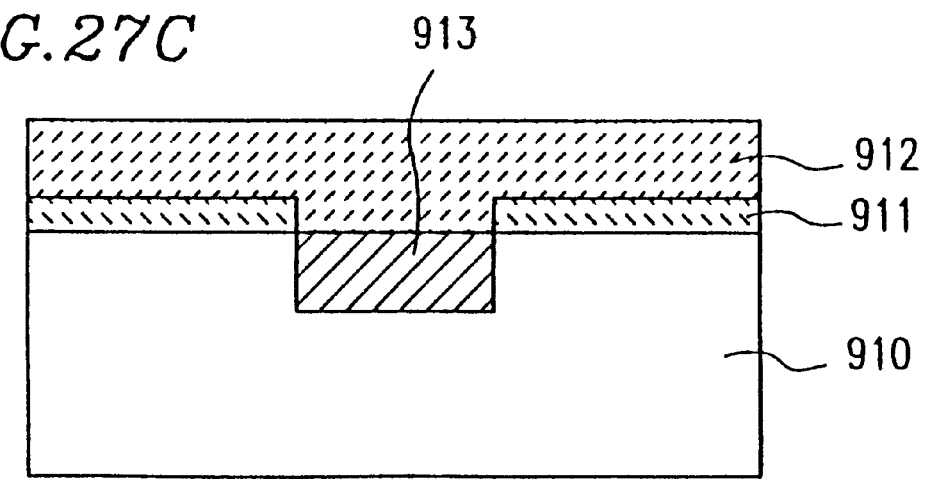

The combination of the Ta$_2$O$_5$ transmissive film and a proton exchange selecting mask allows a proton exchange profile to significantly change so as to control an electric field distribution of propagating light, as explained below with reference to FIGS. 27A to 27C. FIGS. 27A to 27C show a method for fabricating an optical waveguide according to the present invention.

First, as shown in FIG. 27A, a stripe-shaped mask pattern 911 made of Ta (thickness: about 60 nm) is formed on a +C face of a LiTaO$_3$ substrate 910. Then, as shown in FIG. 27B, a Ta$_2$O$_5$ film 912 having a thickness of about 400 nm is deposited onto the Ta mask 911 and the LiTaO$_3$ substrate 910. Next, as shown in FIG. 27C, the LiTaO$_3$ substrate 910 is thermally treated in pyrophosphoric acid so as to perform a proton exchange treatment through the Ta$_2$O$_5$ layer 912. Since the Ta film serves as a protection film, the proton exchange is performed only in the region on which the Ta film 911 is not formed. A proton exchange treatment is performed at about 260° C. for about four hours.

Figure 28A:
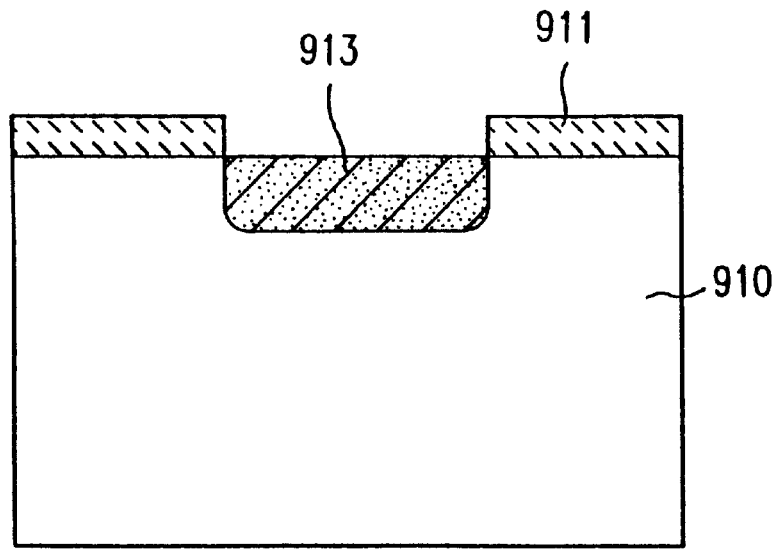
FIGS. 28A and 28B are cross-sectional views showing formed proton-exchanged layers.
Figure 28B:
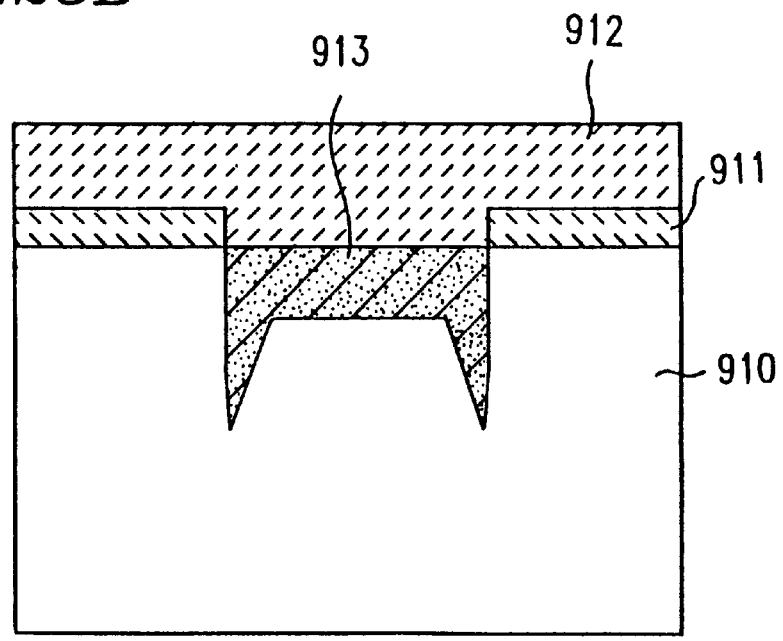

FIGS. 28A and 28B are cross-sectional views showing proton exchange profiles of the obtained samples. FIG. 28A shows the case where a $Ta_2O_5$ film 913 is not provided, and FIG. 28B shows the case where a $Ta_2O_5$ film 913 having a thickness of about 400 nm is provided. As can be understood from FIG. 28B, by providing the $Ta_2O_5$ film, a proton exchange proceeds mainly in the vicinity of the edges of the Ta mask 911 and slowly in the middle part of the opening of the Ta mask 911. Therefore, both sides of the proton-exchanged layer 913 is deeply formed. The reason for this is considered that a proton exchange rate is increased in the vicinity of the edges of the Ta mask 911 since the $Ta_2O_5$ film 912 has a small thickness in the vicinity of the edges of the Ta mask 911.

Since the thus obtained optical waveguide allows light having two peaks propagating in a second order mode to be selectively excited, a light output having two peaks is available. A light output having two peaks can be utilized in the detection of optical disks in optical computers or as light for detecting a positional error in optical computers or in measurement apparatuses for detecting operation. Moreover, if such a light output having two peaks is used in an optical demultiplexer, a propagating light beam can be efficiently demultiplexed to two optical waveguides.

Figure 29:
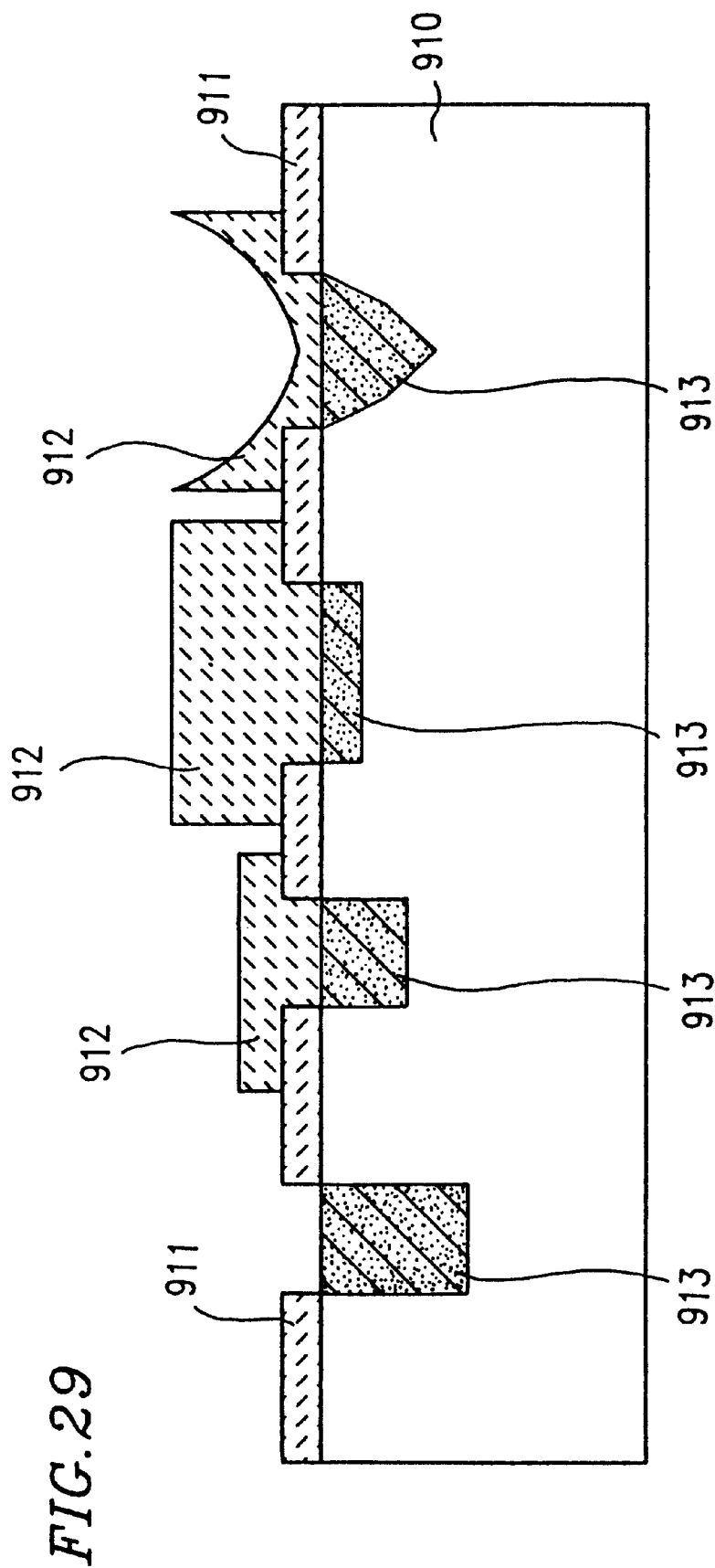
FIG. 29 is a cross-sectional view showing a proton-exchanged layer formed in a proton exchange treatment using a transmissive film.

By taking the advantages of a $Ta_2O_5$ film thickness dependence of the proton exchange rate, it is possible to control a profile of the proton-exchanged layer. In order to form a proton-exchanged layer having a varying thickness in a single wafer, it is normally necessary to repeat a proton exchange treatment for a particular portion by using a proton exchange mask. However, by using the $Ta_2O_5$ transmissive film, it is possible to form a proton-exchanged layer having a varying thickness in a single proton exchange step. For example, as shown in FIG. 29, by providing $Ta_2O_5$ transmissive films 912 having a varying thickness, it is possible to form proton-exchanged layers having respectively different thicknesses in a substrate 910 in a single proton exchange treatment. Furthermore, by providing the $Ta_2O_5$ transmissive film 912 having a thickness changing in a tapered manner, a proton-exchanged layer 913 having a depth changing in a tapered manner can be formed.

By using the above method, a distribution of exchanged proton can be arbitrary changed so as to simplify the fabrication process.

Next, a mask having an excellent anti-acid resistance, with which a proton exchange treatment can be performed for a long time, is described.

In order to deeply form a proton-exchanged layer in a substrate made of $LiTaO_3$, $LiNbO_3$ or the like, it is necessary to perform a proton exchange treatment for a long time. For example, in order to form a proton-exchanged layer having a depth of about 2 $\mu$m or more in a $LiTaO_3$ substrate, it is necessary to perform a proton exchange treatment at about 260° C. for about four hours or more. In order to selectively perform a proton exchange treatment, the mask should be capable of being resistant to a proton exchange treatment at a high temperature for a long time. However, in the conventional technique, even if a Ta mask having an excellent anti-acid resistance is used, the Ta mask can hardly bear a proton exchange treatment for one hour or more.

The present inventors found that by depositing an oxide film on a metal film, a mask having an excellent anti-acid resistance capable of bearing a proton exchange treatment for a long time can be obtained. In an experiment, after a Ta film having a thickness of about 60 nm is deposited, a $Ta_2O_5$ film having a thickness of about 400 nm is deposited thereon. Even when a proton exchange treatment of 4 hours or more is performed with the thus fabricated mask, the mask is resistant to proton and the region of the substrate under the mask remains intact to the proton exchange. Thus, by depositing an oxide film on the metal mask, a proton exchange mask having an excellent anti-acid resistance is realized.

Although the $Ta_2O_5$ film is used as a transmissive film in Example 9, the same effect can also be obtained by using other oxide films having an excellent anti-acid resistance made of, for example, $Nb_2O_5$, $SiO_2$, $TiO_2$, $Al_2O_3$, $LiNbO_3$ or $LiTaO_3$.

Example 10

A method for fabricating an optical waveguide according to the present invention and the optical waveguide obtained thereby will be specifically described.

First, an etching rate in a method for fabricating an optical waveguide and an optical wavelength conversion device in Examples 10 to 15 according to the present invention will be described.

It is difficult to etch a structurally and chemically stable substrate, for example, a quartz substrate, which is hardly processed and etched by a solvent, even by wet etching, dry etching or reactive ion etching. Since such a substrate has a small selection ratio to a resist pattern in etching, it is difficult to form a deep etching pattern when etching is performed in a fine manner.

In the fabrication method of the optical waveguide and the optical wavelength conversion device according to the present invention described below, the properties of the substrate are altered by selectively performing ion exchange on the etched region so as to increase an etching rate. For example, if a $LiNbO_3$ substrate or a $LiTaO_3$ substrate is thermally treated in acid, Li atoms and protons (+H) in crystal are exchanged with each other to form a proton-exchanged layer. In the proton-exchanged layer, the strength of atomic bond is weaker than that of original crystal. Therefore, the proton-exchanged layer tends to be easily etched. As a result, the proton-exchanged layer is easily etched by wet etching, dry etching or reactive ion etching. Therefore, in the method for fabrication of the optical waveguide and the optical wavelength conversion device according to the present invention, ion exchange is selectively performed on the region to be etched and subsequently the region is etched. As a result, etching with a high selection ratio and increased accuracy can be performed. Thus, according to the fabrication method of the present invention, high quality optical waveguides and optical wavelength conversion devices can be formed.

Next, unevenness occurring on the surface of the optical waveguide in the fabrication method of the optical wavelength conversion device having a domain-inverted structure with a predetermined period so as to perpendicularly cross a light propagating direction is described.

In a conventional fabrication method, unevenness is generated on the surface of the optical waveguide by etching. As a result, the light propagation loss is large. This results from a difference in the etching rate between the domain-inverted region and the other region on the surface of the optical wave, because the domain-inverted region and the other region have different crystal faces. However, if an ion exchange treatment is performed for the face having a periodic domain-inverted structure, unevenness does not occur in the ion-exchanged region even when the ion-exchanged region has a periodic domain-inverted structure. Therefore, by performing etching after selectively performing an ion exchange treatment for the region to be etched, unevenness on the surface of the optical waveguide is eliminated. As a result, the optical wavelength conversion device including the optical waveguide with a low light propagation loss and a high efficiency can be fabricated.

Next, an optical damage in the optical waveguide and the optical wavelength conversion device fabricated by the fabrication method of the present invention will be described.

In a conventional buried type optical waveguide, an electric field distribution of light propagating through the optical waveguide externally leaks from the optical waveguide. Therefore, in the case where strong light propagates through the optical waveguide, optical damage occurs in the outer peripheral region of the optical waveguide. The optical damage is a phenomenon in which a refractive index of a material is changed by the incidence of light thereon. In a ridge type optical waveguide fabricated by the fabrication method of the present invention, however, the amount of light leaking in the peripheral region becomes small because a ridge type guide layer is formed on the surface of the optical waveguide. As a result, the optical waveguide according to the present invention is highly resistant against optical damage.

A change in refractive index due to optical damage is induced by charges which are generated from an impurity in the crystal by irradiation of light to generate an electric field within the crystal. However, if an ion-exchanged region is formed in the vicinity of the waveguide, electrical conductivity is increased in the ion-exchanged region so as to prevent an internal electric field from being generated. Thus, since a ridge type ion-exchanged layer is formed on the surface of the optical waveguide in the structure formed by the fabrication method of the present invention, optical damage is prevented.

Next, the overlap of electric field distributions in the optical wavelength conversion device according to the present invention will be described.

In the optical wavelength conversion device, the degree of overlap of electric field distributions of a fundamental wave and a second-harmonic wave greatly affects the conversion efficiency. Since a ridge is formed on the surface of the optical waveguide in the optical wavelength conversion device according to the present invention, a stepwise refractive index distribution is obtained. Thus, the degree of overlap between the fundamental wave and the second-harmonic wave can be increased as compared with a conventional buried type optical waveguide. Furthermore, since a layer having a high ion concentration is formed in the vicinity of the surface of the optical waveguide, the degree of overlap of electric field distributions in a depth direction is also increased. As a result, the optical wavelength conversion device according to the present invention has a high conversion efficiency.

FIGS. 30A to 30F show the steps of fabricating the optical waveguide of Example 10 according to the present invention. FIGS. 30A to 30F are cross-sectional views taken along a line perpendicularly crossing a light guiding direction.

Figure 30A:
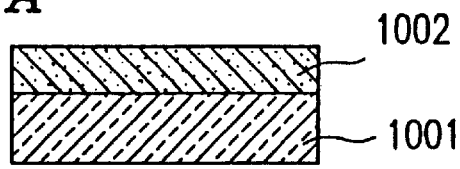
FIGS. 30A to 30F are cross-sectional views showing the fabrication steps of an optical waveguide in Example 10 according to the present invention.

First, as shown in FIG. 30A, a LiTaO$_3$ single crystalline substrate 1001, which is a C plate (cut along a face perpendicular to a C axis of the crystal) of a nonlinear optical material (hereinafter, referred to simply as a substrate 1001), is immersed into pyrophosphoric acid at a temperature in the range of about 200° C. to about 300° C. for several minutes so as to perform a proton exchange treatment. By this proton exchange treatment, a first proton-exchanged layer 1002 is formed on the surface of the substrate 1001 as shown in FIG. 30A.

Figure 30B:
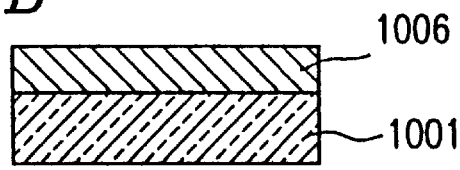

Next, the substrate 1001, which is formed in the previous step shown in FIG. 30A, is annealed at a temperature in the range of about 400° C. to about 450° C., so as to convert the first proton-exchanged layer 1002 into an annealed proton-exchanged layer 1006 as shown in FIG. 30B.

Then, a Ta film having a thickness of about 60 nm is deposited onto the surface of the substrate 1001 formed in the step shown in FIG. 30B by sputtering or vapor deposition. Thereafter, a strip-shaped Ta layer 1003 having a predetermined width is formed by photolithography and dry etching in a CF$_4$ atmosphere.

Figure 30C:
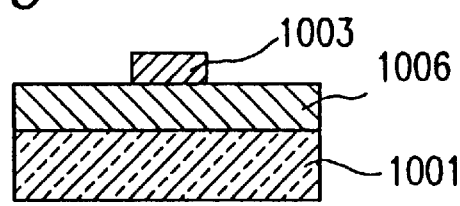

Subsequently, by using the Ta layer 1003 formed in the step shown in FIG. 30C as a protection mask, another proton exchange treatment is performed for an unmasked portion. By this proton exchange treatment, a second proton-exchanged layer 1005 having a predetermined depth from the surface of the annealed proton-exchanged layer 1006 is formed as shown in FIG. 30D.

Figure 30D:
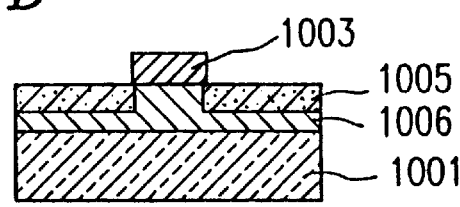
Figure 30E:
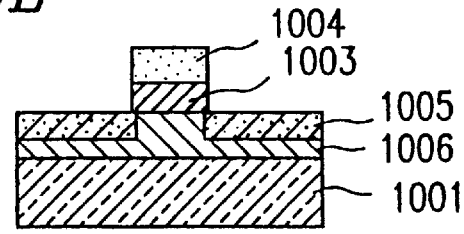

After applying a negative resist (not shown) onto the surface of the substrate 1001 formed in the step shown in FIG. 30D, an ultraviolet ray is irradiated from the bottom face so as to expose the negative resist to light to be developed so that a resist pattern 1004 is formed on the strip-shaped Ta layer 1003. Since only the unmasked region is exposed to light with the strip-shaped Ta layer 1003 serving as a protection mask, a strip-shaped resist pattern 1004 having a predetermined width is formed only on the Ta layer 1003 in a selective manner as shown in FIG. 30E.

Figure 30F:
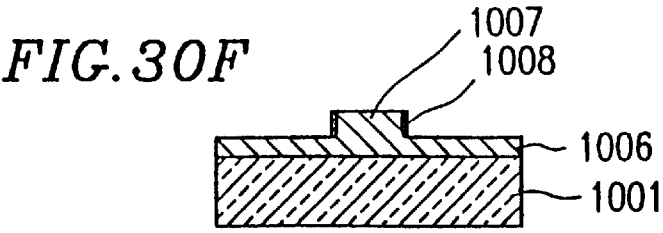

The substrate is subjected to dry etching in a CHF$_3$ atmosphere by using the previously formed resist pattern 1004 and the Ta layer 1003 as a protection mask. As a result, the unmasked region of the second proton-exchanged layer 1005 is etched away. Thereafter, the substrate 1001 is immersed into a mixed solution of hydrofluoric acid and nitric acid (1:2) for several seconds so as to completely remove the remaining Ta layer 1003 and the remaining resist pattern 1004. Then, both end faces serving as a light input face and a light output face of the optical waveguide are optically polished, thereby completing the optical waveguide of Example 10 with a ridge 1007 as shown in FIG. 30F.

On the side faces of the ridge 1007, proton-exchanged regions 1008 are respectively formed. The proton-exchanged regions 1008 are formed by lateral diffusion of proton when the second proton-exchanged layer 1005 is formed by using the Ta layer 1003 serving as a protection mask. Since the proton-exchanged regions 1008 are not annealed, the proton-exchanged regions 1008 have a higher proton concentration and a higher refractive index as compared with that of the annealed proton-exchanged layer 1006.

The etching in the fabrication method of Example 10 will be described.

In the above fabrication method, since only the region to be etched is selectively subjected to a proton exchange treatment using the Ta layer 1003 as a protection mask, an etching rate is remarkably improved as compared with a conventional etching rate. Moreover, since it is ensured that only the proton-exchanged layer is etched, the guide layer is not affected by the proton exchange.

Table 3 below shows the result of comparison of etching rates of a LiTaO$_3$ substrate in a CHF$_3$ atmosphere.

TABLE 3

| Substrate | Etching rate | Selection ratio to resist |
| --- | --- | --- |
| LiTaO$_3$ | 4 nm/min | 0.2 |
| Annealed LiTaO$_3$ after proton exchange | 4 nm/min | 0.2 |
| Proton-exchanged LiTaO$_3$ | 20 nm/min | 1 |

Table 3 shows comparison data of an etching rate with respect to LiTaO$_3$ in a CHF$_3$ atmosphere, and more specifically, an etching rate and a selection ratio to a resist pattern. A selection ratio herein is represented by a normalized value with respect to the value of the proton-exchanged LiTaO$_3$ substrate. In Table 3, a LiTaO$_3$ substrate, an annealed LiTaO$_3$ substrate after proton exchange and a proton-exchanged LiTaO$_3$ substrate are listed as the substrates to be etched.

As shown in Table 3, by performing a proton exchange treatment for a LiTaO$_3$ substrate, a high selection ratio (5 times) to a resist pattern is obtained as compared with the other substrates. In the proton-exchanged LiTaO$_3$ substrate, a fine and deep etching pattern is obtained as compared with the other substrates.

Moreover, a depth of etching can be controlled with high accuracy by utilizing proton exchange in the fabrication method in Example 10. The principle of this will be described below.

In a typical dry etching apparatus, the thickness control of the etching process has an error of ± several percent. Therefore, in the case where an optical waveguide is fabricated by using such a dry etching apparatus, the properties of the optical waveguide are disadvantageously varied. However, an etching depth can be controlled with high accuracy by the method for fabricating the optical waveguide of Example 10 according to the present invention. The reason for this will be described below.

As shown in Table 3 above, the etching rate in the proton-exchanged LiTaO$_3$ substrate and that in the annealed proton-exchanged LiTaO$_3$ substrate greatly differ from each other. Therefore, when etching reaches the annealed region at the completion of etching of the proton-exchanged layer in the fabrication method of Example 10 according to the present invention, an etching rate is remarkably lowered. The etching is substantially stopped. Thus, the depth of etching is substantially identical with that of the proton-exchanged layer. Moreover, a depth of the proton-exchanged layer can be controlled with an accuracy of ±1% or less. Accordingly, as in the case of the control of the depth of the proton-exchanged layer, the depth of etching can be controlled with almost the same accuracy, i.e., ±1% or less.

Furthermore, since the proton-exchanged LiTaO$_3$ substrate has a high selection ratio for a resist pattern, it is ensured that the shape of the resist pattern can be retained during etching. Therefore, according to the fabrication method of the present invention, the resultant etched proton-exchanged LiTaO$_3$ substrate includes a shape which is more perpendicular to the surface of the substrate, as compared with the etched LiTaO$_3$ substrate.

Next, self-alignment in the fabrication method of Example 10 will be described.

In the fabrication method of the present invention, the Ta layer 1003 serves as both the protection mask for forming the second proton-exchanged layer 1005 and the mask for exposing the negative resist to light. Therefore, the Ta layer 1003 functions as the protection mask for performing a proton exchange only for the region to be etched in a selective manner and also as the mask for forming the resist pattern 1004 only on the Ta layer 1003 through bottom face exposition. In this manner, since the resist pattern 1004 can be accurately formed on the Ta layer 1003 by self-alignment, only the proton-exchanged region can be accurately etched according to the fabrication method of Example 10. As a result, the optical waveguide is uniformly formed while reducing a loss, and the method for fabricating the optical waveguide of Example 10 has excellent reproducibility and mass-producibility. Furthermore, according to the fabrication method of Example 10, it is ensured that a resist pattern can be formed only on the metal mask by self-alignment. Thus, the fabrication of the optical waveguide can be facilitated to allow the mass-production thereof.

Next, an experiment for evaluating characteristics of the optical waveguide fabricated by the fabrication method of Example 10 according to the present invention will be described.

Figure 31:
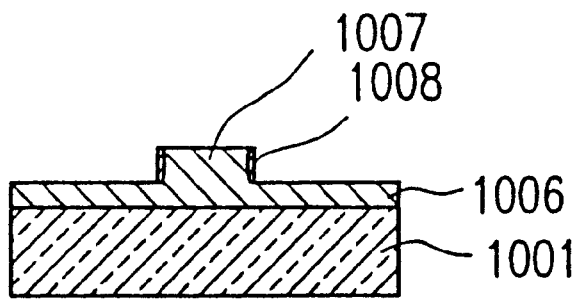
FIG. 31 is a cross-sectional view showing the structure of an optical waveguide.

FIG. 31 is a cross-sectional view showing the optical waveguide fabricated by the fabrication method of Example 10 described above. In FIG. 31, the same components as those in FIGS. 30A to 30F are denoted by the same reference numerals.

An experiment for evaluating the characteristics of the resulting fabricated optical waveguide is carried out by propagating a light beam having a wavelength of 860 nm therethrough. A light beam having a wavelength of 860 nm emitted from a semiconductor laser is coupled to the optical waveguide. A near-field pattern of the guided light beam is then measured by a lens from the light output face of the optical waveguide.

As a result of this measurement, the optical waveguide of Example 10 has a high light confinement effect owing to the proton-exchanged regions 1008 formed on the side faces of the ridge 1007. Therefore, a distribution of the light confined within the optical waveguide with respect to the input laser light is improved by several % over the conventional structure. Furthermore, it is revealed that this optical waveguide has a stepwise refractive index distribution in a width direction.

Next, the results of the measurements of various characteristics in the above characteristic evaluation experiment will be individually described.

First, propagation characteristics of the optical waveguide fabricated in Example 10 will be described.

As a result of measuring the propagation loss of light propagating through the optical waveguide of Example 10, it is revealed that the optical waveguide has a relatively low propagation loss, i.e., about 2 dB/cm. This value is about half of the optical waveguide value which is obtained by direct etching of the LiTaO$_3$ substrate. Accordingly, it can be understood that the optical waveguide with a low propagation loss can be fabricated by the fabrication method of Example 10.

Next, the result of measuring the nonlinearity of the optical waveguide fabricated in Example 10 will be described.

When the LiTaO$_3$ substrate is subjected to a proton exchange treatment, a nonlinear optical constant and an electro-optic constant thereof are significantly deteriorated. This is a great problem which arises when the optical waveguide including the proton-exchanged LiTaO$_3$ substrate is applied to a nonlinear optical device, an electro-optical device and/or the like. However, when the optical waveguide including the proton-exchanged LiTaO$_3$ substrate is further annealed at a high temperature, it is confirmed that a proton concentration is lowered and each of the constants is restored to that of a normal LiTaO$_3$ substrate.

As a result of measuring the nonlinear optical constant of the optical waveguide fabricated by the fabrication method of Example 10, it is confirmed that the optical waveguide has almost the same nonlinear optical constant as that of the optical waveguide including an annealed LiTaO$_3$ substrate. The reason for this is as follows. The second proton-exchanged layer 1005 is selectively formed on the region to be removed by etching, and therefore the optical waveguide is not affected thereby. Although the optical waveguide of Example 10 includes the small proton-exchanged regions 1008 formed on both sides of the ridge 1007, the optical waveguide does not include a region having a high proton concentration therein. Thus, the optical waveguide has a high nonlinearity.

Next, the result of measuring the guide loss characteristics of the optical waveguide fabricated in Example 10 will be described.

A guide loss of a ridge type optical waveguide results from slight unevenness which occurs at the etching of the ridge. In particular, since a difference in refractive index between the optical waveguide (a refractive index: about 2.2) and an air layer (a refractive index: 1.0) is great, a guide loss becomes significant when unevenness is present on the surface of the optical waveguide layer. In order to reduce the guide loss, it is necessary to cover the entire optical waveguide with a material having a refractive index higher than that of the air layer. Thus, the entire ridge type optical waveguide of Example 10 is covered with a material having a refractive index higher than that of the air layer.

Figure 32:
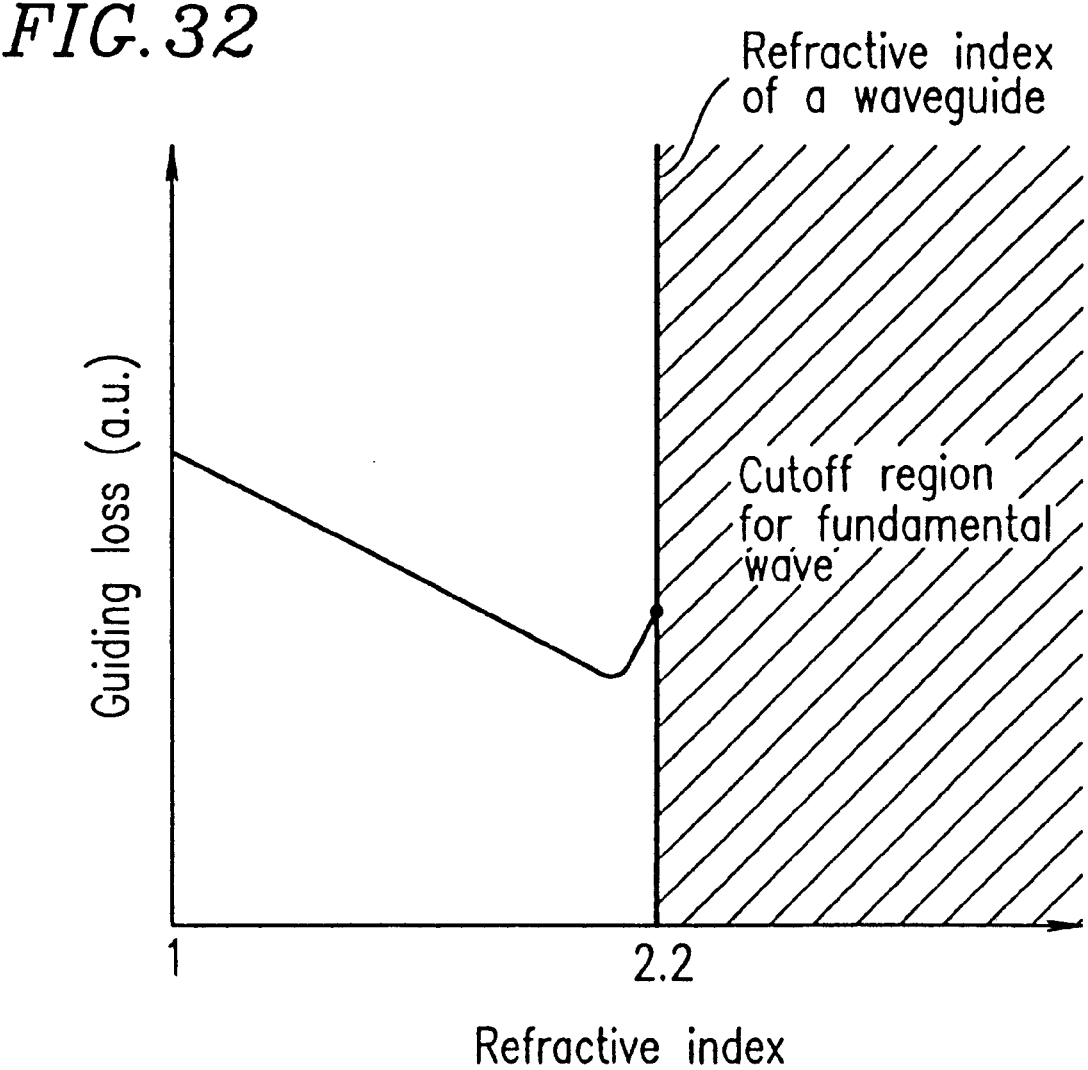
FIG. 32 is a graph showing the relationship between a refractive index and a guide loss of a layer formed on the surface of the optical waveguide shown in FIG. 31.

FIG. 32 is a graph showing the relationship between a refractive index and a guide loss of a film covering the entire surface of the optical waveguide. As shown in FIG. 32, as a refractive index increases from 1.0, a guide loss is lowered accordingly. However, when the refractive index of the film exceeds that of the optical waveguide, light cannot be confined within the optical waveguide. As a result, the fundamental wave is cut off. In order to avoid such a cutoff, the material of the film is selected from light transmitting materials having a refractive index greater than that (about 1.0) of the air layer and smaller than that (about 2.2) of the optical waveguide.

Although the LiTaO$_3$ single crystalline substrate is used in Example 10, the same effect can be obtained by using a LiNbO$_3$ single crystalline substrate or a LiTaO$_3$ and LiNbO$_3$ (LiNb$_{(1-x)}$Ta$_x$O$_3$ ($0 \leq x \leq 1$)) polycrystalline substrate. LiNbO$_3$ is applied to optical waveguide devices in various fields (optical switches, nonlinear optical devices, acousto-optical devices and the like) due to its high electro-optical constant and nonlinear optical constant. Thus, the method for fabricating an optical waveguide and an optical wavelength conversion device of Example 10 is extremely effective in these applications.

Although the LiTaO$_3$ substrate is used in Example 10, a MgO:LiNbO$_3$ or a MgO:LiTaO$_3$ substrate, i.e., the substrate to which MgO is added, can also be used. Since these substrates have high resistance against optical damages, a high-output optical waveguide or a high-output optical wavelength conversion device can be effectively formed thereof.

Alternatively, a KTiOPO$_4$ substrate can be used instead. In the case where the KTP substrate is used, Rb ion exchange is performed as the ion exchange so as to form an optical waveguide having the same effect as that described above in Example 10. Since KTP has an excellent resistance against optical damage, a high-output optical waveguide can be obtained by using the KTP substrate.

Example 11

A method for fabricating an optical waveguide of Example 11 will be described with reference to FIGS. 33A to 33F.

FIGS. 33A to 33F show the steps of the fabrication method of the optical waveguide of Example 11. FIGS. 33A to 33F are cross-sectional views of the optical waveguide in the respective fabrication steps.

Figure 33A:
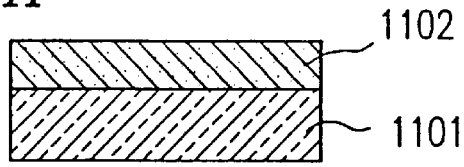
FIGS. 33A to 33F are cross-sectional views showing the fabrication steps of an optical waveguide in Example 11 according to the present invention.

First, as shown in FIG. 33A, a LiTaO$_3$ single crystalline substrate 1101, which is a C plate (cut along the face perpendicular to the C axis of the crystal) of a nonlinear optical material (hereinafter, referred to simply as a substrate 1101), is immersed into pyrophosphoric acid at a temperature in the range of about 20° C. to about 300° C. for several minutes so as to perform a proton exchange treatment. By this proton exchange treatment, a first proton-exchanged layer 1102 is formed on the surface of the substrate 1101 as shown in FIG. 33A.

Figure 33B:
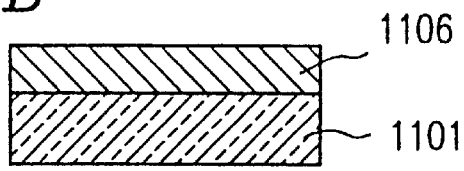

Next, the substrate 1101, which is formed in the previous step shown in FIG. 33A, is annealed at a temperature in the range of about 400° C. to about 450° C., so as to convert the first proton-exchanged layer 1102 to an annealed proton-exchanged layer 1106 as shown in FIG. 33B.

Figure 33C:
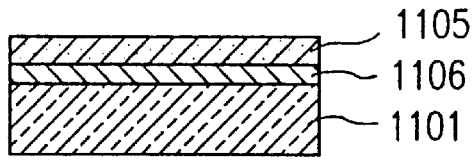

The substrate, which is formed in the previous step shown in FIG. 33B, is thermally treated in pyrophosphoric acid again to form a second proton-exchanged layer 1105 extending from the surface of the annealed proton-exchanged layer 1106 to a predetermined depth as shown in FIG. 33C.

Figure 33D:
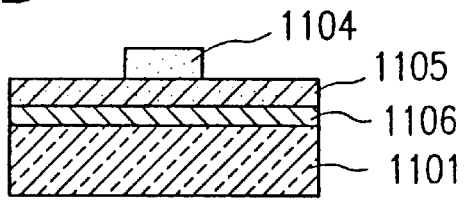

Then, a strip-shaped resist pattern 1104 having a predetermined depth is formed on the second proton-exchanged layer 1105 by photolithography as shown in FIG. 33D.

Figure 33E:
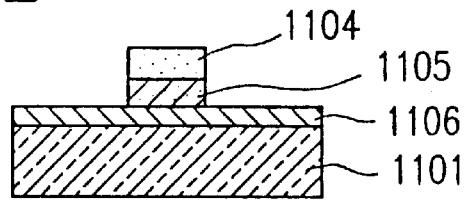

The second proton-exchanged layer 1105 is subjected to dry etching in a CHF$_3$ atmosphere by using the resist pattern 1104 as a protection mask so as to remove an unmasked region by etching as shown in FIG. 33E.

Figure 33F:
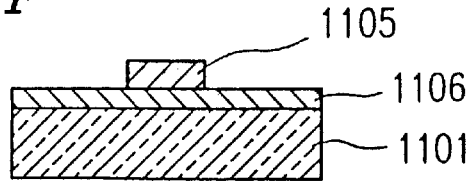

The remaining resist pattern 1104 on the strip-shaped second proton-exchanged layer 1105 is removed as shown in FIG. 33F.

Thereafter, both end faces serving as a light input face and a light output face of the optical waveguide are optically polished, thereby completing the optical waveguide through which light is guided in a direction perpendicular to the plane of the paper in FIGS. 33A to 33F. The annealed proton-exchanged layer 1106, which is formed in the step shown in FIG. 33B, typically has a depth of about 2.5 $\mu$m, and the ridge, which is formed in the step shown in FIG. 33F, typically has a height of about 0.4 $\mu$m.

The fabrication method of Example 11 has the following features.

Since the fabrication method of Example 11 has simple steps, it is possible to easily fabricate a ridge type optical waveguide. Moreover, according to the fabrication method of Example 11, the second proton-exchanged layer 1105 is formed on the region to be etched so as to change the characteristics of the region alone, thereby remarkably improving an etching rate. Furthermore, since the depth of etching is substantially identical with the depth of the second proton-exchanged layer 1105, the depth of etching can be controlled to a predetermined value by forming the second proton-exchanged layer 1105 having a predetermined depth with a high accuracy. As a result, according to the fabrication method of Example 11, since the ridge can be formed with a high accuracy, the optical waveguides, equally having high quality, can be fabricated. Furthermore, according to the fabrication method of Example 11, the resulting optical waveguide, which has the proton-exchanged layers formed on the side faces of the ridge, is scarcely affected by the proton-exchanged regions. Moreover, according to the fabrication method of Example 11, since the high refractive index layers having a high proton-exchanged concentration are formed on both sides of the ridge, an optical waveguide having a high light confinement effect can be formed.

In addition, since the optical waveguide of Example 11 includes a region having a high proton concentration formed on the surface thereof, the optical waveguide has an excellent resistance against optical damage. The reason for this is that the region having a high proton concentration has a high electrical conductivity as compared with the substrate. Due to this high electrical conductivity, an electric field generated by the offset of free charges caused by light excitation, which may result in an optical damage, can be inhibited from being generated.

Since the region having a high proton concentration is formed on the surface of the optical waveguide, the optical waveguide is prevented from being deteriorated with the elapse of time. Although the refractive index changes with the elapse of time in the annealed proton-exchanged layer made of $LiNbO_3$ or $LiTaO_3$, this can be prevented by performing another proton exchange treatment. The reason for this is as follows. Although a crystal structure in the vicinity of the surface of the annealed proton-exchanged layer gradually changes after annealing, the crystal structure is changed again by performing another proton exchange treatment on the surface of the annealed proton-exchanged layer so as to prevent the refractive index from changing.

Although the $LiTaO_3$ single crystalline substrate is used in Example 11, the same effect can be obtained by using a $LiNbO_3$ single crystalline substrate or a $LiTaO_3$ and $LiNbO_3$ $(LiNb_{1-x}Ta_xO_3$ $(0 \leq x \leq 1))$ polycrystalline substrate. $LiNbO_3$ is applied to optical waveguide devices in various fields (optical switches, nonlinear optical devices, acousto-optical devices and the like) due to its high electro-optical constant and nonlinear optical constant. Thus, the method for fabricating an optical waveguide and an optical wavelength conversion device of Example 11 is extremely effective in these applications.

Although the $LiTaO_3$ substrate is used in Example 11, a $MgO:LiNbO_3$ or a $MgO:LiTaO_3$ substrate, i.e., the $LiNbO_3$ or $LiTaO_3$ substrate to which MgO is added, can also be used. Since these substrates have high resistance against optical damages, a high-output optical waveguide or a high-output optical wavelength conversion device can be effectively formed thereof.

Alternatively, a KTP substrate can be used instead. In the case where the KTP substrate is used, Rb ion exchange is performed so as to form an optical waveguide having the same effect as that described above in Example 11. Since KTP has an excellent resistance against optical damage, a high-output optical waveguide can be obtained by using the KTP substrate.

Although the proton-exchanged waveguide is used as the optical waveguide in Example 11, a metal-diffused optical waveguide of Ti, Cu, Cd, Nd, Z or the like can also be used. Since a nonlinear constant, an electro-optic constant and the like are scarcely deteriorated by using these metal-diffused optical waveguides, an optical device having excellent characteristics can be fabricated by the fabrication method of Example 11.

Example 12

Hereinafter, a method for fabricating an optical wavelength conversion device utilizing the fabrication method of Example 10 of the present invention will be described in Example 12.

FIGS. 34A to 34G show the steps of the fabrication method of the optical wavelength conversion device of Example 12. FIGS. 34A to 34G are cross-sectional views showing the respective steps of the fabrication method.

Figure 34A:
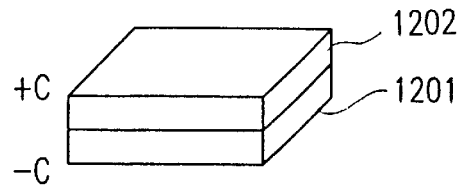
FIGS. 34A to 34G are cross-sectional views showing the fabrication steps of an optical wavelength conversion device of Example 12 according to the present invention.

First, as shown in FIG. 34A, a $LiTaO_3$ single crystalline substrate 1201, which is a C plate (cut along a face perpendicular to a C axis of the crystal) of a nonlinear optical material (hereinafter, referred to simply as a substrate 1201), is immersed into pyrophosphoric acid at a temperature in the range of about 200° C. to 300° C. for several minutes so as to perform a proton exchange treatment. From this proton exchange treatment, a first proton-exchanged layer 1202 is formed on the surface of the substrate 1201 as shown in FIG. 34A.

Figure 34B:
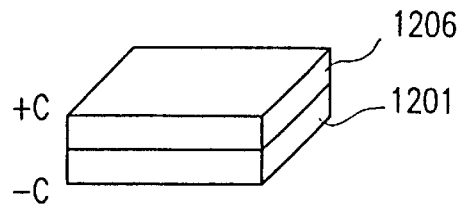

Then, as shown in FIG. 34B, the substrate 1201 is annealed at a temperature in the range of about 400 to 450° C. so as to convert the first proton-exchanged layer 1202 into an annealed proton-exchanged layer 1206.

Figure 34C:
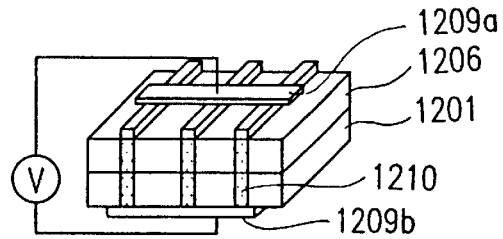

On the +C face, which is the surface of the substrate 1201, a comb-shaped electrode 1209a is attached. On the -C face, which is the bottom face of the substrate 1201, a planar electrode 1209b is attached. By applying a voltage between the comb-shaped electrode 1209a and the planar electrode 1209b, domain-inverted layers 1210 are formed so as to perpendicularly cross the light guiding direction as shown in FIG. 34C. The domain-inverted layers 1210 are formed with a predetermined period in accordance with the shape of the comb-shaped electrode 1209a.

Figure 34D:
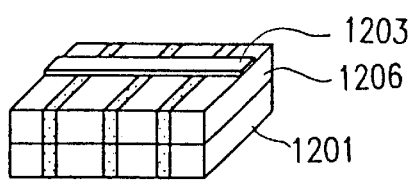

After both electrodes 1209a and 1209b are removed, a Ta layer having a thickness of about 60 nm is deposited on the +C face of the substrate by sputtering or vapor deposition. Then, the Ta layer is subjected to photolithograpy and dry etching in a $CF_4$ atmosphere so as to form a strip-shaped Ta layer 1203 having a predetermined width as shown in FIG. 34D.

Figure 34E:
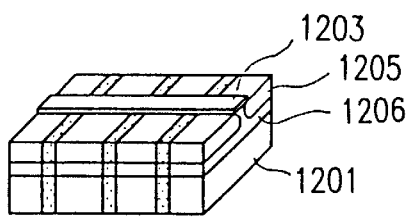

By using the Ta layer 1203 as a protection mask, a proton exchange treatment is performed on the unmasked region as in Examples 10 and 11 so as to form a second proton-exchanged layer 1205 as shown in FIG. 34E.

Figure 34F:
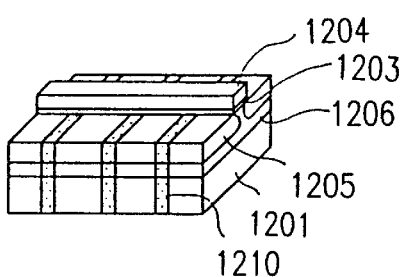

After applying a negative resist (not shown) onto the surface of the substrate, an ultraviolet ray is irradiated onto the bottom face of the substrate 1201 so as to expose the negative resist to light to be developed so that a resist pattern 1204 having a predetermined shape is formed on the Ta layer 1203 as shown in FIG. 34F. Since the strip-shaped Ta layer 1203 serves as a protection mask so as to expose only the unmasked region to light, the strip-shaped resist pattern 1204 can be selectively formed only on the surface of the Ta layer 1203 in a self-aligned manner.

Figure 34G:
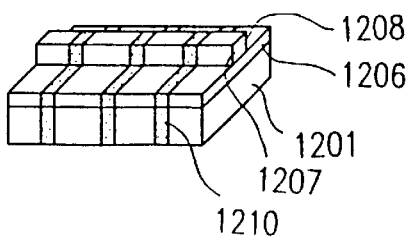

Then, as shown in FIG. 34G, the unmasked region of the second proton-exchanged layer 1205 is removed by dry etching in a $CHF_3$ atmosphere by using the resist pattern 1204 and the Ta layer 1203 as protection masks.

Thereafter, the substrate 1201 is immersed into a mixed solution of hydrofluoric acid and nitric acid (1:2) for several seconds so that the remaining Ta layer 1203 and the remaining resist pattern 1204 are removed.

Then, both end faces serving as a light input face and a light output face of the optical wavelength conversion device are optically polished, thereby completing the optical wavelength conversion device including a ridge 1207 as shown in FIG. 34G.

On the-side faces of the ridge 1207, proton-exchanged regions 1208 are respectively formed. The proton-exchanged regions 1208 are formed by lateral diffusion of proton when the second proton-exchanged layer 1205 is formed by using the Ta layer 1203 serving as a protection mask. Since the proton-exchanged regions 1208 are not annealed, the proton-exchanged regions 1208 have a higher proton concentration and a higher refractive index as compared with that of the annealed proton-exchanged layer 1206.

The fabrication method of Example 12 has the following features.

Since the domain-inverted layers 1210 are formed after the formation of the optical waveguide according to the fabrication method of Example 12, the domain-inverted layers 1210 are not affected by the fabrication step for forming the optical waveguide. Therefore, according to the fabrication method of Example 12, it is ensured that the domain-inverted layers can be uniformly formed.

When domain-inverted layers are etched in the conventional technique, the surface of the optical waveguide is unevenly formed due to a difference in etching rate between the domain-inverted layers and the other regions. According to the fabrication method of Example 12, however, the second proton-exchanged layer 1205 is formed on the surfaces of the domain-inverted layers 1210 to be etched. Thus, unevenness of the surfaces of the domain-inverted layers 1210, which results from etching, is eliminated. As a result, the fabrication method of Example 12 is suitable for forming an optical wavelength conversion device with a low loss.

Furthermore, according to the fabrication method of Example 12, a depth of etching can be determined with a high accuracy by the depth of the second proton-exchanged layer 1205. Therefore, the optical wavelength conversion devices having excellent characteristics can be fabricated.

Next, the structure and principle of the optical wavelength conversion device fabricated by the fabrication method of Example 12 will be described.

Next, the principle of the optical wavelength conversion device formed by the fabrication method of Example 12 will be described.

Figure 35:
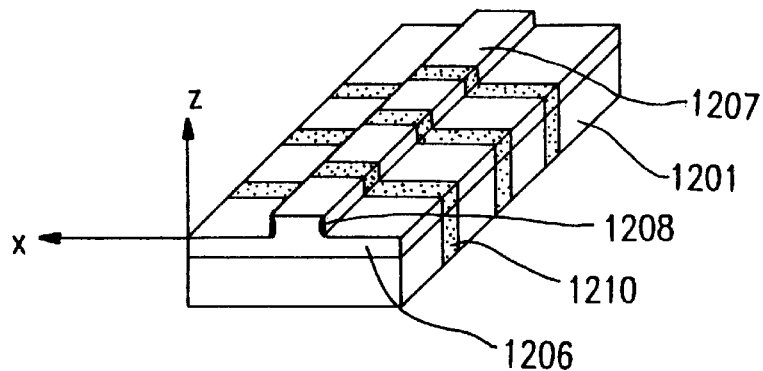
FIG. 35 is a perspective view showing the structure of an optical wavelength conversion device.

FIG. 35 is a perspective view showing the structure of the optical wavelength conversion device fabricated by the fabrication method of Example 12. The same components as those shown in FIGS. 34A to 34G are denoted by the same reference numerals, and therefore the description thereof is herein omitted.

The optical wavelength conversion device shown in FIG. 35 is a pseudo phase-matched type second-harmonic wave generating device. A fundamental wave propagating through the optical waveguide is converted into a second-harmonic wave having a halved wavelength by the periodic domain-inverted layers 1210 formed in a light propagating direction in the optical waveguide. For example, if an infrared ray having a wavelength of 860 nm is input into the optical waveguide, a blue light beam having a halved wavelength, that is, 430 nm, is output therefrom. The properties of the optical wavelength conversion device greatly depend on a nonlinear optical constant of the optical waveguide and the degree of overlap between a fundamental wave propagating through the optical waveguide and a second-harmonic wave.

The results from evaluating the characteristics of the optical wavelength conversion device fabricated by the fabrication method of Example 12 will be described.

First, the degree of overlap between the light guide modes (the fundamental wave and the second-harmonic wave) of the optical wavelength conversion device having the ridge shaped optical waveguide fabricated in Example 12 will be described.

In the experiment for evaluating the optical wavelength conversion device of Example 12, the degree of overlap of the electric field distributions of guide light beams in a lateral direction (in a X direction in FIG. 35) is obtained by measuring a near-field pattern of the guide light propagating through the optical waveguide.

Figure 36A:
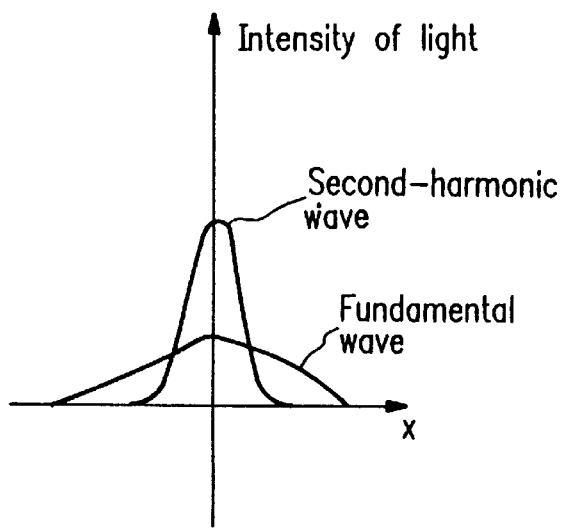
FIGS. 36A and 36B are views showing lateral distributions of the intensity of light propagating through optical waveguides, respectively.
Figure 36B:
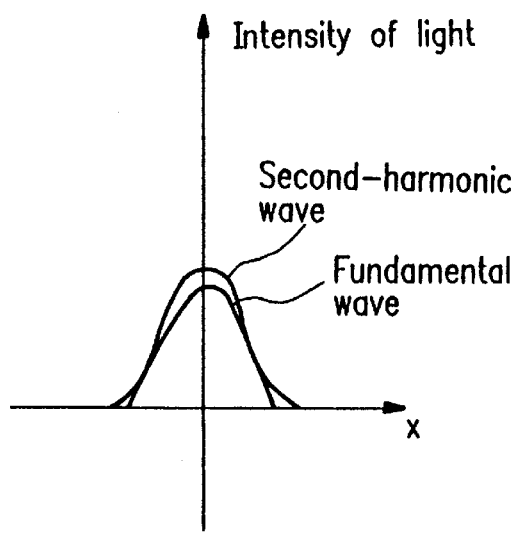

FIGS. 36A and 36B are graphs showing intensity distributions of the fundamental wave and the second-harmonic wave in the optical waveguide. FIG. 36A shows the case of a conventional buried type optical waveguide, while FIG. 36B shows the case of the ridge type optical waveguide of Example 12. In comparison of the graphs of FIGS. 36A and 36B, the degree of lateral overlap of the ridge type optical waveguide is much greater than that of the conventional buried type optical waveguide. The reasons for this are as follows. The refractive index distribution of the ridge type optical is rendered stepwise by the ridge 1207. Moreover, since the proton-exchanged regions 1208 formed on both side faces of the ridge 1207 have a high refractive index, the proton-exchanged regions 1208 greatly contribute to light confinement of the optical waveguide. As a result, the optical wavelength conversion device using the ridge type optical waveguide has a conversion efficiency 1.5 times as much as that of the optical wavelength conversion device using a conventional buried type optical waveguide.

Next, a resistance against optical damage of the optical wavelength conversion device fabricated in Example 12 will be described.

The optical damage in the optical waveguide is a phenomenon in which a refractive index changes by irradiation of light. Such an optical damage tends to occur in the region having a high light confinement effect such as an optical waveguide. The optical damage more frequently occurs as a wavelength of light gets shorter. A conventional optical wavelength conversion device is disadvantageous in that optical damage occurs by the generation of a second-harmonic wave to render the output characteristics thereof unstable. In order to solve this problem, a proton-exchanged $LiTaO_3$ substrate having an excellent resistance against optical damage as compared with a normal $LiTaO_3$ substrate is used in a conventional buried type optical waveguide. In the conventional buried type optical waveguide, however, guided light leaks in regions other than the proton-exchanged region. As a result, optical damage is generated in the outer peripheral region of the optical waveguide. Therefore, it is conventionally difficult to generate a high output of the second-harmonic wave.

As a result of evaluating the resistance against optical damage, the optical wavelength conversion device fabricated by the fabrication method of Example 12 has a resistance against optical damage 10 times or more as much as that of the optical wavelength conversion device using the conventional buried type optical waveguide. The reason for this is that the optical wavelength conversion device using the ridge type optical waveguide prevents light from leaking from the optical waveguide by forming the ridge type proton-exchange layer on the surface of the optical waveguide. Since the proton-exchanged layer has a high electrical conductivity, the occurrence of an electric field due to offset of optically excited free charges, which results in an optical damage, is restrained. The optical wavelength conversion device of Example 12 has a waveguide structure having an excellent resistance against optical damage owing to the ridge type proton-exchanged layer formed on the surface of the waveguide. Furthermore the optical wavelength conversion device of Example 12 includes the proton-exchanged regions 1208 formed on both sides of the ridge 1207 having a high proton concentration so as to increase an electric conductivity. A resistance against optical damage is also improved thereby.

A conversion efficiency of the optical wavelength conversion device of Example 12 will be described.

If the side faces of the ridge 1207 have slight unevenness in the ridge type optical waveguide, a guide loss becomes large. In order to reduce this guide loss, the optical waveguide is covered with a film having a refractive index higher than that of the air layer and lower than that of the optical waveguide in Example 10 described above. It is effective to cover the optical wavelength conversion device with such a film.

By using the ridge type optical waveguide as the optical wavelength conversion device of Example 12, the degree of overlap of propagating light beams in a lateral direction can be increased in the optical waveguide. However, the degree of overlap of light intensity distributions in a depth direction (in a Z direction in FIG. 35) in the optical waveguide is not improved. In order to form an optical wavelength conversion device having an optical waveguide with a high efficiency, it is necessary to increase the degree of overlap of the fundamental wave and the second-harmonic wave in a depth direction. In Example 12 of the present invention, a high refractive index layer is formed on the surface of the ridge 1207 of the optical waveguide so as to control an intensity distribution of the guide light in a depth direction. More specifically, only the surface of the ridge 1207 is selectively covered with a high refractive index layer. In this way, a light confinement effect in a depth direction of the optical waveguide can be increased by forming a high refractive index film on the surface of the ridge 1207, so that the degree of overlap between the fundamental wave and the second-harmonic wave is increased.

Figure 37A:
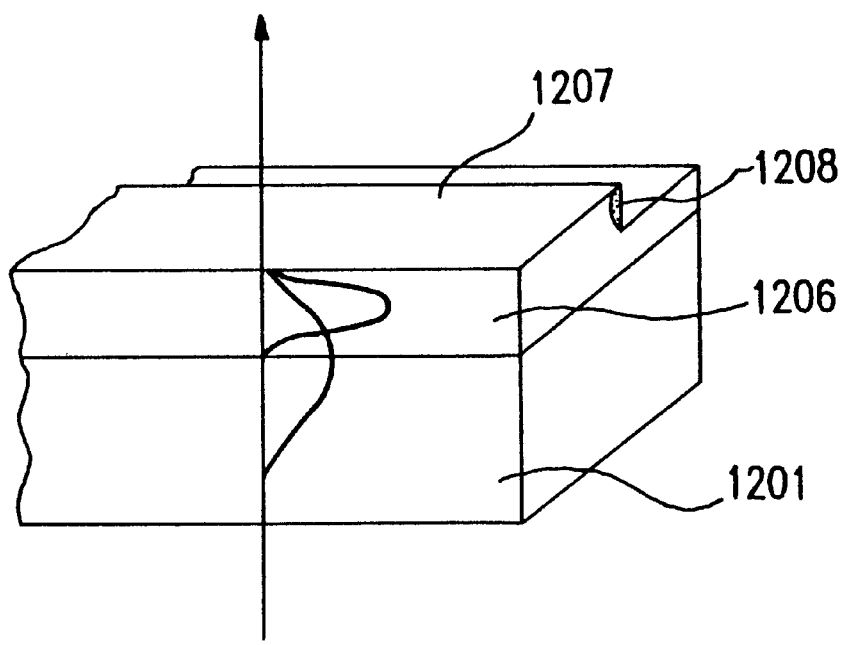
FIGS. 37A and 37B are schematic view showing depth-direction intensity distributions of light propagating through optical waveguides, respectively.
Figure 37B:
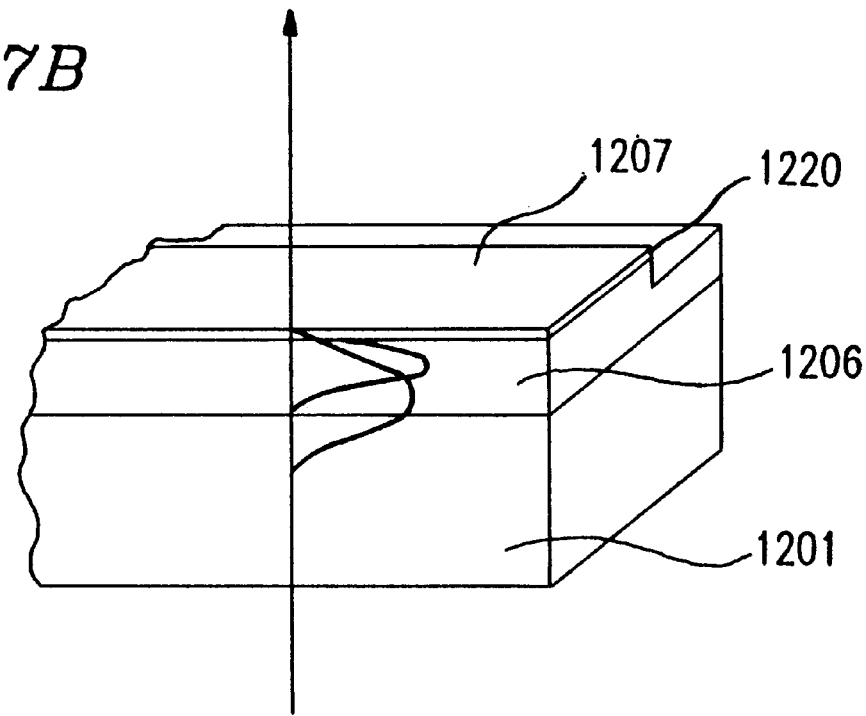

FIGS. 37A and 37B show the states of overlap between the fundamental wave and the second-harmonic wave in the optical wavelength conversion devices. FIG. 37A shows the state of overlap between the fundamental wave and the second-harmonic wave in the optical wavelength conversion device fabricated by the above-described fabrication method of Example 12, and FIG. 37B shows the state of overlap between the fundamental wave and the second-harmonic wave in the optical wavelength conversion device further including a high refractive index layer 1220 formed on the ridge 1207.

The high refractive index layer 1220, which is selectively formed only on the surface of the ridge 1207 of the optical wavelength conversion device shown in FIG. 37B, is made of amorphous $LiNbO_3$. In order to enhance a light confinement effect of the optical waveguide, it is effective to form a film having a refractive index higher than that of the optical waveguide on the surface of the ridge 1207. Therefore, in Example 12, amorphous $LiNbO_3$ is used as the material of the high refractive index layer 1220. The optical waveguide including the $LiTaO_3$ substrate is about 2.15, while the amorphous $LiNbO_3$ high refractive index layer 1220 has a refractive index of about 2.25. The $LiNbO_3$ high refractive index layer 1220 has such a thickness that a second-harmonic wave propagating through the optical waveguide is not guided through the high refractive index layer 1220, for example, in the range of about 100 nm to about 500 nm. If a second-harmonic wave is guided through the high refractive index layer 1220, the second-harmonic wave is confined within the surface layer to significantly lower a conversion efficiency. As shown in FIG. 37B, since a large degree of overlap between the fundamental wave and the second-harmonic wave in a depth direction is obtained in the optical wavelength conversion device having the $LiNbO_3$ high refractive index layer 1220, a conversion efficiency is improved to be 1.3 times as much as that of the optical wavelength conversion device shown in FIG. 37A.

Although the $LiTaO_3$ single crystalline substrate is used in Example 12, the same effect can be obtained by using a $LiNbO_3$ single crystalline substrate or a $LiTaO_3$ and $LiNbO_3$ ($LiNb_{(1-x)}Ta_xO_3$ ($0 \leq x \leq 1$)) polycrystalline substrate. $LiNbO_3$ is applied to optical waveguide devices in various fields (optical switches, nonlinear optical devices, acousto-optical devices and the like) due to its high electro-optical constant and nonlinear optical constant. Thus, the method for fabricating an optical waveguide and an optical wavelength conversion device of Example 12 is extremely effective in these applications.

Although the $LiTaO_3$ substrate is used in Example 12, a $MgO:LiNbO_3$ or a $MgO:LiTaO_3$ substrate, i.e., the $LiNbO_3$ or $LiTaO_3$ substrate to which MgO is added, can also be used. Since these substrate have high resistance against optical damages, a high-output optical waveguide or a high-output optical wavelength conversion device can be effectively formed thereof.

Alternatively, a KTP substrate can be used instead. In the case where the KTP substrate is used, Rb ion exchange is performed so as to form an optical waveguide having the same effect as that described above in Example 12. Since KTP has an excellent resistance against optical damage, a high-output optical waveguide can be obtained by using the KTP substrate.

Although the proton-exchanged waveguide is used as the optical waveguide in Example 12, a metal-diffused optical waveguide of Ti, Cu, Cd, Nd, Z or the like can also be used. Since a nonlinear constant, an electro-optic constant and the like are scarcely deteriorated by using these metal-diffused optical waveguides, the optical device, which has excellent characteristics, can be fabricated by the fabrication method of Example 12.

Although the $LiTaO_3$ substrate is used in the optical wavelength conversion device of Example 12, a semiconductor substrate such as a ZnS substrate or a GaAs substrate can also be used. Since a semiconductor material has a large nonlinear optical constant and a fabrication method thereof is well developed, an optical wavelength conversion device with a high output can be fabricated.

Example 13

Hereinafter, a method for fabricating an optical wavelength conversion device utilizing the fabrication method of Example 11 will be described in Example 13.

FIGS. 38A to 38F show the steps of the fabrication method of the optical wavelength conversion device of Example 13. FIGS. 38A to 38F are cross-sectional views showing the respective steps.

Figure 38A:
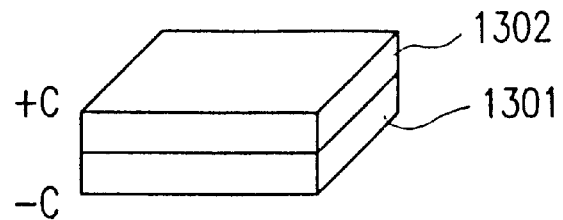
FIGS. 38A to 38F are cross-sectional view showing the fabrication steps of an optical wavelength conversion device in Example 13 according to the present invention.

First, as shown in FIG. 38A, a $LiTaO_3$ single crystalline substrate 1301, which is a C plate (cut along a face perpendicular to a C axis of the crystal) of a nonlinear optical material (hereinafter, referred to simply as a substrate 1301), is immersed into pyrophosphoric acid at a temperature in the range of about 200° C. to about 300° C. for several minutes so as to perform a proton exchange treatment. Using this proton exchange treatment, a first proton-exchanged layer 1302 is formed on the surface of the substrate 1301 as shown in FIG. 38A.

Figure 38B:
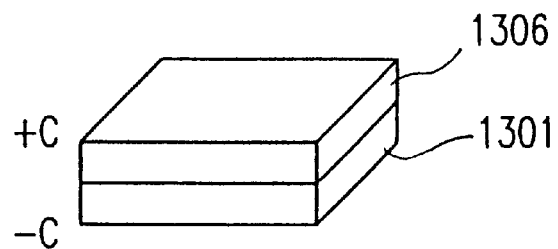

Then, as shown in FIG. 38B, the substrate 1301 is annealed at a temperature in the range of about 400° C. to 450° C. so as to convert the first proton-exchanged layer 1302 into an annealed proton-exchanged layer 1306.

Figure 38C:
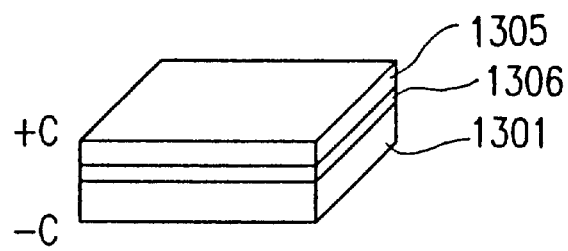

Then, the substrate 1301 is thermally treated in pyrophosphoric acid again so as to form a second proton-exchanged layer 1305 extending from the surface of the annealed proton-exchanged layer 1306 to a predetermined depth as shown in FIG. 38C.

Figure 38D:
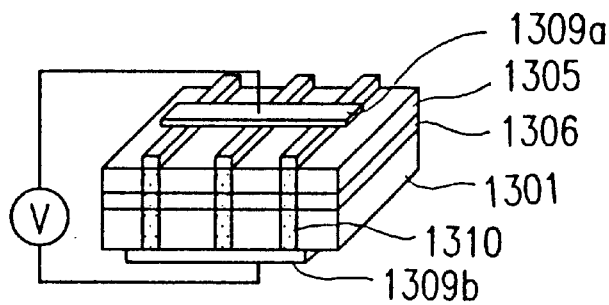

On the +C face which is the surface of the substrate 1301, a comb-shaped electrode 1309a is attached. On a −C face which is the bottom face of the substrate 1301, a planar electrode 1309b is attached. By applying a voltage between the comb-shaped electrode 1309a and the planar electrode 1309b, domain-inverted layers 1310 are formed so as to perpendicularly cross a light guiding direction as shown in FIG. 38D. The domain-inverted layers 1310 are formed with a predetermined period in accordance with the shape of the comb-shaped electrode 1309a.

Figure 38E:
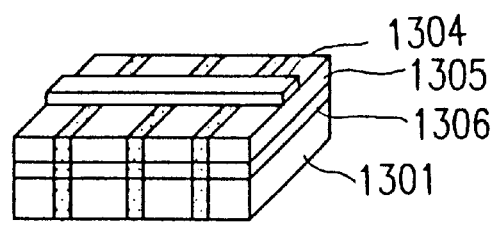

After both electrodes 1309a and 1309b are removed, a resist pattern 1304 having a predetermined width is formed by photolithography on the substrate 1301 as shown in FIG. 38E.

Figure 38F:
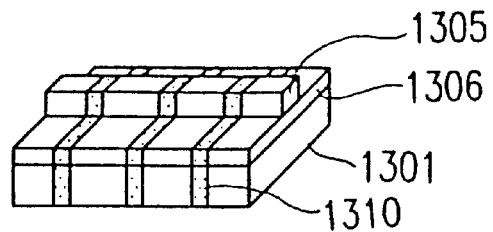

Then, as shown in FIG. 38F, the unmasked region of a second proton-exchanged layer 1305 is removed by dry etching in a $CHF_3$ atmosphere by using the resist pattern 1304 as a protection mask. Thereafter, the remaining resist pattern 1304 on the second proton-exchanged layer 1305 is removed. End faces respectively serving as a light input face and a light output face of the optical wavelength conversion device are optically polished, thereby completing the optical wavelength conversion device having a ridge 1307.

In the fabrication method of Example 13, the annealed proton-exchanged layer 1306 in the step shown in FIG. 38B is about 2.5 μm, and the ridge 1307 has a height of about 0.4 μm in the final step.

According to the fabrication method of Example 13, the optical wavelength conversion device has the following features.

Since the method for fabricating the optical wavelength conversion device of Example 13 includes simple steps, the optical wavelength conversion device having a ridge type optical waveguide can be easily fabricated. Moreover, since the optical wavelength conversion device formed by the fabrication method of Example 13 has the proton-exchanged layers 1305 having a high proton concentration and a large degree of change in refractive index formed on the side faces of the ridge 1307, a waveguide structure having a high light confinement effect can be fabricated by the fabrication method of Example 13.

Furthermore, since the depth of etching can be controlled with a high accuracy by controlling the depth of the proton-exchanged layers 1305, high quality optical wavelength conversion devices can be fabricated.

Next, the result of measurement for evaluating the characteristics of the optical wavelength conversion device fabricated by the fabrication method of Example 13 will be described.

Figure 39:
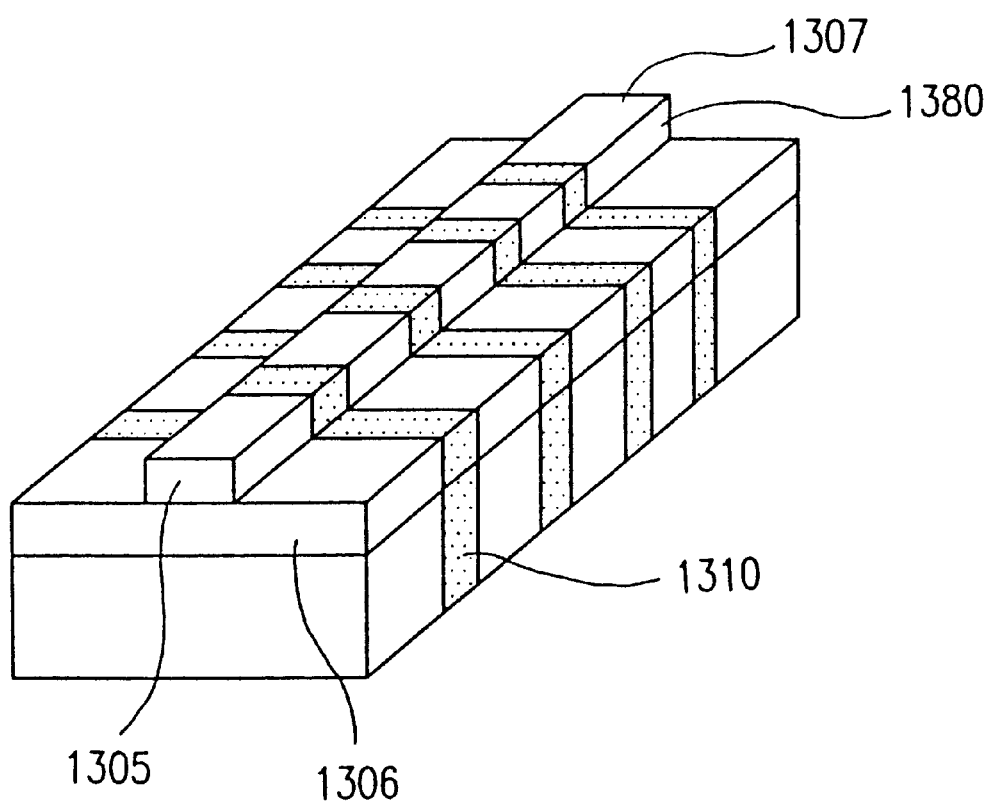
FIG. 39 is a perspective view showing the structure of an optical wavelength conversion device.

FIG. 39 is a perspective view showing the structure of the optical wavelength conversion device fabricated by the fabrication method of Example 13. The same components as those in FIGS. 38A to 38F are denoted by the same reference numerals.

In FIG. 39, the annealed proton-exchanged layer 1306 is formed on the substrate 1301. On part of the annealed proton-exchanged layer 1306, a proton-exchanged region 1380, which is the ridge 1307, is formed. Domain-inverted layers 1310 are formed with a predetermined period so as to perpendicularly cross a light guiding direction. The proton-exchanged region 1380 is part of the proton-exchanged layer 1305 having a high proton concentration formed by a proton exchange treatment performed in the fabrication method shown in FIGS. 38A to 38F.

The optical wavelength conversion device of Example 13 shown in FIG. 39 has the proton-exchanged layer 1305 having a high refractive index as the ridge 1307. Then, the degree of overlap of electric fields of the fundamental mode and the second-harmonic wave in a depth direction is large. As a result, an optical wave-length conversion device with a high efficiency can be obtained. The reasons for this will be described below.

Figure 40:
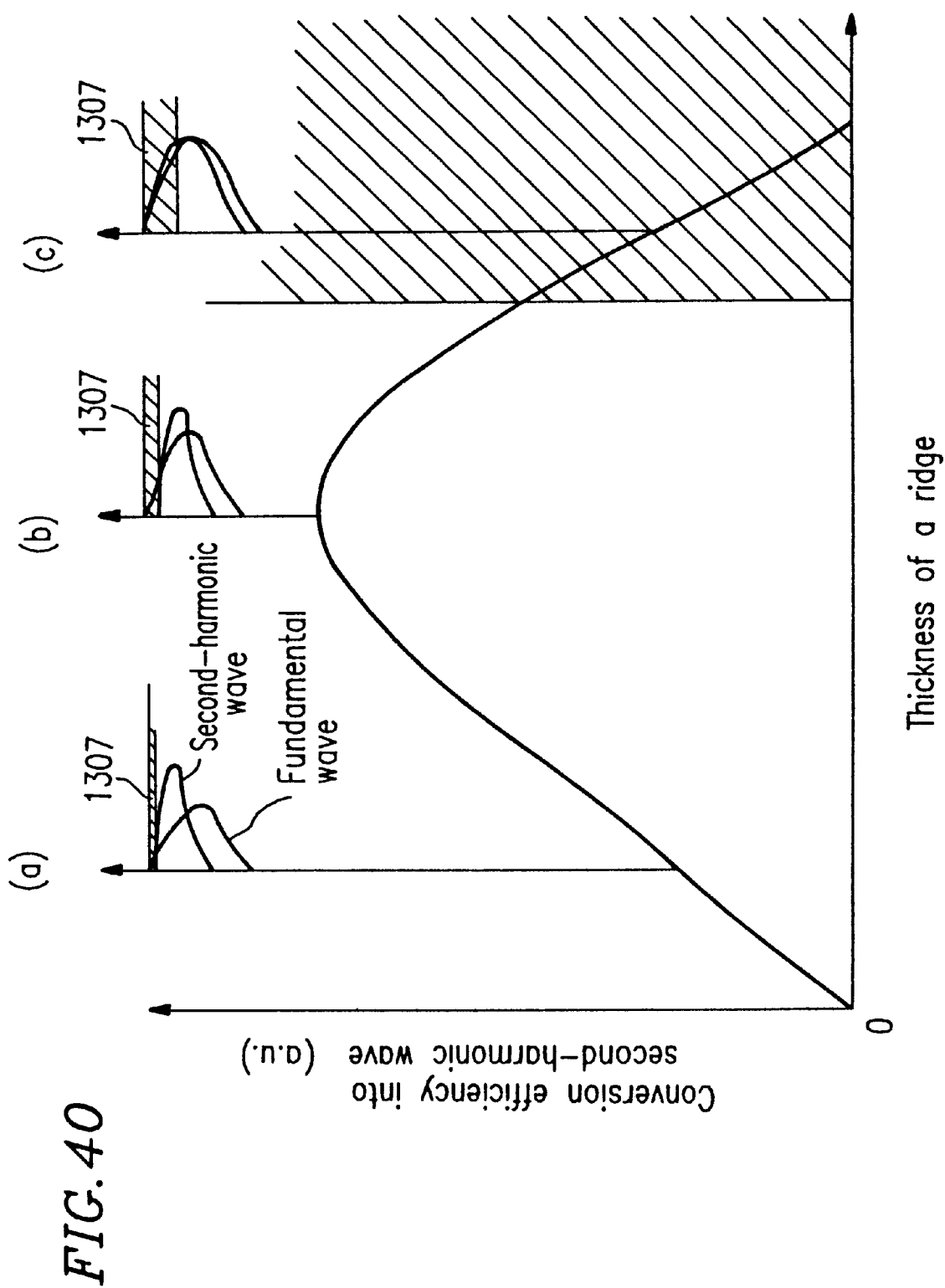
FIG. 40 shows the relationship between the thickness of a ridge and a conversion efficiency in an optical wavelength conversion device.

FIG. 40 is a graph showing the relationship between the thickness of the ridge and a conversion efficiency of the optical wavelength conversion device. Portions (a), (b) and (c) in FIG. 40 each show the degree of overlap between the guide modes (the fundamental wave and the second-harmonic wave) in a thickness direction in three types of optical wavelength conversion devices having respectively different heights of the ridge.

The optical wavelength conversion device shown in portion (a) of FIG. 40 scarcely has a thickness of the ridge 1307, and therefore substantially does not have a high refractive index on the surface thereof. Therefore, since the optical wavelength conversion device shown in portion (a) of FIG. 40 has a graded pattern (a refractive index becomes gradually high toward the middle portion, becomes the maximum in the middle and gradually decreases thereafter) of a refractive index distribution of the optical waveguide, the degree of overlap between the fundamental wave and the second-harmonic wave is small. As a result, a conversion efficiency is low accordingly.

With the thickness of the ridge of the optical wavelength conversion device shown in portion (b) of FIG. 40, the intensity distribution of the fundamental wave is attracted to the vicinity of the surface by the high refractive index layer formed on the surface thereof. As a result, since the degree of overlap between the fundamental wave and the second-harmonic wave is increased, a high conversion efficiency can be obtained. A conversion efficiency of the optical wavelength conversion device shown in portion (b) of FIG. 40 is increased by about 1.5 times as much as the optical wavelength conversion device including the ridge which does not have a high refractive index layer formed thereon. From this result, it is apparent that the formation of a high refractive index layer as a ridge is effective to obtain a high conversion efficiency.

The optical wavelength conversion device shown in portion (c) of FIG. 40 has a thicker refractive index layer. As a result, the degree of overlap between the fundamental wave and the second-harmonic wave is increased.

The fundamental wave along with the second-harmonic wave is cutoff in the high refractive index layer formed on the surface of the optical wavelength conversion device. In this case, however, the second-harmonic wave is also guided through the high refractive index layer, thereby adversely lowering a conversion efficiency. Since a nonlinear optical constant is lowered in the high refractive index layer due to its high proton concentration, a wavelength conversion cannot be performed with a high efficiency in the high refractive index layer. Therefore, in order to obtain the optical wavelength conversion device with a high efficiency, it is desirable that the thickness of the ridge should be set so that only the second-harmonic wave is cut off thereby.

Furthermore, a resistance against optical damage is improved in the optical wavelength conversion device of Example 13 by forming a region having a high proton concentration on the surface of the optical waveguide. Since the region having a high proton concentration has a higher electric conductivity as compared with that of the substrate, the occurrence of an electric field due to the offset of free charges caused by light excitation, which may result in an optical damage, is inhibited thereby.

Furthermore, the optical waveguide is prevented from being deteriorated with the elapse of time in the optical wavelength conversion device of Example 13 by forming a region having a high proton concentration on the surface of the optical waveguide. It is observed that a refractive index changes with elapse of time after annealing in the $LiNbO_3$ proton-exchanged layer or $LiTaO_3$ proton-exchanged layer. The reason for this is presumed that the crystal structure in the vicinity of the surface of the proton-exchanged layer gradually changes after annealing. In order to avoid this, another proton exchange treatment is performed on the surface in the optical wavelength conversion device of Example 13 so as to change the crystal structure again. As a result, the refractive index is prevented from changing with the elapse of time.

Although the $LiTaO_3$ single crystalline substrate is used in Example 13, the same effect can be obtained by using a $LiNbO_3$ single crystalline substrate or a $LiTaO_3$ and $LiNbO_3$ ($LiNb_{(1-x)}Ta_xO_3$ ($1 \leq x \leq 1$)) polycrystalline substrate. $LiNbO_3$ is applied to optical waveguide devices in various fields (optical switches, nonlinear optical devices, acousto-optical devices and the like) due to its high electro-optical constant and nonlinear optical constant. Thus, the method for fabricating an optical waveguide and an optical wavelength conversion device of Example 13 is extremely effective in these applications.

The structure of the optical waveguide according to the present invention is also applicable to a fiber-shaped optical waveguide, for example. In such a case, a cylindrical core made of an optical material corresponds to the optical waveguide described above. The cladding layer having the properties described above is formed so as to cover the surface of the core.

Although the $LiTaO_3$ substrate is used in Example 13, a $MgO:LiNbO_3$ or a $MgO:LiTaO_3$ substrate, i.e., the $LiNbO_3$ or $LiTaO_3$ substrate to which MgO is added, can also be used. Since these substrates have high resistance against optical damages, a high-output optical waveguide or a high-output optical wavelength conversion device can be effectively formed thereof.

Alternatively, a KTP substrate can be used instead. In the case where the KTP substrate is used, Rb ion exchange is performed as ion exchange so as to form an optical waveguide having the same effect as that described above in Example 13. Since KTP has an excellent resistance against optical damage, a high-output optical waveguide can be obtained by using the KTP substrate.

Although the proton-exchanged waveguide is used as the optical waveguide in Example 13, a metal-diffused optical waveguide of Ti, Cu, Cd, Nd, Z or the like can also be used. Since a nonlinear constant, an electro-optic constant and the like are scarcely deteriorated by using these metal-diffused optical waveguides, the optical device having excellent characteristics can be fabricated by the fabrication method of Example 13.

Although the $LiTaO_3$ substrate is used in the optical wavelength conversion device of Example 13, a semiconductor substrate such as a ZnS substrate or a GaAs substrate can also be used. Since a semiconductor material has a large nonlinear optical constant and a fabrication method thereof is well developed, an optical wavelength conversion device with a high output can be fabricated.

As described above, according to the present invention, a cladding layer is provided on an optical waveguide. The phase-matching is performed between a fundamental wave in the fundamental mode propagating through the optical waveguide and a second-harmonic wave in a higher mode partially propagating through the cladding layer so as to increase the degree of overlap between the fundamental wave and the second-harmonic wave. As a result of this, since a conversion efficiency can be greatly improved, the structure of the present invention has a great effect in practical use.

By using the cladding layer having a high refractive index, a light confinement effect in the width direction of the optical waveguide can be increased. Thus, an outgoing angle of light output from the optical waveguide can be almost identical in a width direction and a depth direction. As a result, the light output efficiency can be remarkably improved by an improved aspect ratio of the output light beam. Therefore, the structure of the present invention has a great effect in practical use.

Furthermore, by providing a high refractive index layer and the cladding layer having a refractive index higher than that of the substrate, a light confinement effect for light propagating through the optical waveguide is increased so as to improve a power density of light. Since the degree of overlap between electric field distributions of the fundamental wave propagating through the optical waveguide and the second-harmonic wave is increased, a conversion efficiency can be remarkably improved. Therefore, the structure of the present invention has a great effect in practical use.

Moreover, owing to the structure of the optical wavelength conversion device, the degree of change in output of the second-harmonic wave due to optical damage can be remarkably reduced. As a result of this, a high output of the second-harmonic wave can be stably obtained. Therefore, the structure of the present invention has a great effect in practical use.

Furthermore, by providing the cladding layer having a high refractive index, it is possible to control an electric field distribution. As a result, the controllability-for the profile of a guide mode of light propagating through the optical waveguide is improved. Resultingly, it is possible to bring an aspect ratio of a radiation pattern of the second-harmonic wave output close to 1. Since a light output efficiency is remarkably improved thereby, the structure of the present invention has a great effect in practical use.

A proton exchange treatment is performed through a transmissive film in the fabrication method of the optical waveguide according to the present invention, so chemical damage on the surface of the proton-exchanged layer can be reduced. Since the optical waveguide with a low propagation loss can be obtained thereby, the structure of the present invention has a great effect in practical use.

Since a thickness of the proton-exchanged layer can be controlled by controlling the thickness of the transmissive film, a plurality of proton-exchanged layers respectively having different depths can be formed by a single proton exchange treatment. Since the shape of the proton-exchanged layer can be controlled by the shape of the transmissive film, the mass-producibility can be improved by simplifying the operation and reducing the number of fabrication steps. Therefore, the structure of the present invention has a great effect in practical use.

Moreover, according to a method for fabricating an optical waveguide and an optical wavelength conversion device of the present invention, a proton-exchanged treatment is selectively performed only for an etched region by using a metal mask. Then, after a resist pattern is formed on a metal mask by light irradiation from the bottom face of a substrate, etching is performed. As a result, an optical waveguide can be easily formed. In the fabrication process, the etched region is subjected to an ion exchange so as to improve the etching rate and the etching accuracy. Consequently, high quality optical waveguides can be formed.

Furthermore, the fabricated optical waveguide has a low loss and an excellent resistance against optical damage. In addition, an electric field distribution of light propagating through the optical waveguide is optimized. Therefore, it is possible to use the thus fabricated optical waveguide in an optical wavelength conversion device with a high efficiency and a high output.

According to the fabrication method described in Example 10, since the depth of etching can be controlled with increased accuracy, the high quality optical waveguides enable a low propagation loss.

According to the fabrication method described in Example 11, since refractive index layers having a high proton concentration are formed on the side faces of a ridge, an optical waveguide with a high light confinement effect and an excellent resistance against optical damage can be easily fabricated.

According to the fabrication method described in Example 12, since a ridge is formed on the surface of the optical waveguide as a high refractive index region, an optical waveguide with a high conversion efficiency and an excellent resistance against optical damage can be obtained.

According to the fabrication method described in Example 13, since a depth of etching can be controlled with a high accuracy, the optical wavelength conversion device equally having a high quality and a high conversion efficiency can be easily fabricated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical waveguide comprising:
   an optical material;
   an optical waveguide layer formed in the optical material; and
   a cladding layer formed on a surface of the optical waveguide layer,
   wherein:
   (1) the optical waveguide layer is capable of guiding a light beam having a wavelength of $\lambda 1$ and a light beam having a wavelength of $\lambda 2$ ($\lambda 1 > \lambda 2$) therethrough,
   (2) the light beam having a wavelength of $\lambda 1$ and the light beam having a wavelength of $\lambda 2$ propagate in the optical waveguide layer in a guided mode, and
   (3) a refractive index and a thickness of the cladding layer are determined so as to satisfy a guiding condition for the light beam having the wavelength of $\lambda 2$ and a cutoff condition for the light beam having the wavelength of $\lambda 1$.

2. An optical waveguide according to claim 1, wherein the cladding layer has a stripe shape.

3. An optical waveguide according to claim 2, wherein the optical waveguide layer has a stripe shape.

4. An optical waveguide according to claim 1, wherein the optical waveguide layer has a stripe shape.

5. An optical waveguide according to claim 1, further comprising a high refractive index layer having a refractive index of nl formed in the vicinity of a surface of the optical material,
   wherein the optical material has a refractive index of ns, the optical waveguide layer is formed in a vicinity of the surface of the optical material so as to have a stripe shape and has a refractive index of nf, and the refractive indices satisfy a relationship: nf>nl>ns.

6. An optical waveguide according to claim 1, wherein a stripe-shaped ridge is formed on the surface of the optical waveguide layer, the cladding layer is formed on the ridge so as to have a stripe shape, and the light beams in the optical waveguide layer are guided through the ridge.

7. An optical waveguide according to claim 1, wherein the optical waveguide forms a cylindrical core, and the cladding layer covers a peripheral region of the core.

8. An optical waveguide according to claim 1, wherein the light having the wavelength of $\lambda 1$ propagates in a fundamental mode, and the light having the wavelength of $\lambda 2$ propagates in a high-order mode.

9. An optical waveguide according to claim 1, wherein an effective refractive index Nc of the cladding layer and an effective refractive index Nf of the optical waveguide layer satisfy a relationship: Nc>1.02·Nf.

10. An optical waveguide according to claim 1, wherein the cladding layer is made of a multi-layered film.

11. An optical waveguide comprising:
    a substrate made of a nonlinear optical material;
    a first ion-exchanged layer including an optical waveguide region, formed in a vicinity of a surface of the substrate; and
    a second ion-exchanged layer having an ion exchanged concentration higher than that of the first ion-exchanged layer, formed in a vicinity of the optical waveguide region and to satisfy a cutoff condition for incident light.

12. An optical waveguide according to claim 11, wherein the first ion-exchanged layer has a strip-like ridge extending substantially parallel to a light guiding direction, the ridge includes the optical waveguide region, and the second ion-exchanged layer is formed on each side face of the ridge.

13. An optical waveguide according to claim 11, wherein the second ion-exchanged layer has a strip-like ridge extending substantially parallel to a light guiding direction on a surface of the first ion-exchanged layer.

14. An optical waveguide according to claim 11, wherein the substrate is a C plate made of $LiNb_{1-x}Ta_xO_3$ ($0 \leq x \leq 1$).

15. An optical waveguide according to claim 11, wherein each of the first ion-exchanged layer and the second ion-exchanged layer is a proton-exchanged layer.

16. An optical wavelength conversion device comprising:
a substrate made of a nonlinear optical material;
a domain-inverted layer formed with a predetermined period in the substrate;
a first ion-exchanged layer including an optical waveguide region, formed in a vicinity of a surface of the substrate; and
a second ion-exchanged layer having an ion exchanged concentration higher than that of the first ion-exchanged layer, formed in a vicinity of the optical waveguide region.

17. An optical wavelength conversion device according to claim 16, wherein the first ion-exchanged layer has a strip-like ridge extending substantially parallel to a light guiding direction, the ridge includes the optical waveguide region, and the second ion-exchanged layer is formed on each side face of the ridge.

18. An optical wavelength conversion device according to claim 16, wherein the second ion-exchanged layer has a strip-like ridge extending substantially parallel to a light guiding direction on a surface of the first ion-exchanged layer.

19. An optical wavelength conversion device according to claim 16, wherein the substrate is a C plate made of $LiNb_{1-x}Ta_xO_3$ ($0 \leq x \leq 1$).

20. An optical wavelength conversion device according to claim 16, wherein each of the first ion-exchanged layer and the second ion-exchanged layer is a proton-exchanged layer.

* * * * *